US009958308B2

(12) United States Patent
Murphy

(10) Patent No.: US 9,958,308 B2
(45) Date of Patent: *May 1, 2018

(54) APPARATUS AND METHOD FOR DETERMINING THE DEPTH OF LIQUID IN A DRUM

(71) Applicant: Roderick John Murphy, Columbia, MD (US)

(72) Inventor: Roderick John Murphy, Columbia, MD (US)

( * ) Notice: Subject to any disclaimer, the term of this patent is extended or adjusted under 35 U.S.C. 154(b) by 621 days.

This patent is subject to a terminal disclaimer.

(21) Appl. No.: 14/558,996

(22) Filed: Dec. 3, 2014

(65) Prior Publication Data

US 2015/0323371 A1 Nov. 12, 2015

Related U.S. Application Data

(63) Continuation of application No. 14/474,626, filed on Sep. 2, 2014, and a continuation of application No. 14/474,663, filed on Sep. 2, 2014, and a continuation of application No. 14/474,698, filed on Sep. 2, 2014, and a continuation of application No. 14/474,734, filed on Sep. 2, 2014.

(60) Provisional application No. 61/954,725, filed on Mar. 18, 2014, provisional application No. 61/932,334, filed on Jan. 28, 2014.

(51) Int. Cl.
*G01F 17/00* (2006.01)
*G01F 23/14* (2006.01)
*G01F 23/18* (2006.01)

(52) U.S. Cl.
CPC ............. *G01F 23/14* (2013.01); *G01F 23/18* (2013.01); *G01F 23/185* (2013.01)

(58) Field of Classification Search
CPC ...... G01F 23/162; G01F 23/18; G01F 23/185; G01F 23/14; G01L 19/0038; G01L 19/149

See application file for complete search history.

(56) References Cited

U.S. PATENT DOCUMENTS 5,146,785 A * 9/1992 Riley ...................... G01F 23/70
338/176
6,079,266 A * 6/2000 Wright ................ G01F 23/2966
73/290 B
7,421,895 B1 * 9/2008 Caldwell ............. G01F 23/2962
73/290 V

* cited by examiner

*Primary Examiner* — Elias Desta
(74) *Attorney, Agent, or Firm* — Garcia-Zamor IP Law; Ruy M. Garcia-Zamor

(57) ABSTRACT

Apparatus and method for determining: proper operation of a cleaning system, the depth of liquid in a drum, the predicted failure of a pump, improving the ability to monitor cleaning system, improving the ability to monitor dairy wash systems, improving the ability to monitor animal husbandry systems, and/or increasing the efficiency with which various types of equipment, fluid levels, and/or systems can be serviced or monitored.

20 Claims, 51 Drawing Sheets

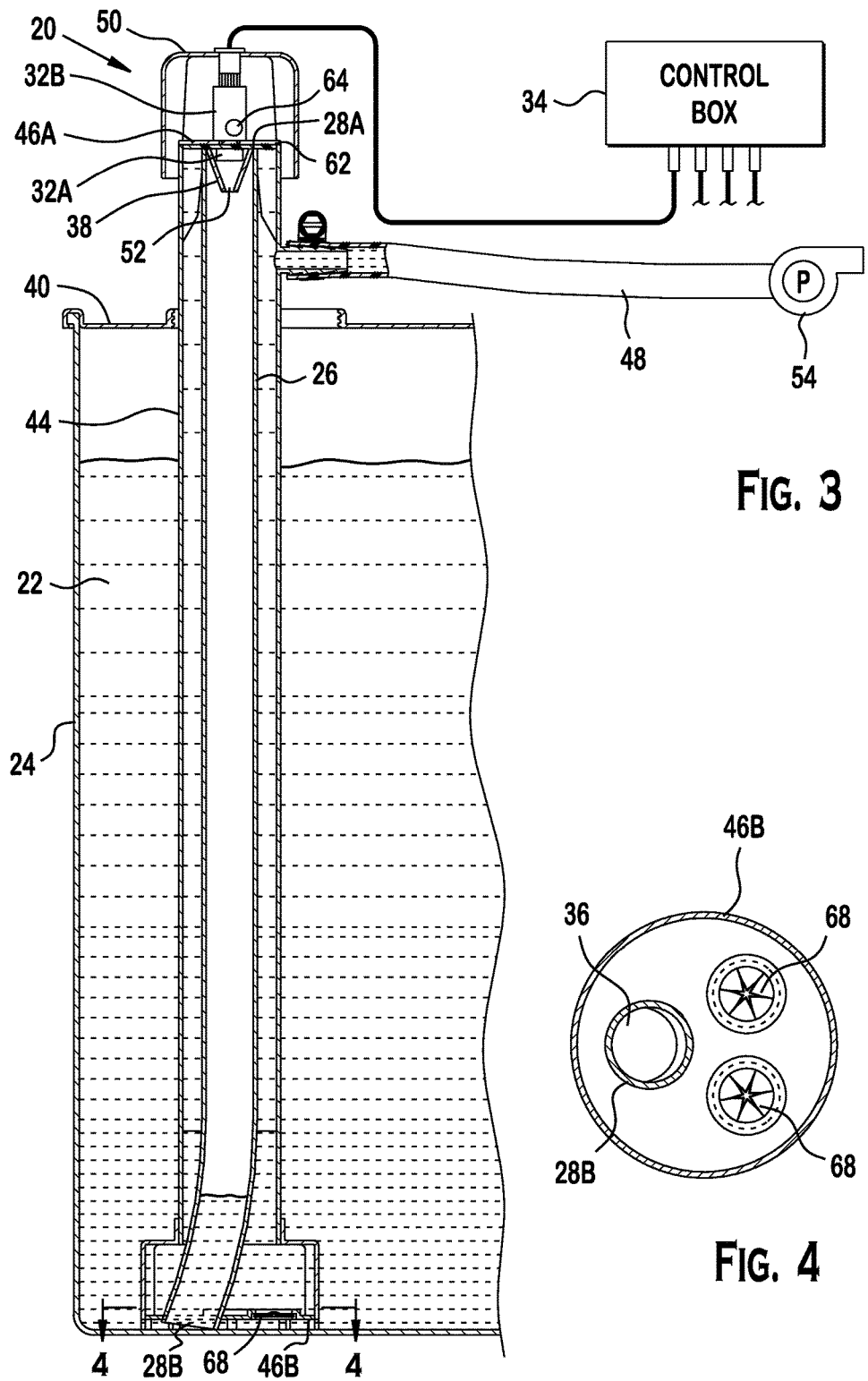

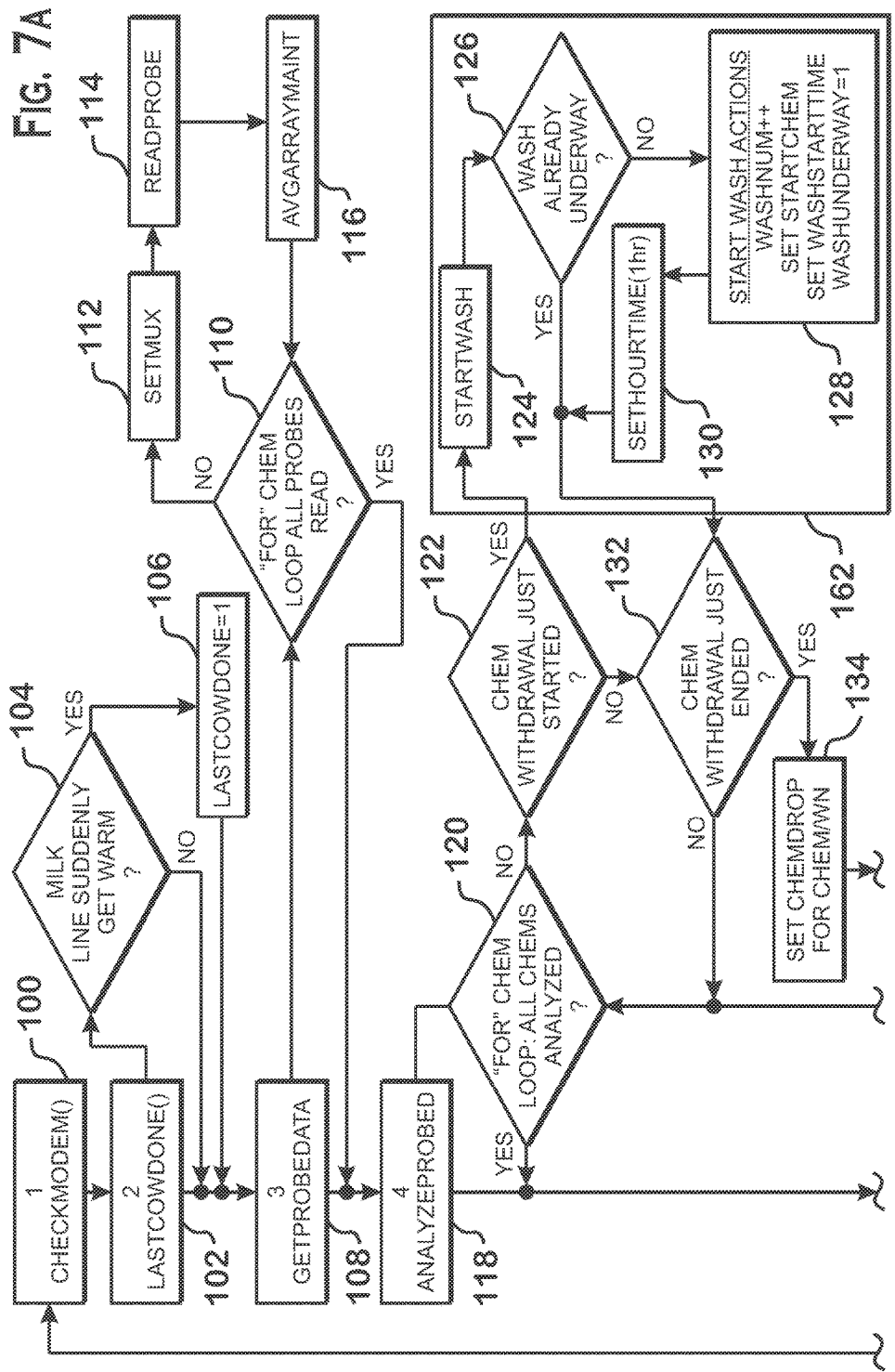

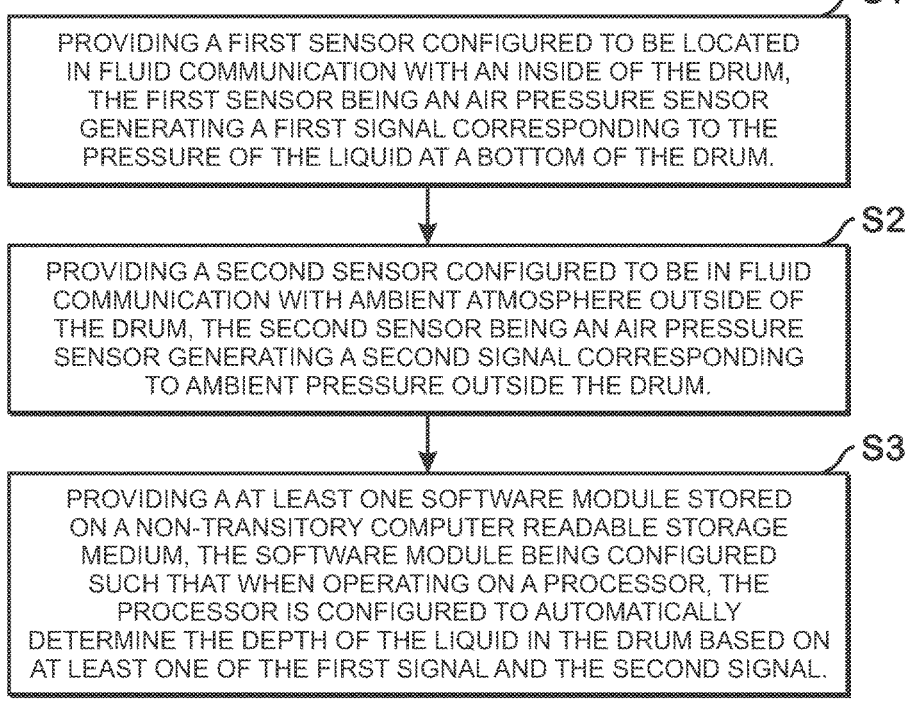
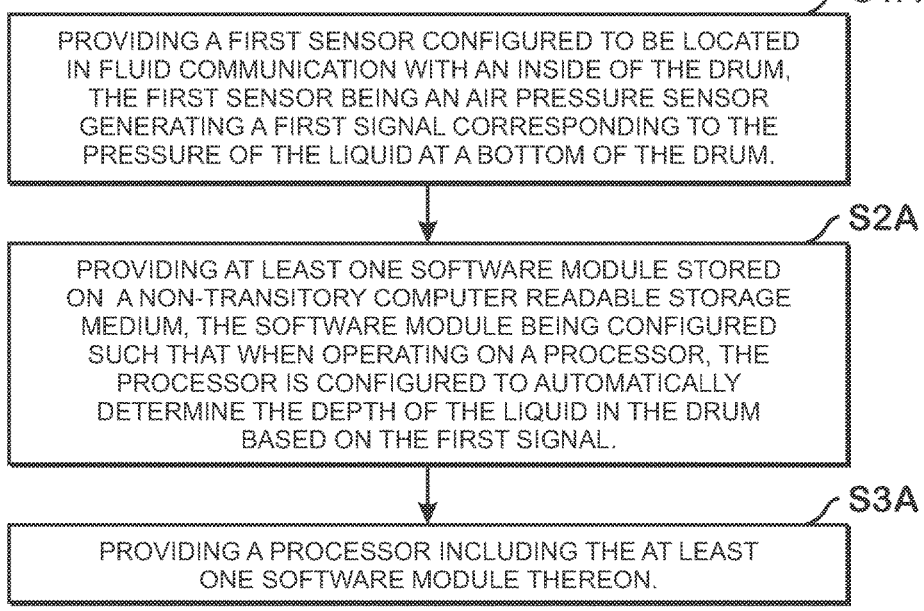

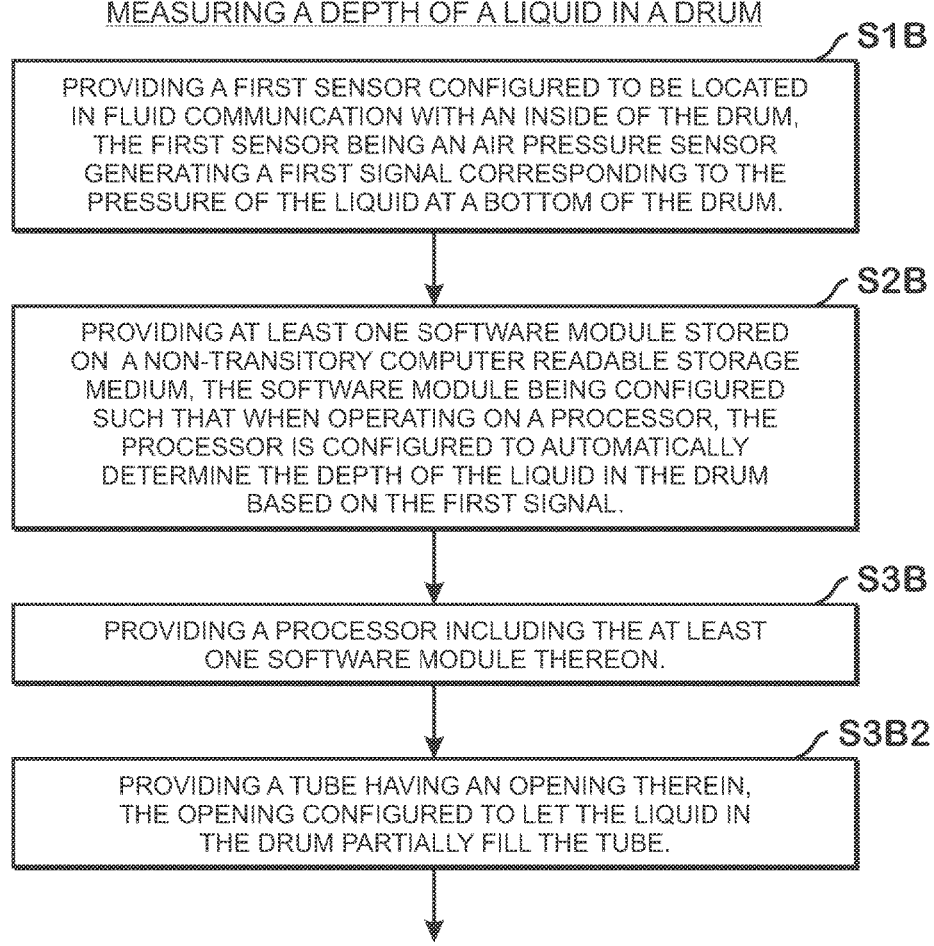

FIG. 10B

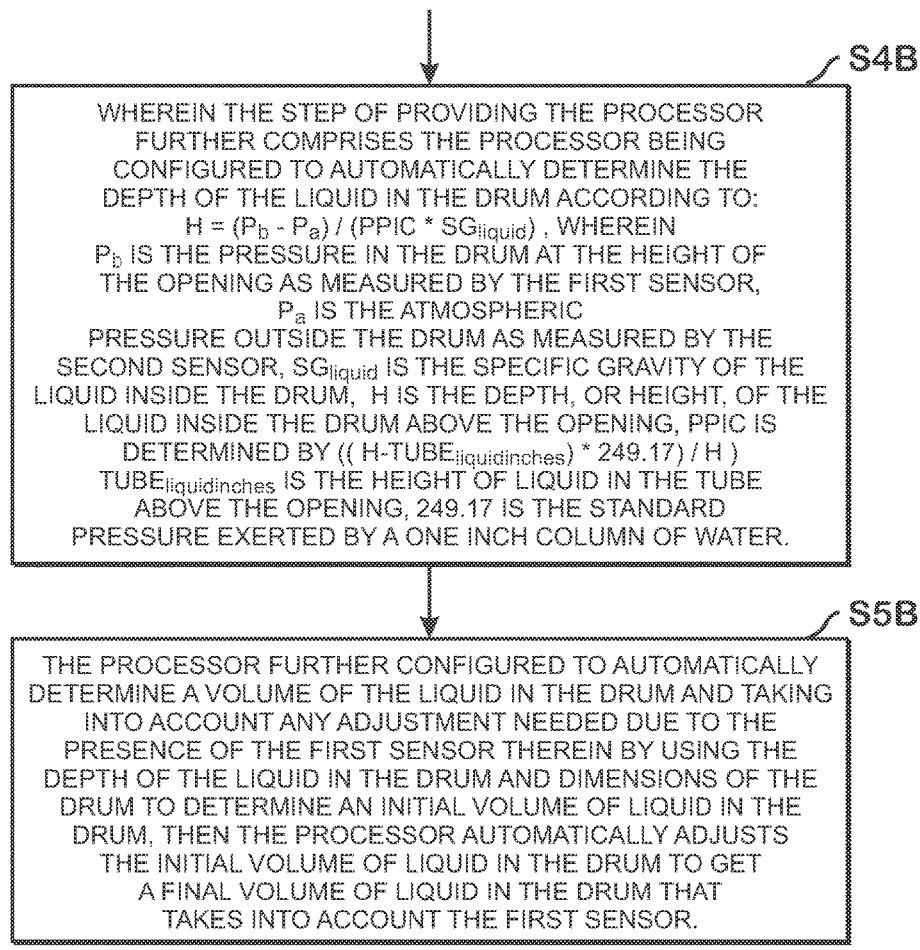

S4B — WHEREIN THE STEP OF PROVIDING THE PROCESSOR FURTHER COMPRISES THE PROCESSOR BEING CONFIGURED TO AUTOMATICALLY DETERMINE THE DEPTH OF THE LIQUID IN THE DRUM ACCORDING TO: $H = (P_b - P_a) / (PPIC * SG_{liquid})$, WHEREIN $P_b$ IS THE PRESSURE IN THE DRUM AT THE HEIGHT OF THE OPENING AS MEASURED BY THE FIRST SENSOR, $P_a$ IS THE ATMOSPHERIC PRESSURE OUTSIDE THE DRUM AS MEASURED BY THE SECOND SENSOR, $SG_{liquid}$ IS THE SPECIFIC GRAVITY OF THE LIQUID INSIDE THE DRUM, H IS THE DEPTH, OR HEIGHT, OF THE LIQUID INSIDE THE DRUM ABOVE THE OPENING, PPIC IS DETERMINED BY $(( H-TUBE_{liquidinches}) * 249.17) / H )$ $TUBE_{liquidinches}$ IS THE HEIGHT OF LIQUID IN THE TUBE ABOVE THE OPENING, 249.17 IS THE STANDARD PRESSURE EXERTED BY A ONE INCH COLUMN OF WATER.

S5B — THE PROCESSOR FURTHER CONFIGURED TO AUTOMATICALLY DETERMINE A VOLUME OF THE LIQUID IN THE DRUM AND TAKING INTO ACCOUNT ANY ADJUSTMENT NEEDED DUE TO THE PRESENCE OF THE FIRST SENSOR THEREIN BY USING THE DEPTH OF THE LIQUID IN THE DRUM AND DIMENSIONS OF THE DRUM TO DETERMINE AN INITIAL VOLUME OF LIQUID IN THE DRUM, THEN THE PROCESSOR AUTOMATICALLY ADJUSTS THE INITIAL VOLUME OF LIQUID IN THE DRUM TO GET A FINAL VOLUME OF LIQUID IN THE DRUM THAT TAKES INTO ACCOUNT THE FIRST SENSOR.

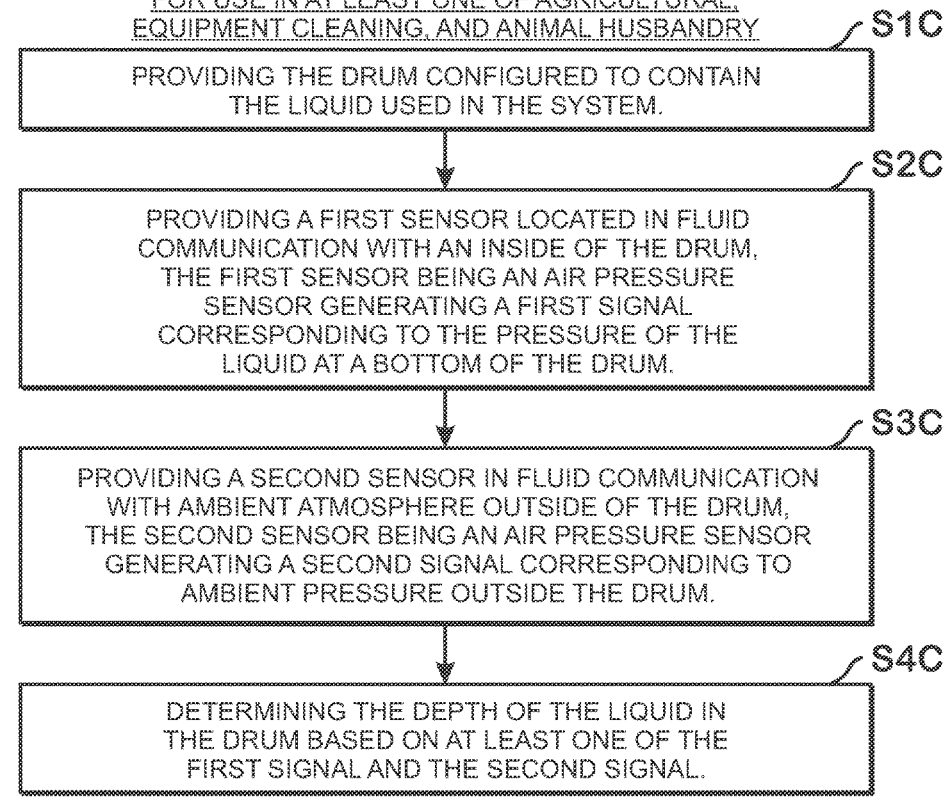

FIG. 12  A METHOD FOR MEASURING A DEPTH OF A LIQUID IN A DRUM USED AS PART OF A SYSTEM FOR USE IN AT LEAST ONE OF AGRICULTURAL, EQUIPMENT CLEANING, AND ANIMAL HUSBANDRY

S1D — PROVIDING THE DRUM CONFIGURED TO CONTAIN THE LIQUID USED IN THE SYSTEM.

S2D — PROVIDING A FIRST SENSOR LOCATED IN FLUID COMMUNICATION WITH AN INSIDE OF THE DRUM, THE FIRST SENSOR BEING AN AIR PRESSURE SENSOR GENERATING A FIRST SIGNAL CORRESPONDING TO THE PRESSURE OF THE LIQUID AT A BOTTOM OF THE DRUM

S3D — DETERMINING THE DEPTH OF THE LIQUID IN THE DRUM BASED ON AT LEAST ONE OF THE FIRST SIGNAL AND THE SECOND SIGNAL.

S4D — PROVIDING AT LEAST ONE SOFTWARE MODULE STORED ON A NON-TRANSITORY COMPUTER READABLE STORAGE MEDIUM, THE SOFTWARE MODULE BEING CONFIGURED SUCH THAT WHEN OPERATING ON A PROCESSOR, THE PROCESSOR IS CONFIGURED TO AUTOMATICALLY DETERMINE THE DEPTH OF THE LIQUID IN THE DRUM BASED ON THE FIRST SIGNAL.

S5D — PROVIDING A PROCESSOR INCLUDING THE AT LEAST ONE SOFTWARE MODULE THEREON SO THAT THE PROCESSOR AUTOMATICALLY DETERMINES THE DEPTH OF THE LIQUID IN THE DRUM.

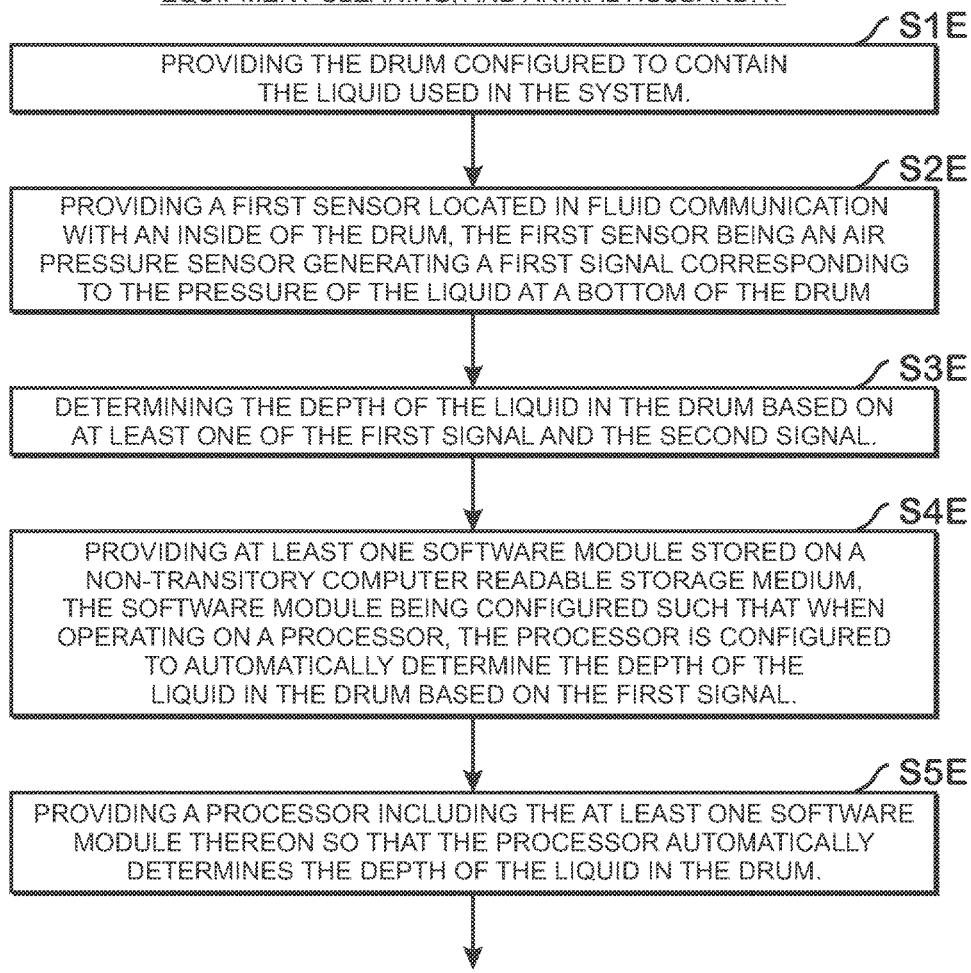

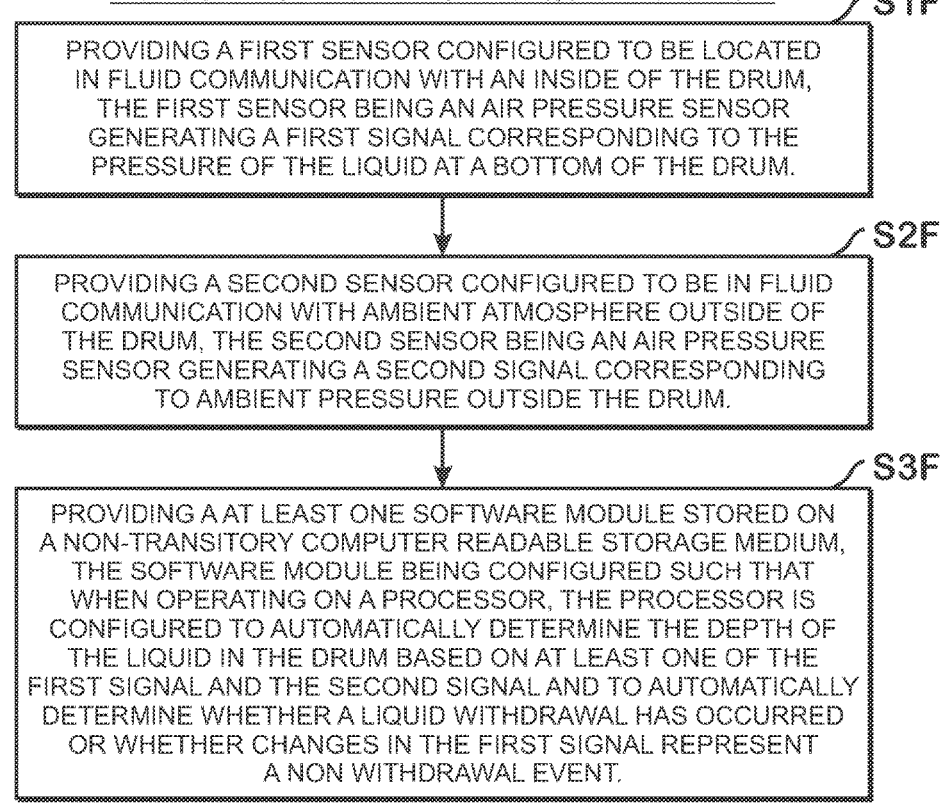

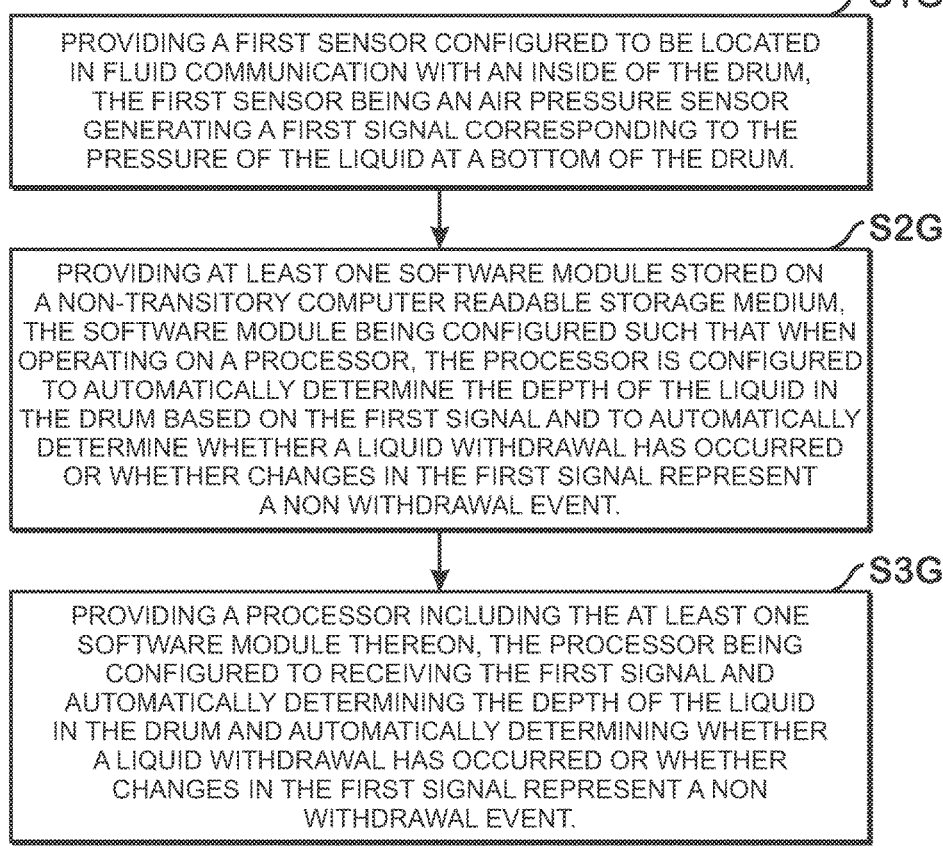

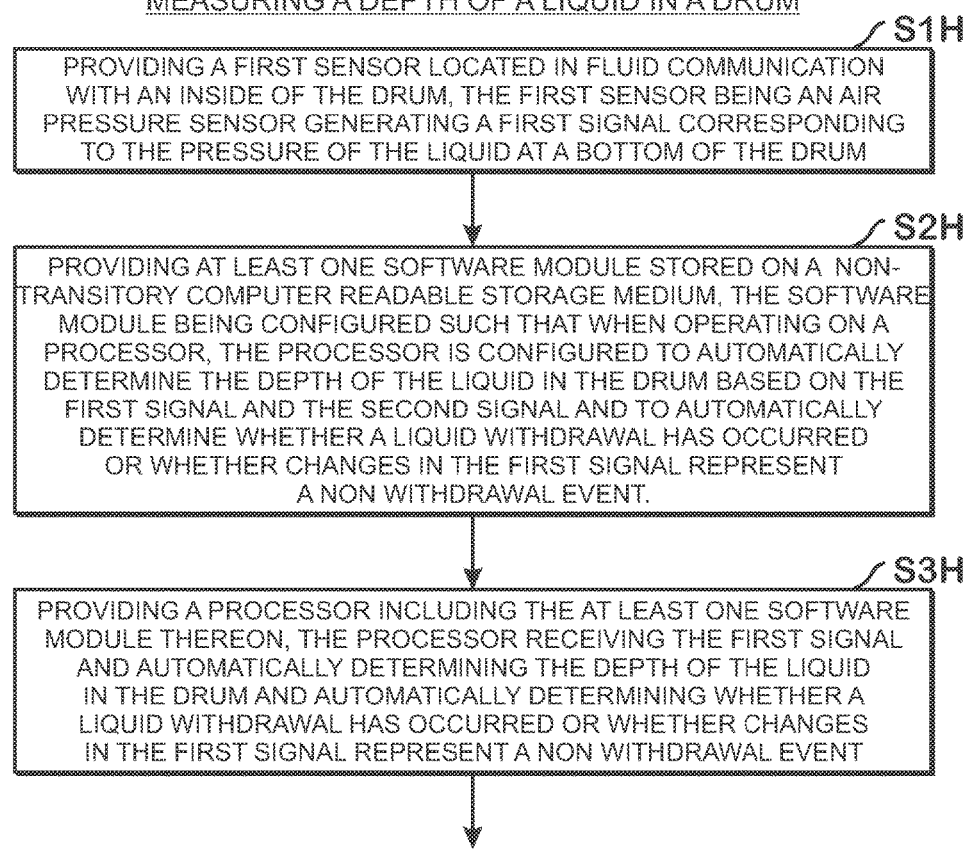

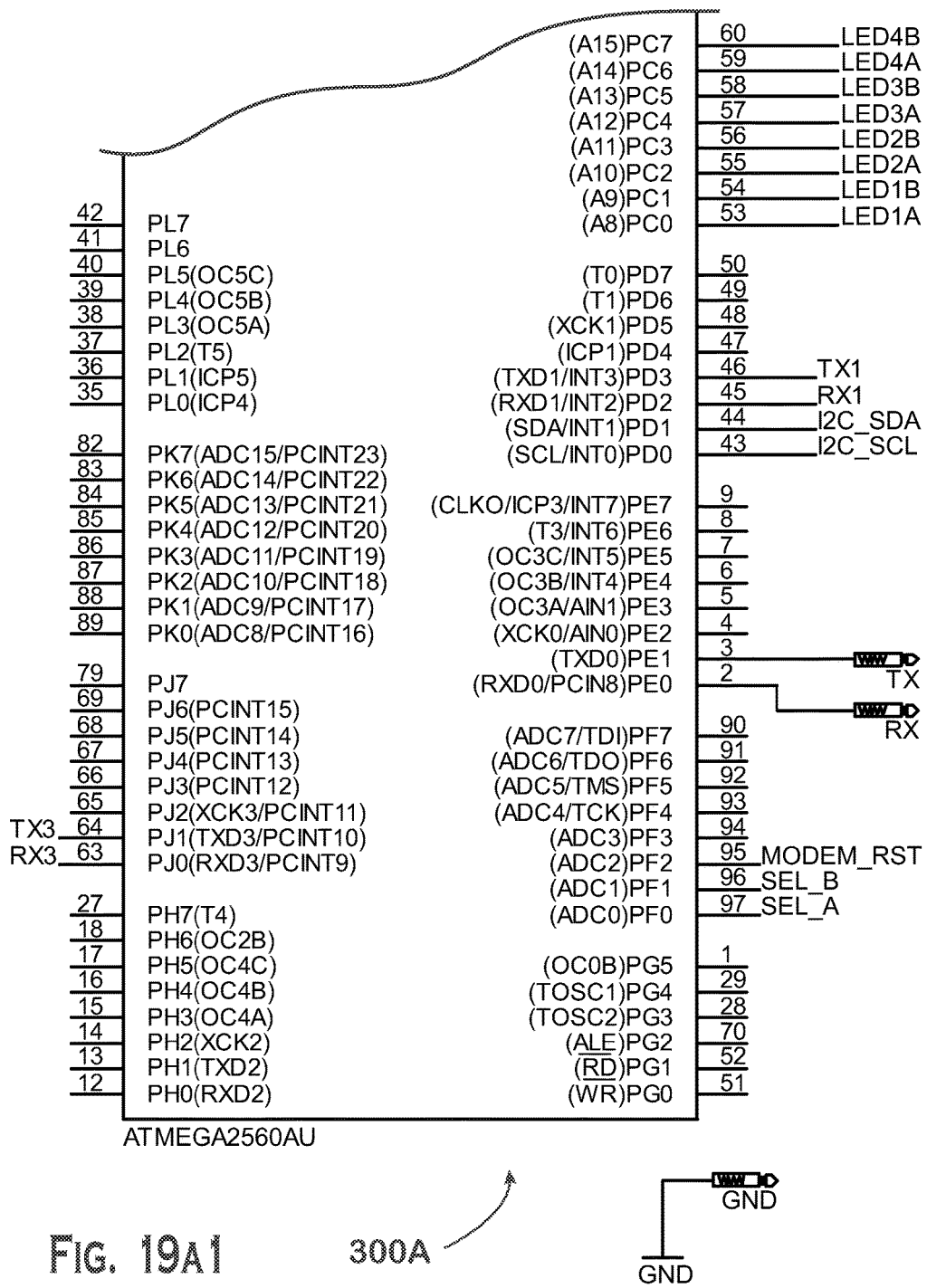
FIG. 19A1

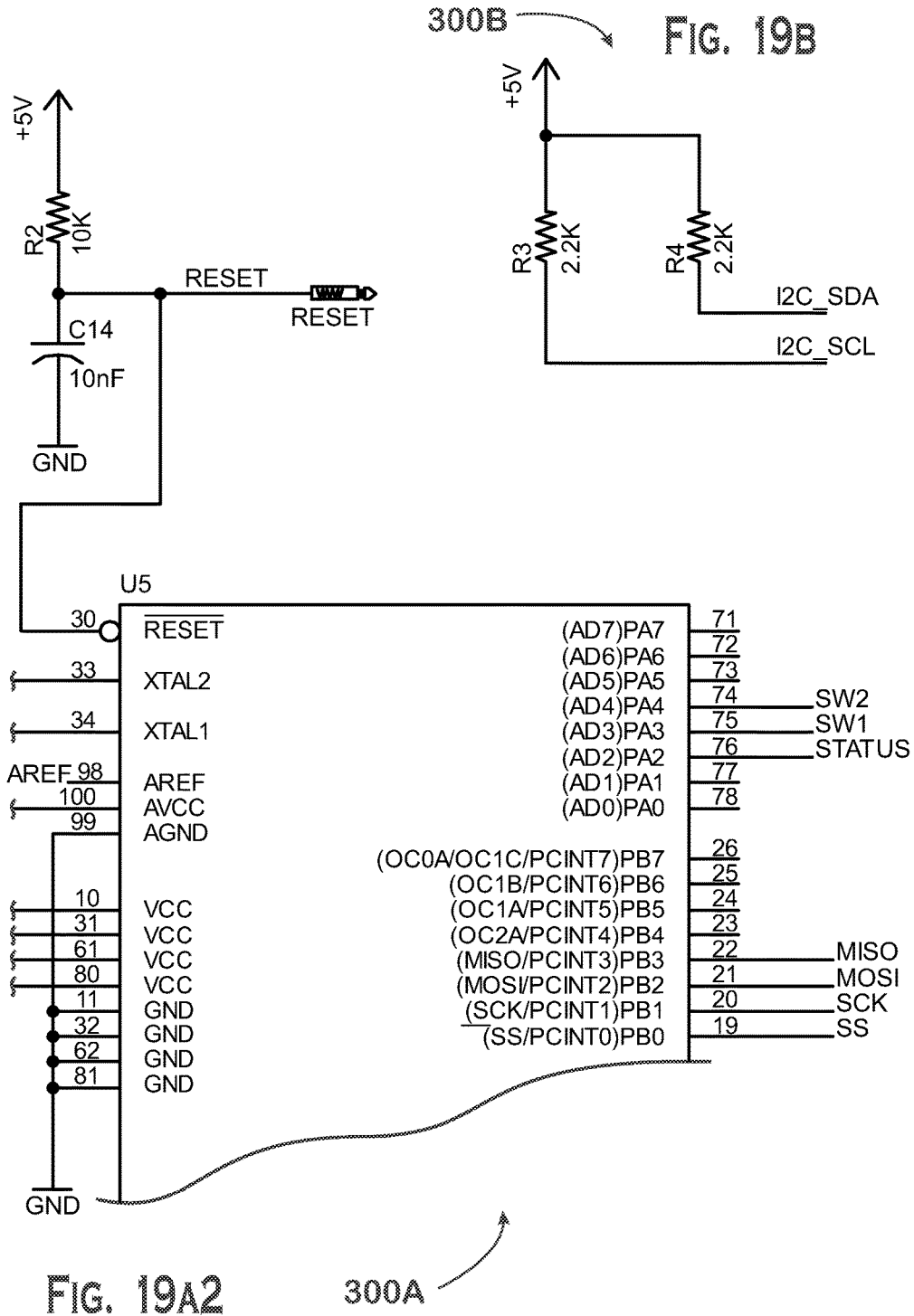

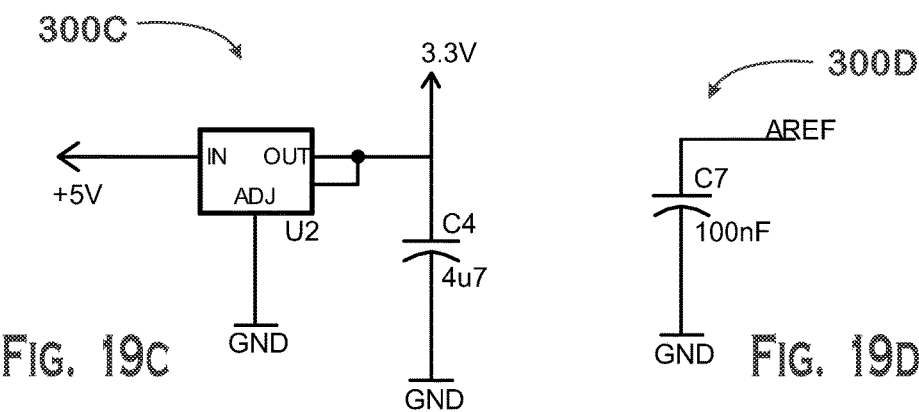
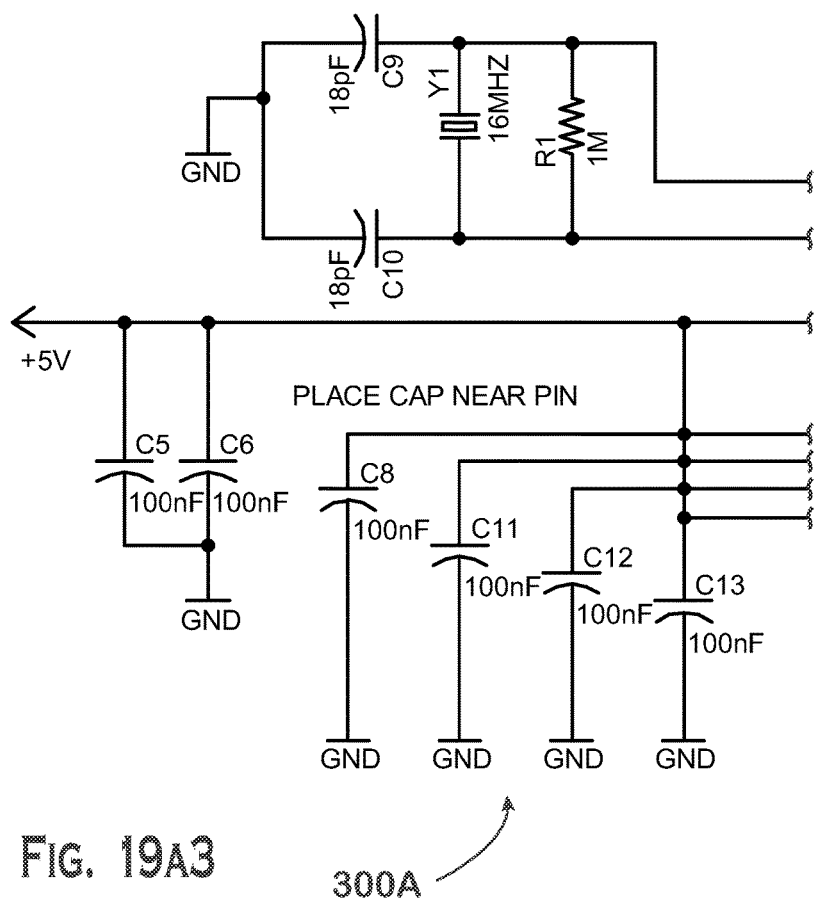
FIG. 19C
FIG. 19D
FIG. 19A3

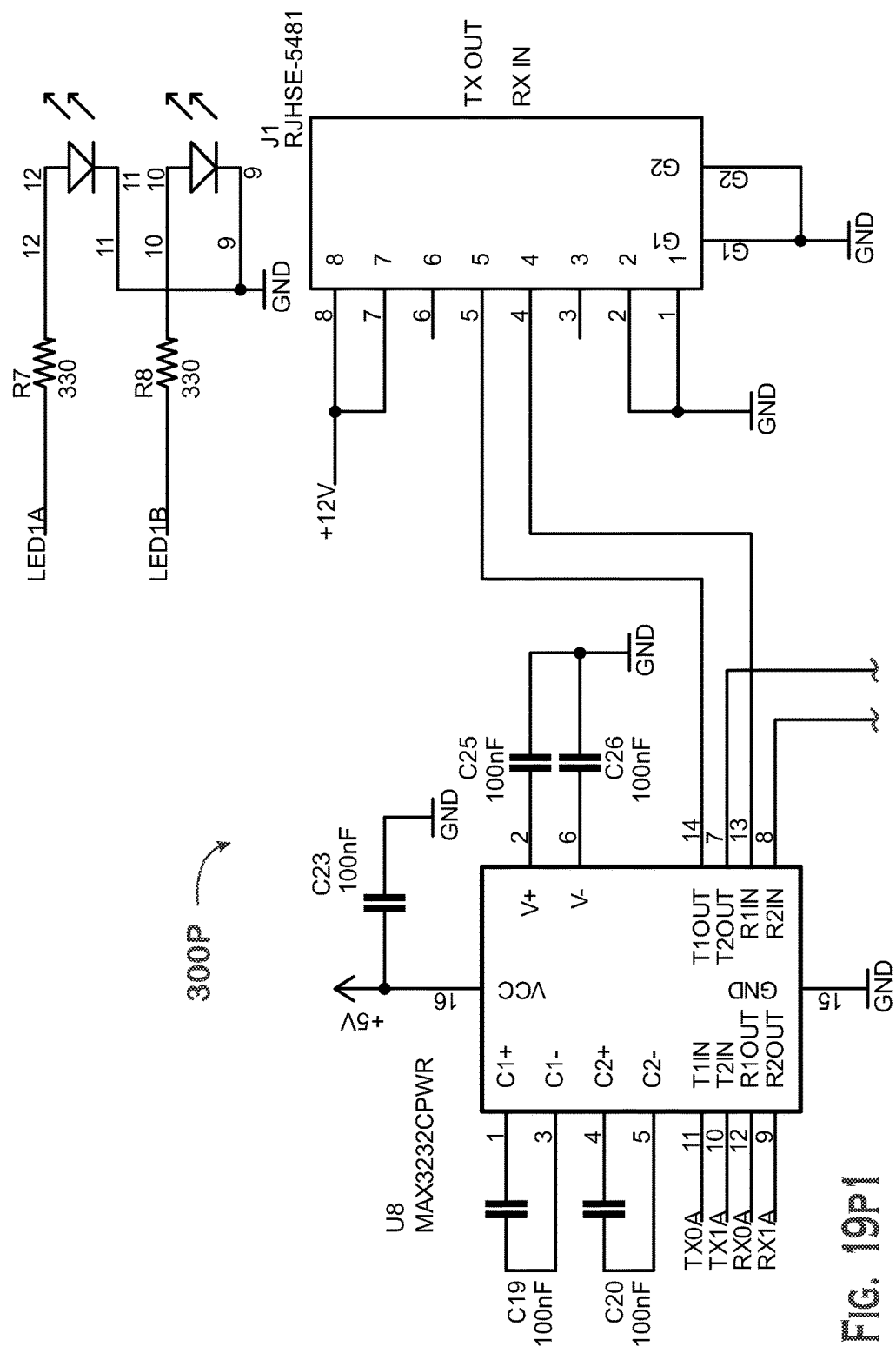
FIG. 19P1

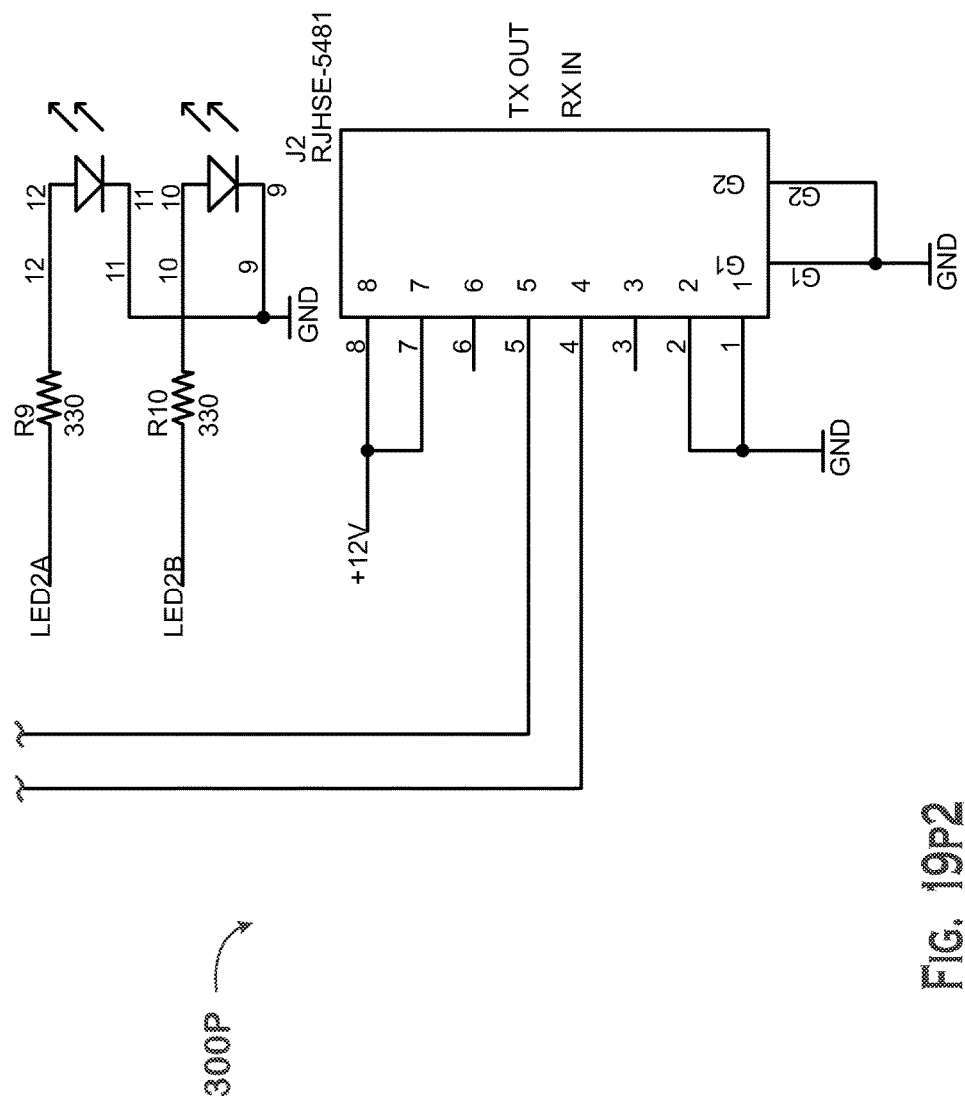
FIG. 19P2

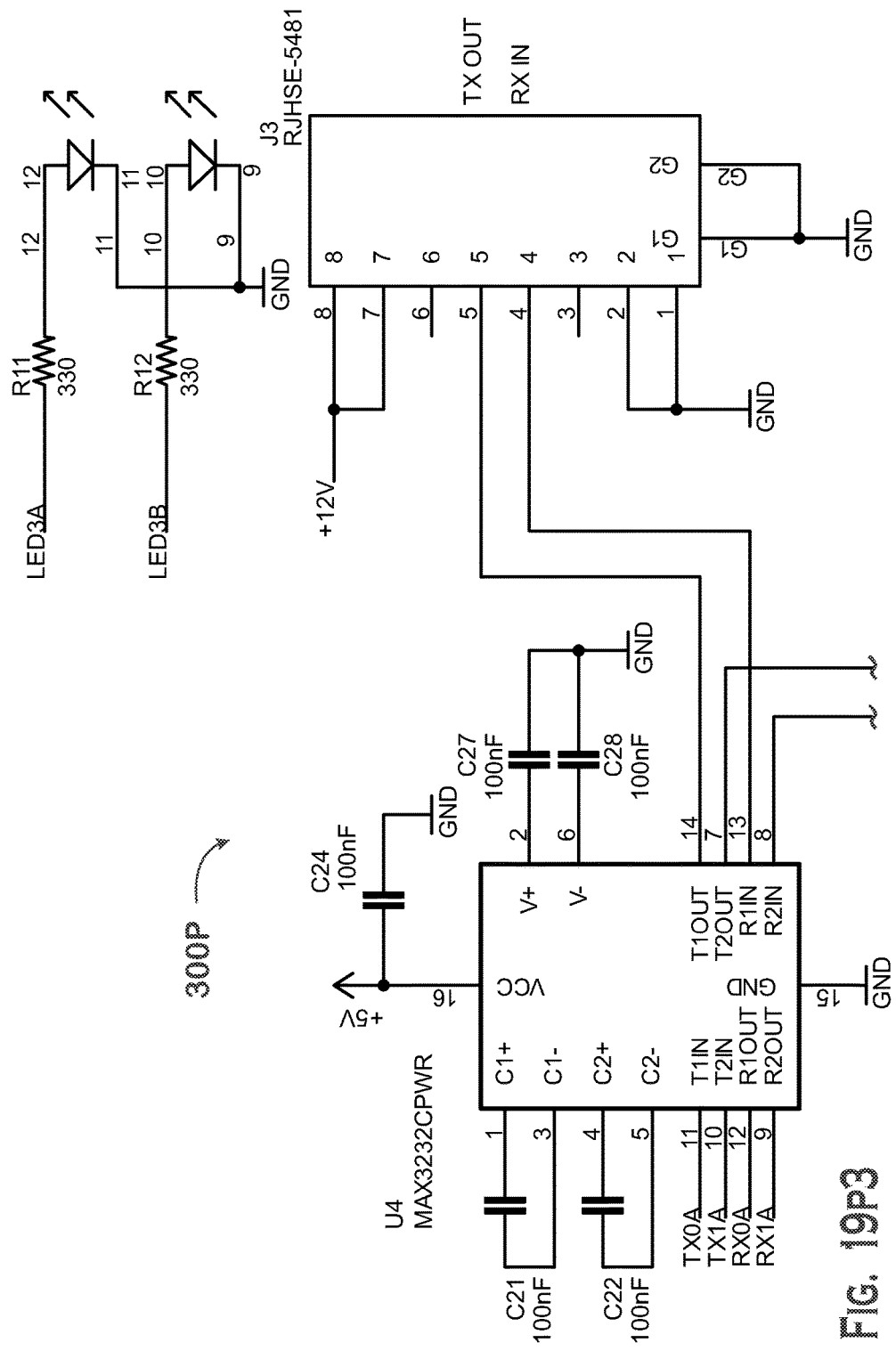
FIG. 19P3

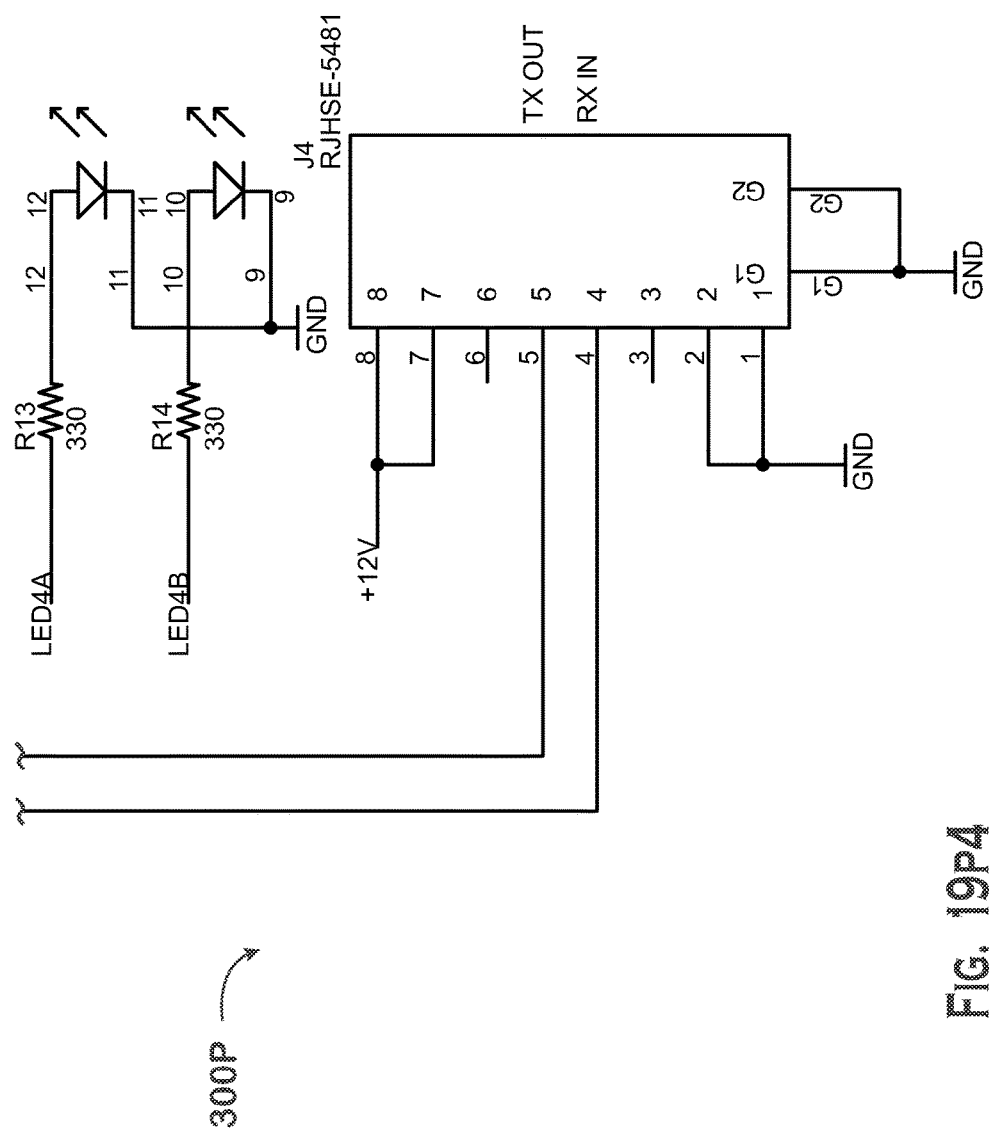
FIG. 19P4

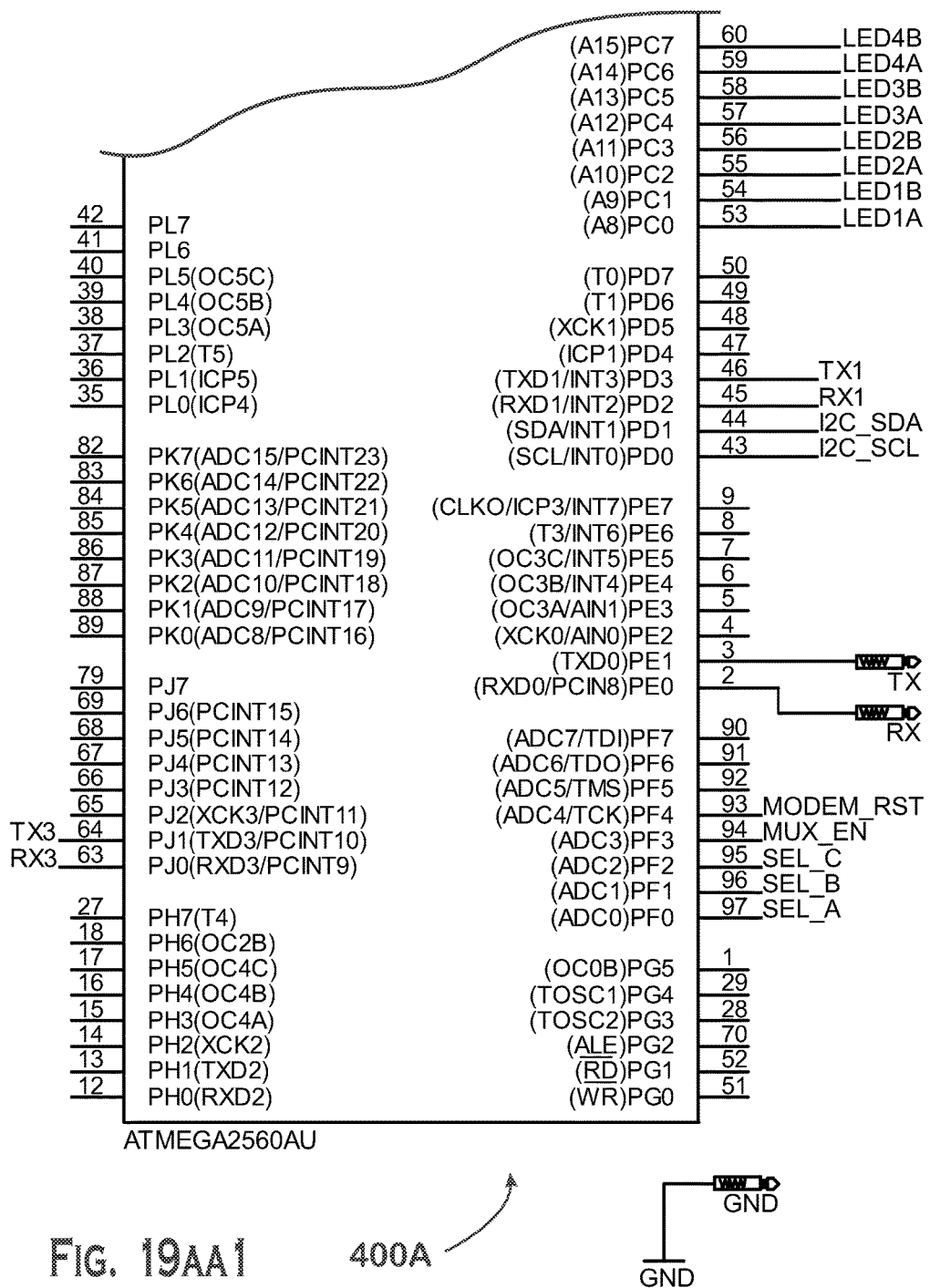
FIG. 19AA1   400A

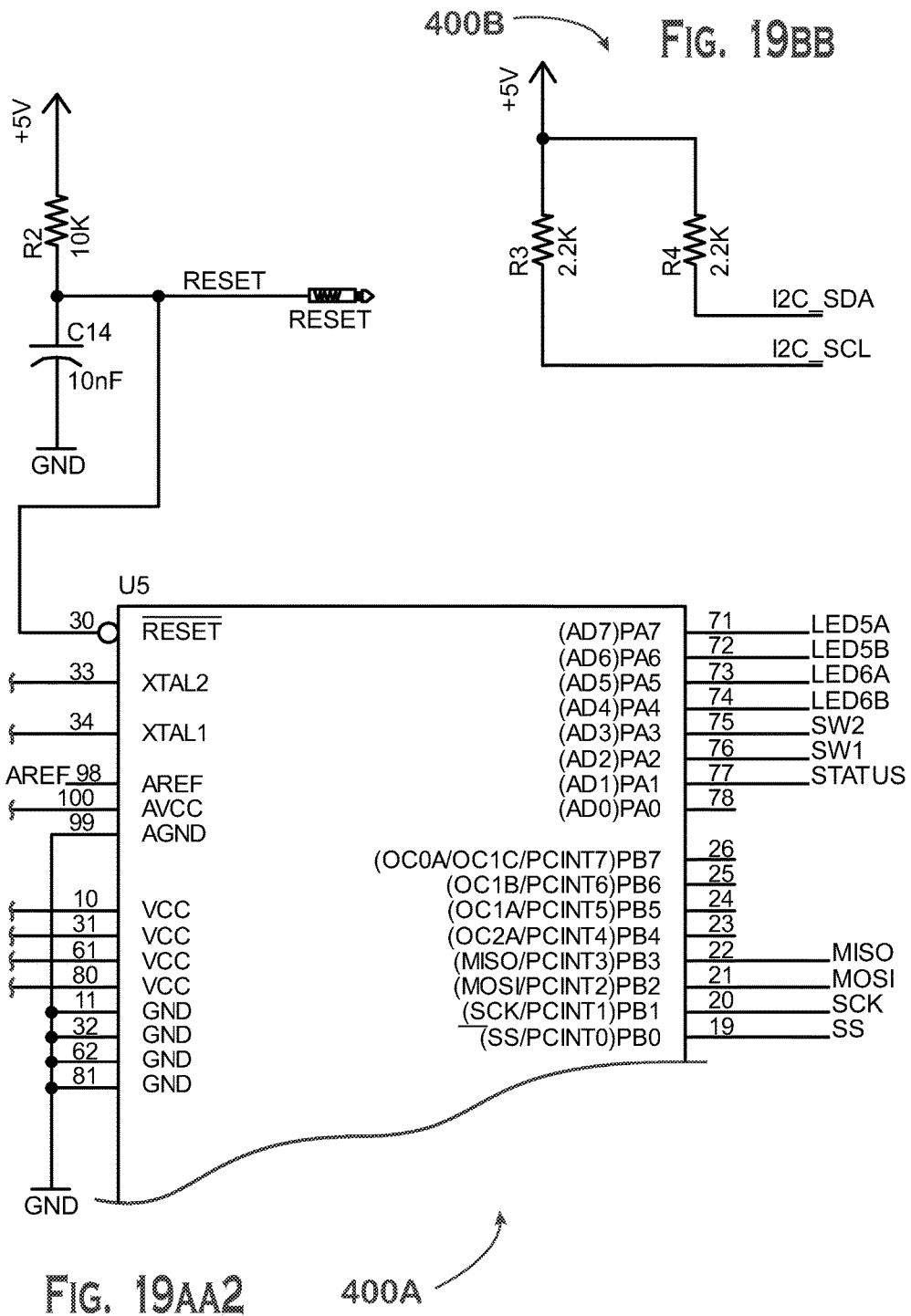

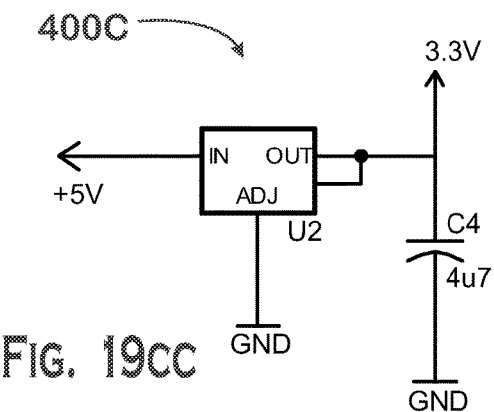
FIG. 19CC
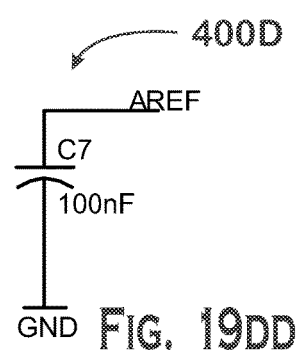
FIG. 19DD
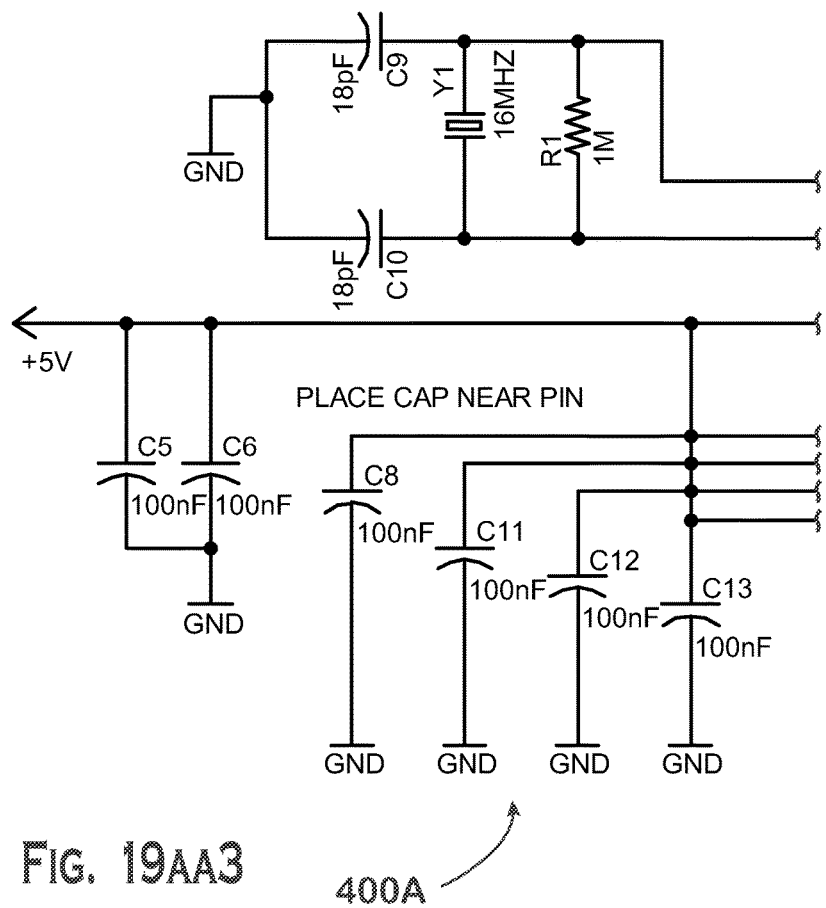
FIG. 19AA3

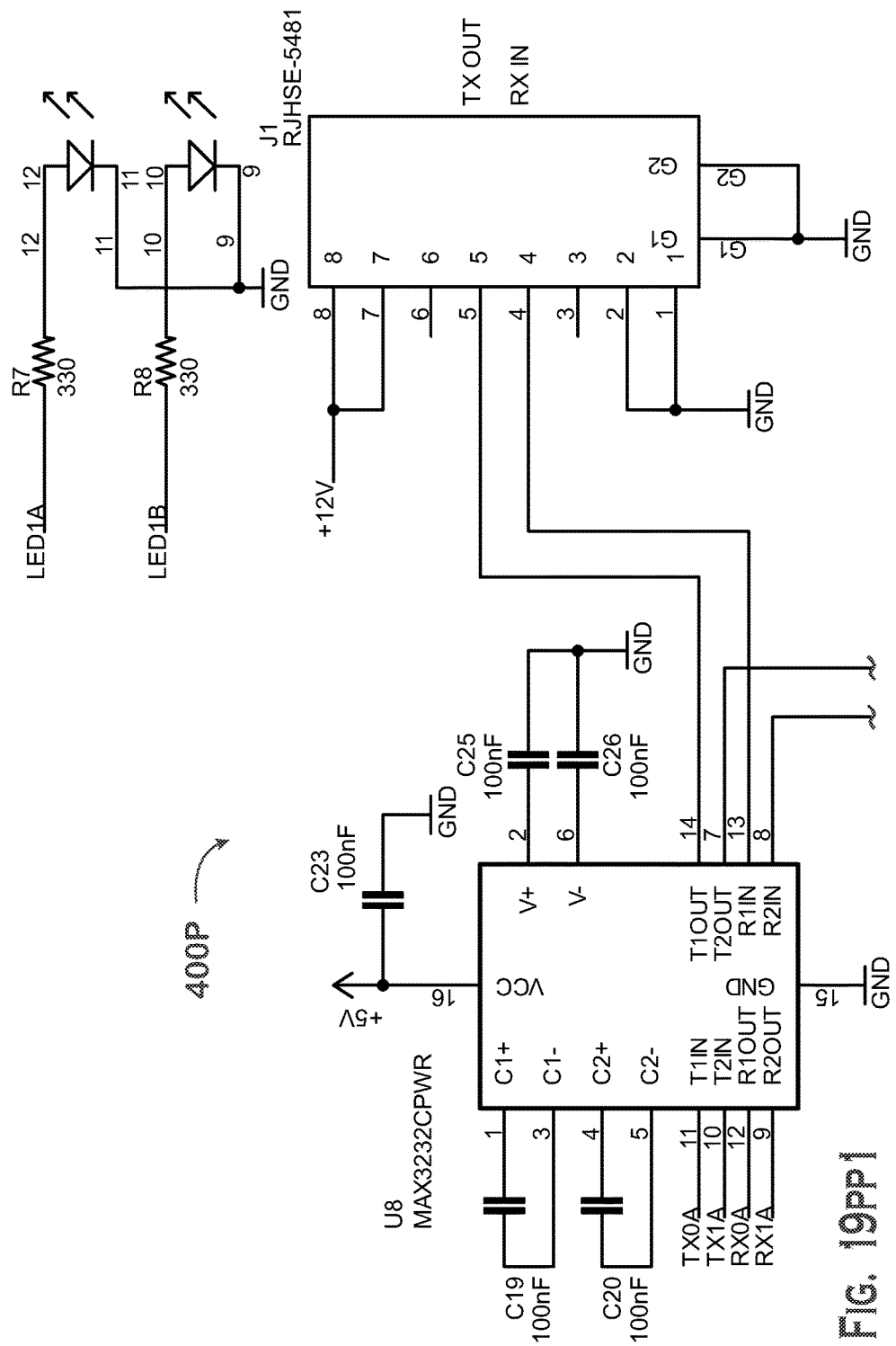
FIG. 19PPI

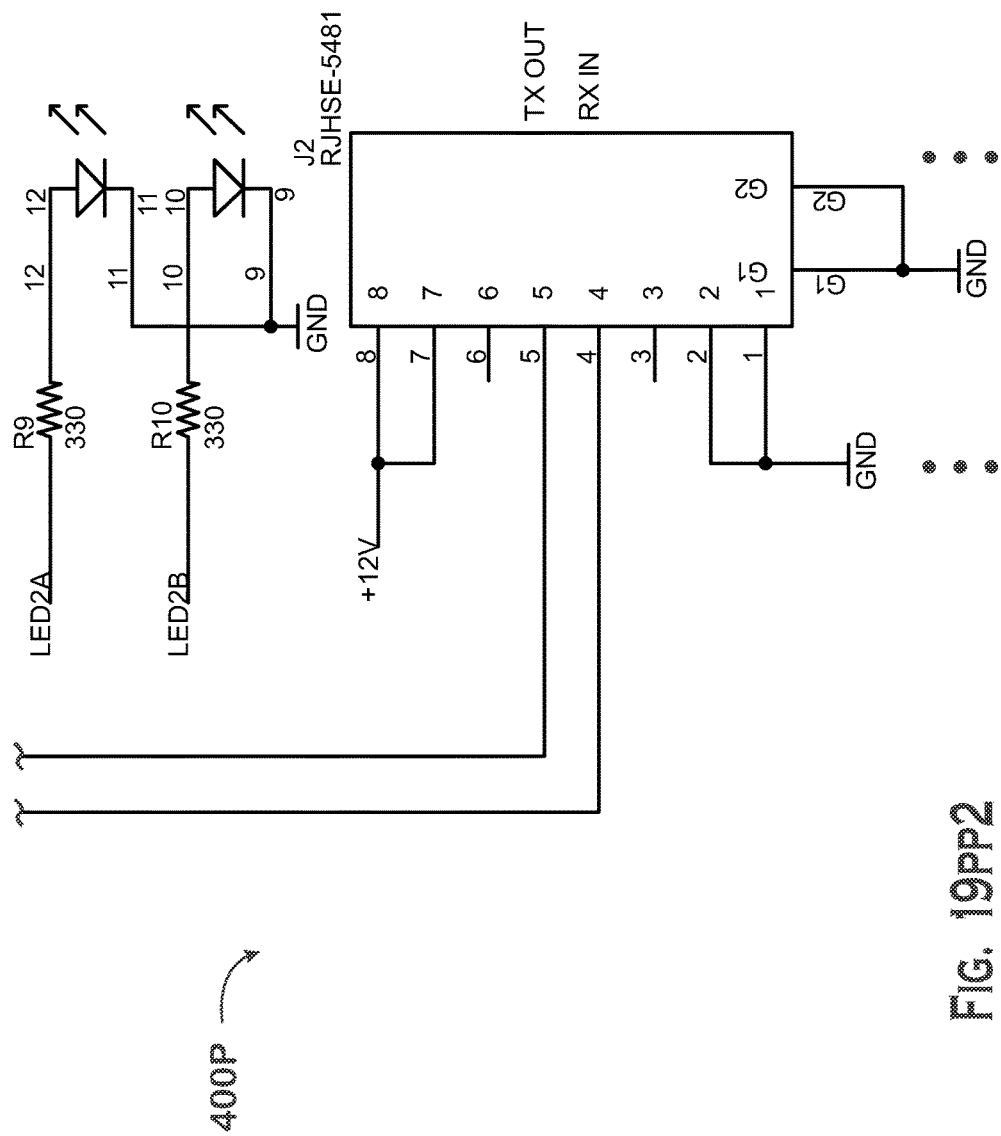
FIG. 19PP2

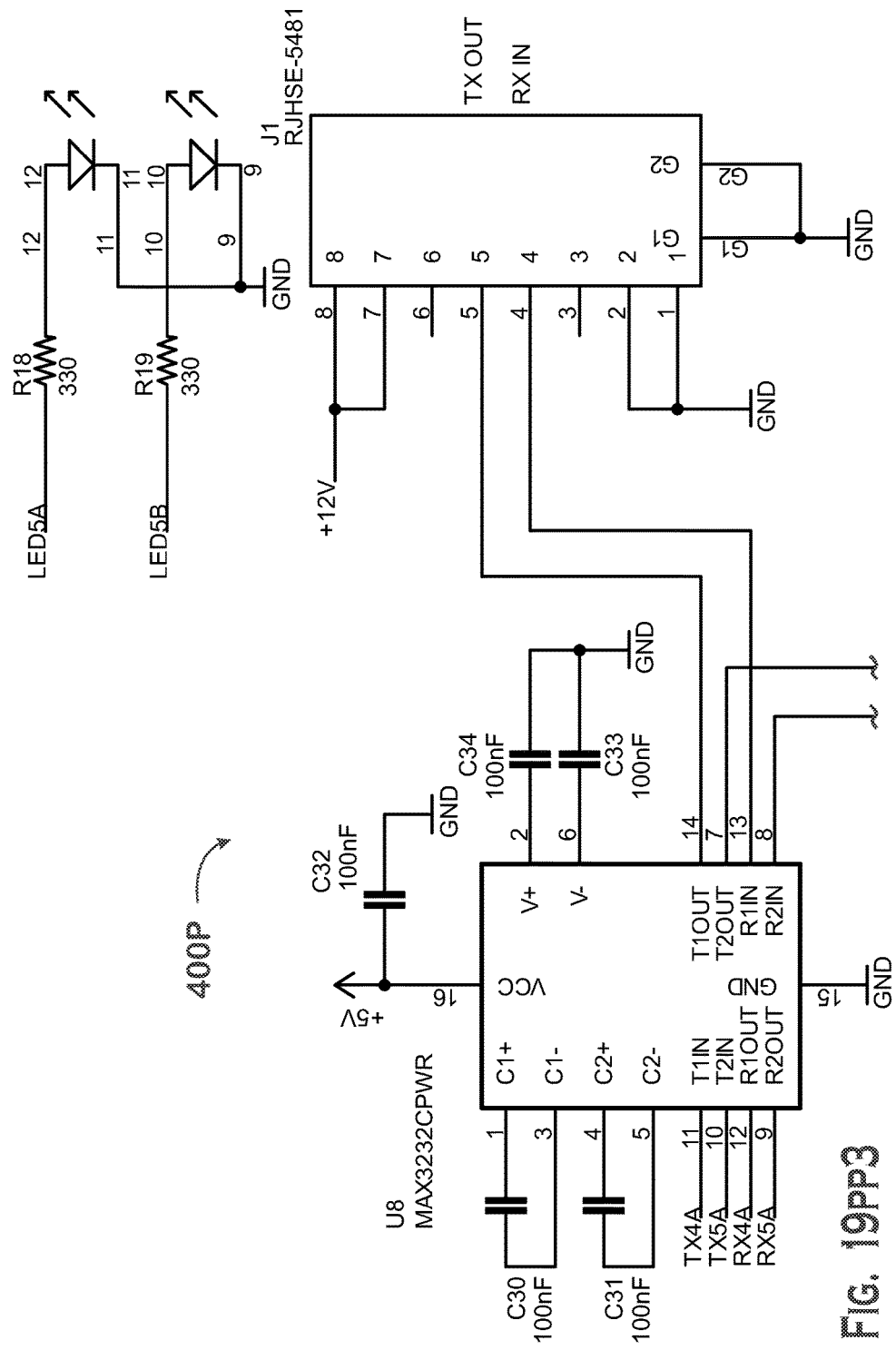
FIG. 19pp3

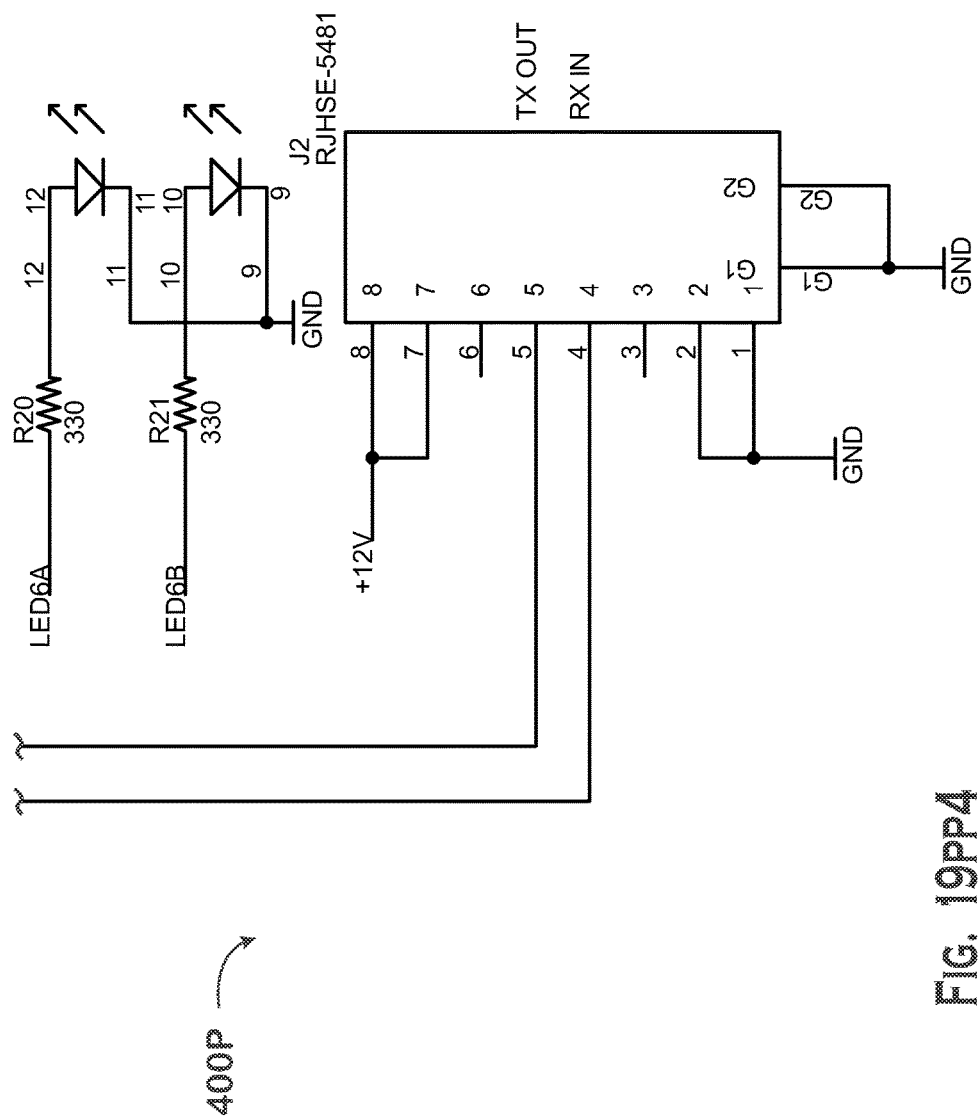
FIG. 19PP4

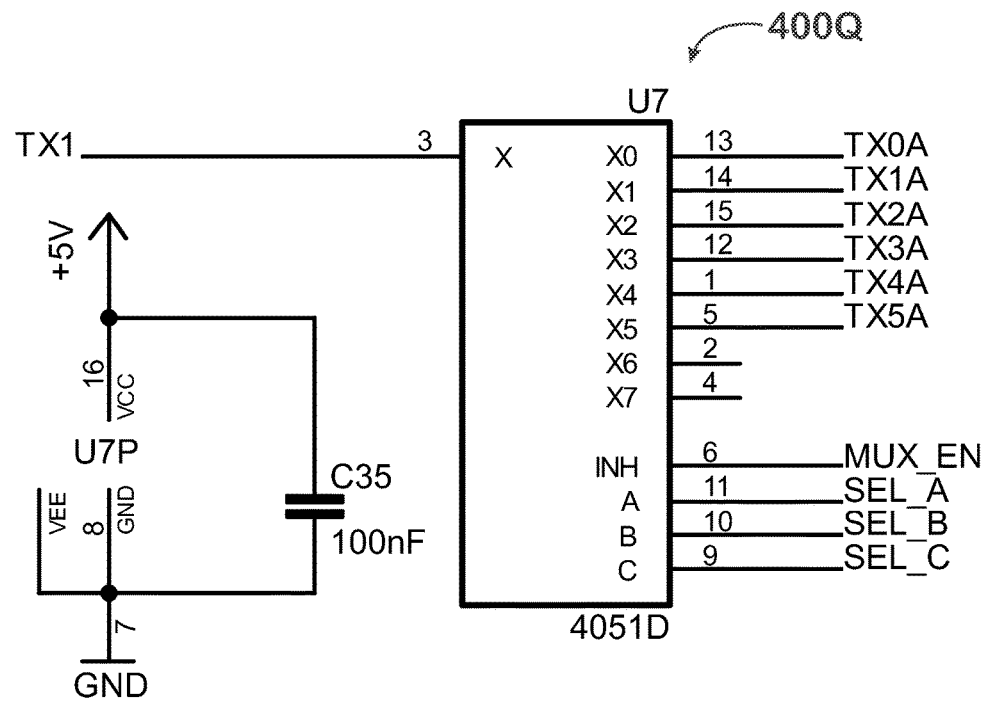
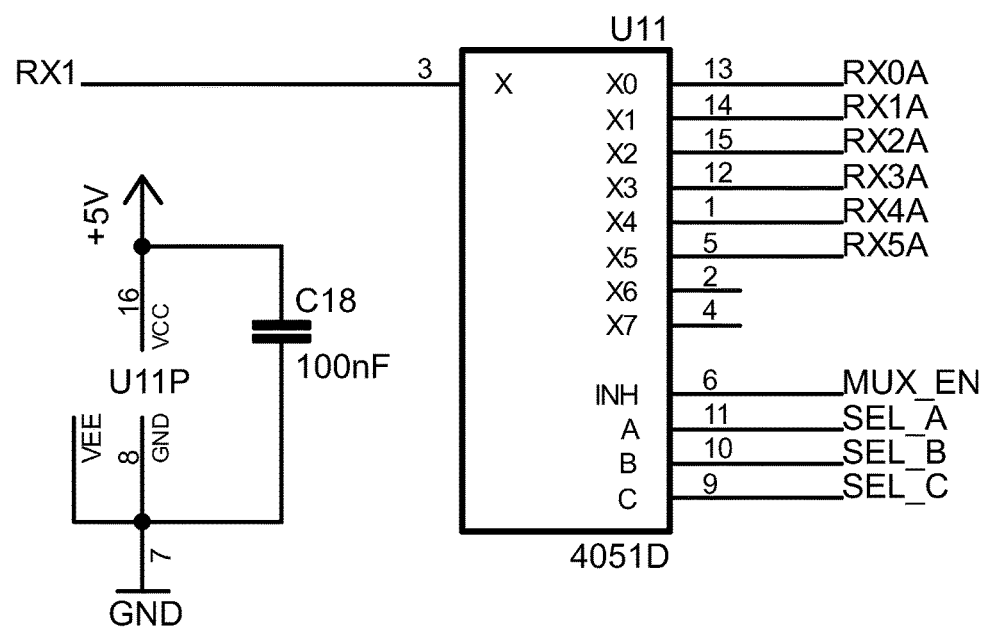
Fig. 19QQ

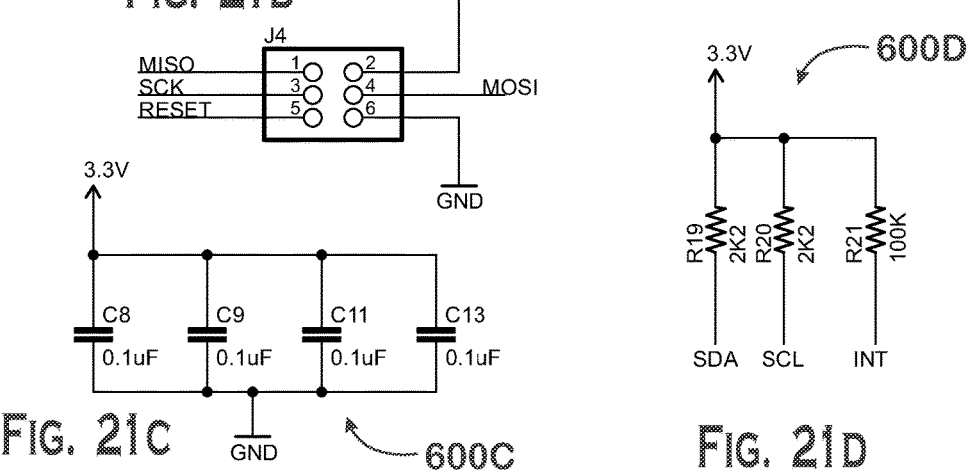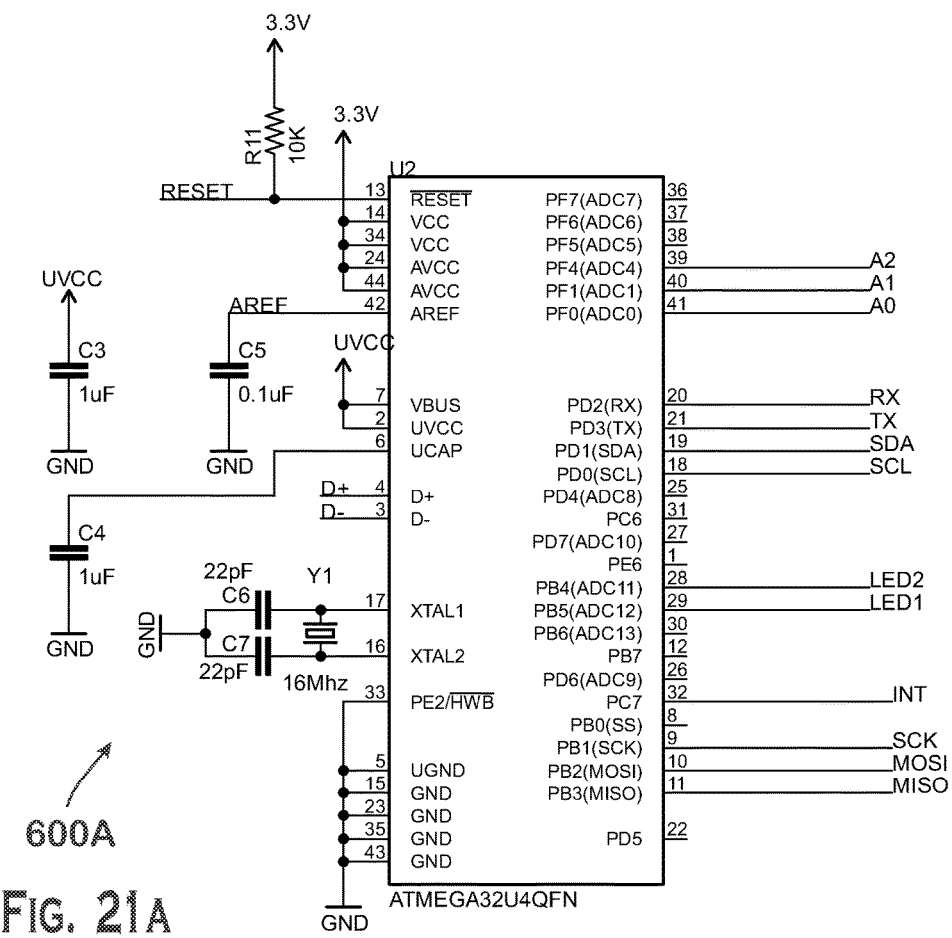

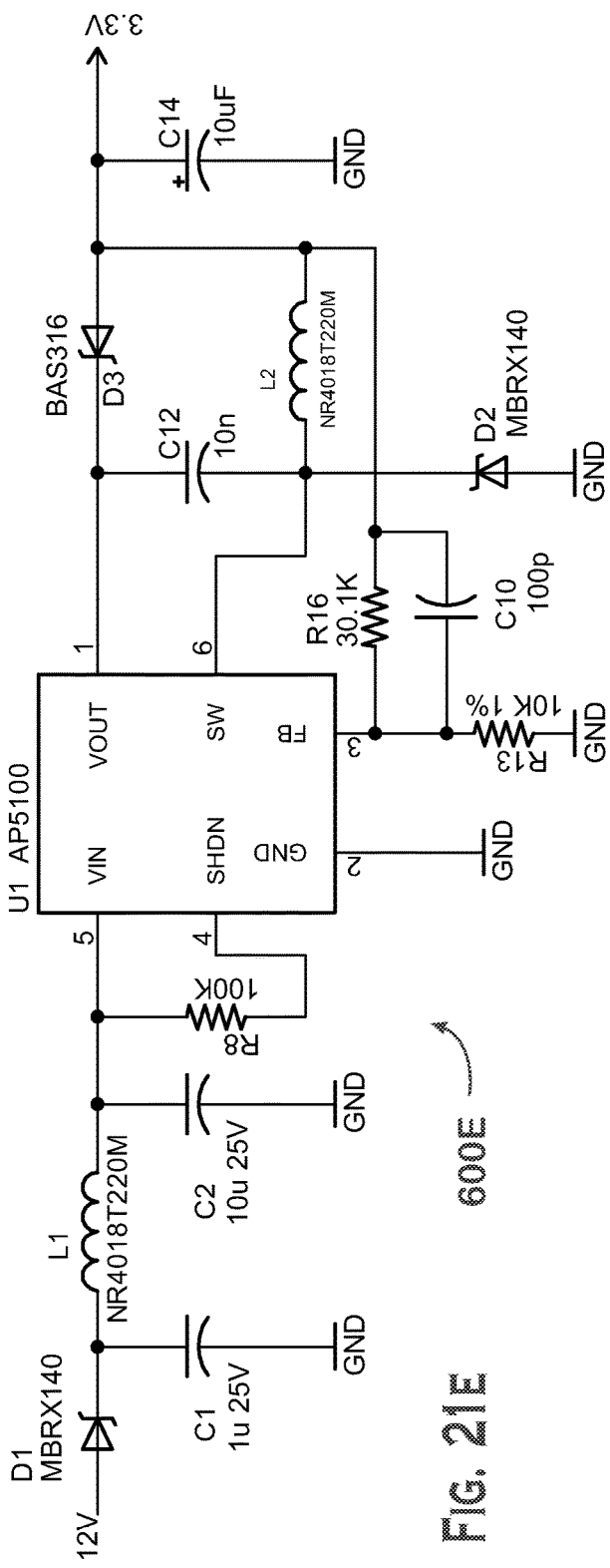
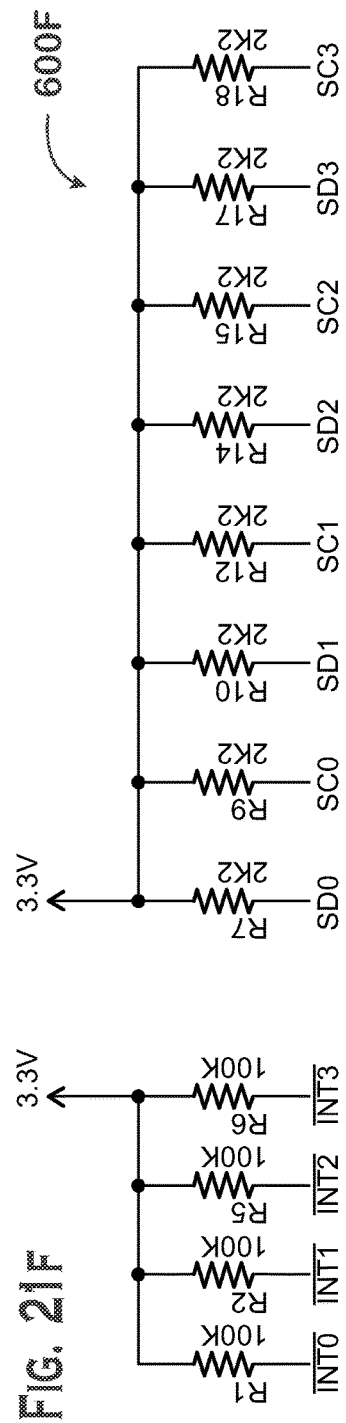
FIG. 21E
FIG. 21F

APPARATUS AND METHOD FOR DETERMINING THE DEPTH OF LIQUID IN A DRUM

CROSS-REFERENCE TO RELATED APPLICATIONS

This application claims priority to and benefit of the following patent applications: (1) U.S. Provisional Patent Application 61/954,725, filed Mar. 18, 2014; (2) U.S. Provisional Patent Application 61/932,334, filed Jan. 28, 2014; and (3) U.S. patent application Ser. No. 14/556,913; each of which is hereby incorporated by reference in its entirety as if fully set forth herein. This application claims priority to and is a continuation of the following patent applications: (1) U.S. patent application Ser. No. 14/474,626, filed Sep. 2, 2014; (2) U.S. patent application Ser. No. 14/474,663, filed Sep. 2, 2014; (3) U.S. patent application Ser. No. 14/474,698, filed Sep. 2, 2014; and (4) U.S. patent application Ser. No. 14/474,734, filed Sep. 2, 2014; each of which is also hereby incorporated by reference in its entirety as if fully set forth herein.

BACKGROUND

The present invention is generally directed to sensors and, more specifically, to sensors adapted to determine the depth of liquid in a drum.

It may be advantageous to provide a sensor that is preferably: simple to manufacture, relatively inexpensive to manufacture, relatively reliable, relatively easy to install, capable of determining the depth of liquid in a drum, capable of determining the volume of liquid in a drum, capable of knowing when liquid is being withdrawn from the drum instead of a non withdrawal event, capable of monitoring withdrawals over time and detecting trends or deviations from the norm so that gradual malfunctions or changes in use can be detected, and/or capable of sending alerts if the volume of liquid withdrawn from the drum is less than a predetermined volume.

SUMMARY

Briefly speaking, one embodiment of the present invention is directed to a sensor apparatus for measuring a depth of a liquid in a drum. The sensor apparatus includes a tube that has first and second ends. The second end is configured for placement within the liquid. A seal is positioned in the tube and spaced from the second end. A first sensor is disposed in the tube between the seal and the second end and is configured to measure air pressure in the tube. The tube has an opening that allows liquid in the drum to partially fill the tube. A processor is in electronic communication with the first sensor. A second sensor is in electronic communication with the processor and is configured to measure atmospheric pressure outside of the drum. An outer tube is disposed over the tube, and, has third and fourth ends. The outer tube is configured to withdraw liquid from the drum when the sensor apparatus is inserted into a hole in a top of the drum. The processor is configured to automatically determine the depth of the liquid in the drum, according to: $H=(P_b-P_a)/(PPIC*SG_{liquid})$. $P_b$ is the pressure in the drum at the opening of the tube as measured by the first sensor. $P_a$ is the atmospheric pressure outside the drum as measured by the second sensor. $SG_{liquid}$ is the specific gravity of the liquid inside the drum. H is the depth, or height, of the liquid inside the drum generally above the opening in the tube. PPIC is determined by $((H-TUBE_{liquidinches})*249.17)/H)$. $TUBE_{liquidinches}$ is the height of liquid in the tube above the opening. And 249.17 is the standard pressure exerted by a one inch column of water. The processor is further configured to automatically determine a volume of the liquid in the drum while taking into account any adjustment needed due to the presence of the sensor apparatus therein. By using the depth of the liquid in the drum and dimensions of the drum to determine an initial volume of liquid in the drum, the processor automatically adjusts the initial volume of the liquid in the drum to get a final volume of liquid in the drum that takes into account the volume of the sensor apparatus, according to: Vdrum-final=Vdrum-initial−((H-Dliquid-in-sensor)*A). H is the depth of liquid in the drum generally above the opening in the tube. Vdrum-final is the final volume of liquid in the drum. Vdrum-initial is the initial volume of liquid in the drum. A is a cross sectional area of the tube. Dliquid-in-sensor is the depth of the liquid in the tube determined as follows: Dliquid-in-sensor=(L−(((Pi*Vi/Ti)*(Tf/Pf))/A)). Wherein L is a length of the tube; Pi is the initial pressure in the tube prior to insertion of the tube in the liquid; Vi is the initial volume of the tube that is calculated by the dimensions of the tube; Ti is the initial temperature of air in the tube; Pf is a pressure in the tube when the tube is submerged in the liquid as calculated by the first sensor; and Tf is the final temperature of the air inside the tube when the tube is submerged.

In a separate aspect, one embodiment of the present invention is directed to a sensor apparatus for measuring a depth of a liquid in a drum. The sensor apparatus comprises a tube that has first and second ends. The second end is configured for placement within the liquid. A seal is positioned in the tube and spaced from the second end. A first sensor is disposed in the tube between the seal and the second end and is configured to measure air pressure in the tube. A processor is in electronic communication with the first sensor. A second sensor is in electronic communication with the processor and is configured to measure atmospheric pressure outside of the drum. An outer tube is disposed over the tube, and, has third and fourth ends. The outer tube is configured to withdraw liquid from the drum when the sensor apparatus is inserted into a hole in a top of the drum.

In a separate aspect, one embodiment of the present invention is directed to a sensor apparatus for measuring the depth of a liquid in a drum. The sensor apparatus comprises a tube having first and second ends. The second end is configured for placement within the liquid. A seal is positioned in the tube and spaced from the second end. A first sensor is disposed in the tube between the seal and the second end and is configured to measure atmospheric pressure in the tube. A processor is in electronic communication with the first sensor. A second sensor is configured to measure atmospheric pressure outside of the drum and is in electronic communication with the processor.

In a separate aspect, one embodiment of the present invention is directed to a sensor apparatus for measuring the depth of a liquid in a drum. The sensor apparatus comprises a tube having first and second ends. A first sensor is disposed in the tube and is configured to measure atmospheric pressure in the tube. A processor is in electronic communication with the first sensor.

In a separate aspect, one embodiment of the present invention is directed to a method for providing a system for measuring a depth of a liquid in a drum. The method comprises the steps of: providing a first sensor configured to be located in fluid communication with an inside of the drum, the first sensor is an air pressure sensor generating a first signal corresponding to the pressure of the liquid at a bottom of the drum; providing a at least one software module stored on a non-transitory computer readable storage medium, the software module is configured such that when operating on a processor, the processor is configured to automatically determine the depth of the liquid in the drum based on at least one of the first signal and the second signal; providing a processor having at least one software module thereon; providing a tube including an opening therein, the opening configured to let the liquid in the drum partially fill the tube; the processor is configured to automatically determine the depth of the liquid in the drum according to: $H=(P_b-P_a)/(PPIC*SG_{liquid})$, where $P_b$ is the pressure in the drum at the opening of the tube as measured by the first sensor, $P_a$ is the atmospheric pressure outside the drum as measured by the second sensor, $SG_{liquid}$ is the specific gravity of the liquid inside the drum, H is the depth, or height, of the liquid inside the drum, PPIC is determined by $((H-TUBE_{liquidinches})*249.17)/H)$, where $TUBE_{liquidinches}$ is the height of liquid in the tube above the opening, and 249.17 is the standard pressure exerted by a one inch column of water; the processor is configured to automatically determine a volume of the liquid in the drum while taking into account any adjustment needed due to the presence of the first sensor therein by using the depth of the liquid in the drum and dimensions of the drum to determine an initial volume of liquid in the drum, then the processor automatically adjusts the initial volume of liquid in the drum to get a final volume of liquid in the drum that takes into account the first sensor.

In a separate aspect, one embodiment of the present invention is directed to a method for providing a system for measuring a depth of a liquid in a drum. The method comprises the steps of: providing a first sensor configured to be located in fluid communication with an inside of the drum, the first sensor is an air pressure sensor generating a first signal corresponding to the pressure of the liquid at a bottom of the drum; providing a at least one software module stored on a non-transitory computer readable storage medium, the software module is configured such that when operating on a processor, the processor is configured to automatically determine the depth of the liquid in the drum based on at least one of the first signal and the second signal; providing a processor having at least one software module thereon.

In a separate aspect, one embodiment of the present invention is directed to a method for providing a system for measuring a depth of a liquid in a drum. The method comprises the steps of: providing a first sensor configured to be located in fluid communication with an inside of the drum, the first sensor generating a first signal corresponding to the pressure of the liquid at a bottom of the drum; providing a second sensor configured to be in fluid communication with ambient atmosphere outside of the drum, the second sensor generating a second signal corresponding to ambient pressure outside the drum; providing a at least one software module stored on a non-transitory computer readable storage medium, the software module is configured such that when operating on a processor, the processor is configured to automatically determine the depth of the liquid in the drum based on at least one of the first signal and the second signal.

In a separate aspect, one embodiment of the present invention is directed to a method for providing a system for measuring a depth of a liquid in a drum. The method comprises the steps of: providing a first sensor configured to be located in fluid communication with an inside of the drum; providing a second sensor configured to be in fluid communication with ambient atmosphere outside of the drum; providing a at least one software module stored on a non-transitory computer readable storage medium, the software module is configured such that when operating on a processor, the processor is configured to automatically determine the depth of the liquid in the drum based on the measurements of at least one of the first sensor and the second sensor.

In a separate aspect, one embodiment of the present invention is directed to a method for measuring a depth of a liquid in a drum used as part of a system for use in at least one of agricultural, equipment cleaning, and/or animal husbandry. The method comprising the steps of: providing the drum configured to contain the liquid used in the system; providing a first sensor located in fluid communication with an inside of the drum, the first sensor being an air pressure sensor generating a first signal corresponding to the pressure of the liquid at a bottom of the drum; determining the depth of the liquid in the drum based on the first signal; providing at least one software module stored on a non-transitory computer readable storage medium, the software module being configured such that when operating on a processor, the processor is configured to automatically determine the depth of the liquid in the drum based on the first signal; providing a processor including the at least one software module thereon such that the processor automatically determines the depth of liquid in the drum; providing a tube having an opening therein, the opening configured to let the liquid in the drum partially fill the tube; the processor is configured to automatically determine the depth of the liquid in the drum according to: $H=(P_b-P_a)/(PPIC*SG_{liquid})$, where $P_b$ is the pressure in the drum at the opening of the tube as measured by the first sensor, $P_a$ is the atmospheric pressure outside the drum as measured by the second sensor, $SG_{liquid}$ is the specific gravity of the liquid inside the drum, H is the depth, or height, of the liquid inside the drum, PPIC is determined by $((H-TUBE_{liquidinches})*249.17)/H)$, where $TUBE_{liquidinches}$ is the height of liquid in the tube above the opening, and 249.17 is the standard pressure exerted by a one inch column of water; the processor further being configured to automatically determine a volume of the liquid in the drum and taking into account any adjustment needed due to the presence of the first sensor therein by using the depth of the liquid in the drum and dimensions of the drum to determine an initial volume of liquid in the drum, then the processor automatically adjusts the initial volume of liquid in the drum to get a final volume of liquid in the drum that takes into account the first sensor.

In a separate aspect, one embodiment of the present invention is directed to a method for measuring a depth of a liquid in a drum used as part of a system for use in at least one of agricultural, equipment cleaning, and animal husbandry. The method comprising the steps of: providing the drum configured to contain the liquid used in the system; providing a first sensor located in fluid communication with an inside of the drum, the first sensor being an air pressure sensor generating a first signal corresponding to the pressure of the liquid at a bottom of the drum; determining the depth of the liquid in the drum based on the first signal; providing at least one software module stored on a non-transitory computer readable storage medium, the software module being configured such that when operating on a processor, the processor is configured to automatically determine the depth of the liquid in the drum based on the first signal; providing a processor including the at least one software module thereon such that the processor automatically determines the depth of liquid in the drum.

In a separate aspect, one embodiment of the present invention is directed to a method for measuring a depth of a liquid in a drum used as part of a system for use in at least one of agricultural, equipment cleaning, and/or animal husbandry. The method comprising the steps of: providing the drum configured to contain the liquid used in the system; providing a first sensor located in fluid communication with an inside of the drum, the first sensor generating a first signal corresponding to the pressure of the liquid at a bottom of the drum; providing a second sensor in fluid communication with ambient atmosphere outside of the drum, the second sensor generating a second signal corresponding to ambient pressure outside the drum; determining the depth of the liquid in the drum based on the first signal.

In a separate aspect, one embodiment of the present invention is directed to a method for measuring a depth of a liquid in a drum used as part of a dairy wash system. The method comprising the steps of: providing the drum configured to contain the liquid used in the system; providing a first sensor located in fluid communication with an inside of the drum, the first sensor generating a first signal corresponding to the pressure of the liquid at a bottom of the drum; providing a second sensor in fluid communication with ambient atmosphere outside of the drum, the second sensor generating a second signal corresponding to ambient pressure outside the drum; determining the depth of the liquid in the drum based on the first signal; the dairy wash system performing a predetermined number of washes, the dairy wash system only withdrawing liquid from the drum during a wash; the processor being configured to collect a plurality of usage data comprising at least one of a time, a temperature of liquid withdrawn from the drum, and a volume of liquid withdrawn from the drum; the processor being configured to compare the plurality of usage data against a plurality of predetermined data and issue an alert when a discrepancy occurs.

In a separate aspect, one embodiment of the present invention is directed to a method for measuring a depth of a liquid in a drum used as part of a dairy wash system. The method comprising the steps of: providing the drum configured to contain the liquid used in the system; providing a first sensor located in fluid communication with an inside of the drum, the first sensor generating a first signal corresponding to the pressure of the liquid at a bottom of the drum; providing a second sensor in fluid communication with ambient atmosphere outside of the drum, the second sensor generating a second signal corresponding to ambient pressure outside the drum; determining the depth of the liquid in the drum based on the first signal; the processor being configured to collect a plurality of usage data comprising at least one of a time, a temperature of liquid withdrawn from the drum, and a volume of liquid withdrawn from the drum; the processor being configured to compare the plurality of usage data against a plurality of predetermined data and issue an alert when a discrepancy occurs.

In a separate aspect, one embodiment of the present invention is directed to a method for measuring a depth of a liquid in a drum used as part of a dairy wash system. The method comprising the steps of: providing the drum configured to contain the liquid used in the system; providing a first sensor located in fluid communication with an inside of the drum, the first sensor generating a first signal corresponding to the pressure of the liquid at a bottom of the drum; providing a second sensor in fluid communication with ambient atmosphere outside of the drum, the second sensor generating a second signal corresponding to ambient pressure outside the drum; determining the depth of the liquid in the drum based on the first signal; the processor being configured to compare a plurality of data collected on the liquid in the drum against a plurality of predetermined data and issue an alert when a discrepancy occurs.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor generating a first signal corresponding to the pressure of the liquid at a bottom of the drum; providing a tube including an opening that is configured to let liquid in the drum partially fill the tube; providing at least one software module stored on a non-transitory computer readable storage medium, the software module being configured such that when operating on a processor, the processor is configured to automatically determine the depth of the liquid in the drum based on the first signal and to automatically determine whether a liquid withdrawal has occurred or whether changes in the first signal represent a non withdrawal event; providing a processor including the at least one software module thereon, the processor receiving the first signal and automatically determining the depth of the liquid in the drum and automatically determining whether a liquid withdrawal has occurred or whether changes in the first signal represent a non withdrawal event; wherein the processor is configured to automatically determine the depth of the liquid in the drum according to: $H=(P_b-P_a)/(PPIC*SG_{liquid})$, where $P_b$ is the pressure in the drum at the opening of the tube as measured by the first sensor, $P_a$ is the atmospheric pressure outside the drum as measured by the second sensor, $SG_{liquid}$ is the specific gravity of the liquid inside the drum, H is the depth, or height, of the liquid inside the drum, PPIC is determined by $((H-TUBE_{liquidinches})*249.17)/H$, where $TUBE_{liquidinches}$ is the height of liquid in the tube above the opening, and 249.17 is the standard pressure exerted by a one inch column of water; the processor further being configured to automatically determine a volume of the liquid in the drum and take into account any adjustment needed due to the presence of the system therein by using the depth of the liquid in the drum and dimensions of the drum to determine an initial volume of liquid in the drum, then the processor automatically adjusts the initial volume of liquid in the drum to get a final volume of liquid in the drum that takes into account the system.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor being an air pressure sensor generating a first signal corresponding to the pressure of the liquid at a bottom of the drum; providing at least one software module stored on a non-transitory computer readable storage medium, the software module being configured such that when operating on a processor, the processor is configured to automatically determine the depth of the liquid in the drum based on at least one of the first signal and the second signal and to automatically determine whether a liquid withdrawal has occurred or whether changes in the first signal represent a non withdrawal event; providing a processor including the at least one software module thereon, the processor receiving the first signal and automatically determining the depth of the liquid in the drum and automatically determining whether a liquid withdrawal has occurred or whether changes in the first signal represent a non withdrawal event.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor generating a first signal corresponding to the pressure of the liquid at a bottom of the drum; providing a second sensor configured to be in fluid communication with ambient atmosphere outside of the drum, the second sensor generating a second signal corresponding to ambient pressure outside the drum; providing at least one software module stored on a non-transitory computer readable storage medium, the software module being configured such that when operating on a processor, the processor is configured to automatically determine the depth of the liquid in the drum based on at least one of the first signal and the second signal and to automatically determine whether a liquid withdrawal has occurred or whether changes in the first signal represent a non withdrawal event.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor being an air pressure sensor generating a first signal corresponding to the pressure of the liquid at a bottom of the drum; providing a second sensor configured to be in fluid communication with ambient atmosphere outside of the drum, the second sensor being an air pressure sensor generating a second signal corresponding to ambient pressure outside the drum; providing at least one software module stored on a non-transitory computer readable storage medium, the software module being configured such that when operating on a processor, the processor is configured to automatically determine the depth of the liquid in the drum based on at least one of the first signal and the second signal and to automatically determine whether a liquid withdrawal has occurred or whether changes in the first signal represent a non withdrawal event; generating the first signal at a predetermined interval and the second sensor generating the second signal at the predetermined interval; the processor being configured to compile a report, the report being an average of the plurality of readings over a predetermined time; the processor being configured to store at least three of the reports, the at least three reports being the newest at least three reports compiled; the processor being configured to determine a pressure difference between at least two of the reports; the processor being configured to recognize the liquid withdrawal when the pressure difference between at least two of the reports is greater than a predetermined pressure; the processor being configured to determine a volume of the liquid withdrawn in the liquid withdrawal by analyzing the total pressure difference.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor being an air pressure sensor generating a first signal corresponding to the pressure of the liquid at a bottom of the drum; providing a second sensor configured to be in fluid communication with ambient atmosphere outside of the drum, the second sensor being an air pressure sensor generating a second signal corresponding to ambient pressure outside the drum; generating the first signal at a predetermined interval and the second sensor generating the second signal at the predetermined interval; providing a processor being configured to compile a report, the report being an average of the plurality of readings over a predetermined time; the processor being configured to store at least three of the reports, the at least three reports being the newest at least three reports compiled; the processor being configured to determine a pressure difference between at least two of the reports; the processor being configured to recognize a liquid withdrawal when the pressure difference between at least two of the reports is greater than a predetermined pressure; the processor being configured to determine a volume of the liquid withdrawn in the liquid withdrawal by analyzing the total pressure difference.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor being an air pressure sensor generating a first signal corresponding to the pressure of the liquid at a bottom of the drum; providing a second sensor configured to be in fluid communication with ambient atmosphere outside of the drum, the second sensor being an air pressure sensor generating a second signal corresponding to ambient pressure outside the drum; providing a processor configured to recognize a liquid withdrawal when a change in pressure is greater than a predetermined amount; the processor being configured to determine a volume of the liquid withdrawn in the liquid withdrawal by analyzing the total pressure difference.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor being an air pressure sensor generating a first signal corresponding to the pressure of the liquid at a bottom of the drum; providing a processor configured to recognize a liquid withdrawal when a change in pressure is greater than a predetermined amount; the processor being configured to determine a volume of the liquid withdrawn in the liquid withdrawal by analyzing the total pressure difference.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor generating a first signal corresponding to the pressure of the liquid at a bottom of the drum; providing at least one software module stored on a non-transitory computer readable storage medium, the software module being configured such that when operating on a processor, the processor is configured to automatically determine the depth of the liquid in the drum based on the first signal and to automatically determine whether a liquid withdrawal has occurred or whether changes in the first signal represent a non withdrawal event; providing a processor including the at least one software module thereon, the processor receiving the first signal and automatically determining the depth of the liquid in the drum and automatically determining whether a liquid withdrawal has occurred or whether changes in the first signal represent a non withdrawal event.

In a separate aspect, one embodiment of the present invention is directed to a method for providing a system for measuring a depth of a liquid in a drum. The method comprising the steps of: providing a first sensor configured to be located in fluid communication with an inside of the drum, the first sensor generating a first signal corresponding to the pressure of the liquid at a bottom of the drum; providing at least one software module stored on a non-transitory computer readable storage medium, the software module being configured such that when operating on a processor, the processor is configured to automatically determine the depth of the liquid in the drum based on the first signal and to automatically determine whether a liquid withdrawal has occurred or whether changes in the first signal represent a non withdrawal event In a separate aspect, one embodiment of the present invention is directed to a method for providing a system for measuring a depth of a liquid in a drum. The method comprising the steps of: receiving data corresponding to the pressure of the liquid at a bottom of the drum; automatically determining the depth of the liquid in the drum based on the data and automatically determining whether a liquid withdrawal has occurred or whether changes in the data represent a non withdrawal event.

In a separate aspect, one embodiment of the present invention is directed to providing at least one software module stored on a non-transitory computer readable storage medium, the software module containing instructions operable on a processor for automatically determining the depth of the liquid in a drum and to automatically determining whether a liquid withdrawal has occurred or whether a non withdrawal event has occurred.

BRIEF DESCRIPTION OF THE DRAWINGS

The foregoing summary, as well as the following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 3 is a front view of the sensor apparatus of FIG. 2 including the outer tube; the tube may have an outer tube disposed over the tube; the outer tube having third and fourth ends and configured to withdraw the liquid from the drum when the sensor apparatus is inserted into the hole in the top of the drum; at least a portion of the tube may protrude from the fourth end of the outer tube so that withdrawal of the liquid from the drum via the outer tube does not create suction that seals the outer tube to a bottom of the drum; instead of a hose being inserted into the drum, the hose may be located on the outer tube and in fluid communication therewith such that liquid withdrawn from the drum via the outer tube then traverses the hose; having the hose on the outer tube reduces the number of steps needed to transfer the sensor apparatus and hose to another drum since the hose and the sensor apparatus are connected; the container that holds the second sensor and that is located on the first end of the tube may also form a second seal between the outer tube and the tube, and, the third end of the outer tube and the atmosphere; a first area defined by an axial cross section of the fourth end of the outer tube may be greater than a second area defined by an axial cross section of the third end of the outer tube; at least one device may be located within the fourth end and is configured to prevent the liquid in the outer tube from exiting the sensor apparatus between the tube and the outer tube via the fourth end when the sensor apparatus is withdrawn from the liquid in the drum; the at least one device may not prevent liquid from entering the outer tube through the fourth end; the second end of the tube may be located off-center in the fourth end of the outer tube in order to provide additional room for the operation of the at least one device; the at least one device may be a duck bill valve, although, those of ordinary skill in the art will recognize that the at least one device may be any other suitable device without departing from the scope of the invention;

FIG. 4 is a cross sectional view of FIG. 3 taken along the line 4-4; the cross section of the second end of the tube and the at least one device can be seen within the fourth end of the sensor apparatus;

FIGS. 7A and 7B are a flow chart showing a preferred method used by the processor for an equipment wash on a dairy farm; however, those of ordinary skill in the art will recognize that the method may be used for any agricultural, equipment wash, or animal husbandry system without departing from the preferred embodiment; the processor is preferably configured to determine when a washing cycle has started and ended by first determining if the temperature recorded by a temperature sensor on a milk line has risen a predetermined number of degrees in a predetermined time period, therefore, meaning that the milking of cows is over; if the processor has determined that the temperature of the milk line has risen a predetermined number of degrees within a predetermined time period, the processor is preferably configured to start storing readings of the pressure measured by at least one sensor apparatus; preferably, the processor is further configured to start compiling reports for each sensor apparatus; preferably, the processor is preferably configured to store the newest of at least two reports for every liquid used in the washing cycle; more preferably, the processor is configured to store the newest of at least three reports for every liquid used in the washing cycle; more preferably still, the processor is configured to store the newest five reports for every liquid used in the washing cycle; preferably, the processor is further configured to analyze the stored reports for each liquid; preferably, the processor determines whether a liquid withdrawal has started in any of the liquids used in the washing cycle; if so, the processor is preferably configured to determine that a withdrawal of the respective liquid has just started; if not, the processor preferably starts the determination again when a new report is compiled; preferably, the processor is configured to determine a wash cycle has begun when the processor determines that the first withdrawal of any of the liquids; preferably, the processor preferably records the time that the processor determined a washing cycle has started, and, the number of washing cycles performed each day; after a liquid withdrawal has occurred for any of the liquids, the processor preferably is configured to determine when the liquid withdrawal has ended for the same liquid; after determining a liquid withdrawal for a particular liquid has ended, the processor is preferably configured to immediately determine the pressure drop of the liquid at the bottom of the drum; subsequently, the processor is preferably configured to determine the order that each liquid's withdrawal ended; after the processor determines that a withdrawal has started on at least one liquid, the processor may be configured to start a timer such that if the processor fails to determine that the liquid withdrawal has ended for all liquids within a predetermined length of time, the processor may reverse its determination that a withdrawal has taken place; after a liquid withdrawal for each liquid has ended, and, the order in which the liquids were withdrawn has been determined, the processor is preferably configured to perform another check to ensure a washing cycle, and liquid withdrawals, have indeed taken place; the check preferably includes the processor configured to determine if at least four of following have occurred: the processor has determined a wash cycle has started, the order in which the processor determined the liquid withdrawals occurred matches the order in which the liquids are to be withdrawn that was entered into the processor, if the pressure at the bottom of each drum has dropped by thirty or more Pascal's, if the temperature recorded by a temperature sensor on the milk line has risen or dropped a predetermined number of degrees in a predetermined time period, and if the temperature sensors on each hose are consistent with predetermined temperatures; if at least four have occurred, the processor is preferably configured to confirm the washing cycle; subsequently, the processor is preferably configured to send an alert if any data collected by the processor, such as temperature of the liquids flowing through the hose, the time of a washing cycle, or a pressure differential at the bottom of the drums after a liquid withdrawal has occurred, is inconsistent with a plurality of predetermined data; if less than four have occurred, the processor preferably reverses its determination that the washing cycle has started; subsequently, the processor preferably begins analyzing the stored reports again;

FIG. 8 is a flow chart showing a second preferred method for providing a system for measuring a depth of a liquid in a drum;

FIG. 9 is a flow chart showing a third preferred method for providing a system for measuring a depth of a liquid in a drum;

FIGS. 10A and 10B are a flow chart showing a fourth preferred method for providing a system for measuring a depth of a liquid in a drum;

FIG. 11 is a flow chart showing a fifth preferred method for measuring a depth of a liquid in a drum used as part of a system for use in at least one of agricultural, equipment cleaning, and animal husbandry;

FIG. 12 is a flow chart showing a sixth preferred method for measuring a depth of a liquid in a drum used as part of a system for use in at least one of agricultural, equipment cleaning, and animal husbandry;

FIGS. 13A and 13B are a flow chart showing a seventh preferred method for measuring a depth of a liquid in a drum used as part of a system for use in at least one of agricultural, equipment cleaning, and animal husbandry;

FIG. 14 is a flow chart showing an eighth preferred method for providing a system for measuring a depth of a liquid in a drum;

FIG. 15 is a flow chart showing a ninth preferred method for providing a system for measuring a depth of a liquid in a drum; and FIGS. 16A and 16B are a flow chart showing a tenth preferred method for providing a system for measuring a depth of a liquid in a drum;

FIGS. 19A1-19A3, 19B-19O, 19P1-19P4, and 19Q are a preferred schematic for the processor;

FIGS. 19AA1-19AA3, 19BB-19OO, 19PP1-19PP4, and 19QQ are a second preferred schematic for the processor;

FIGS. 21A-21N are a preferred schematic for the second sensor or microprocessor that the second sensor is located on;

DETAILED DESCRIPTION OF THE PREFERRED EMBODIMENTS

Certain terminology is used in the following description for convenience only and is not limiting. The term "fluid communication between A and B" means that A and B are located such that a fluid, such as air or liquid, may flow from A to B. For example, A and B are in fluid communication if A and B are sitting on an empty desk since air may freely flow from A to B. As another example, A and B may be in fluid communication with each other if A is sitting on a desk and B is located in a box containing a hole on the desk since air can still flow from A into the box, via the hole, to B. As yet another example, A and B may not be in fluid communication if A is sitting on a desk and B is located in an airtight box on the desk since air may not be able to flow from A into the box. The term "electronic device" refers to any device that manipulates electron flow for its operation, such as, a cell phone, tablet, device connected via the Internet, smart phone, keypad, computer, or the like. The word "drum" as used in the claims and in associated portions of the specification, means "any object configured to hold liquid therein such as a drum, barrel, tote, tub, tank, bath, holding tank, container, vat, and/or the like". The language "at least one of 'A', 'B', and 'C'," as used in the claims and/or in corresponding portions of the specification, means "any group having at least one 'A'; or any group having at least one 'B'; or any group having at least one 'C';—and does require that a group have at least one of each of 'A', 'B', and 'C'." Additionally, the words "a" and "one" are defined as including one or more of the referenced item unless specifically stated otherwise. The terminology includes the words above specifically mentioned, derivatives thereof, and words of similar import.

Figure 1:
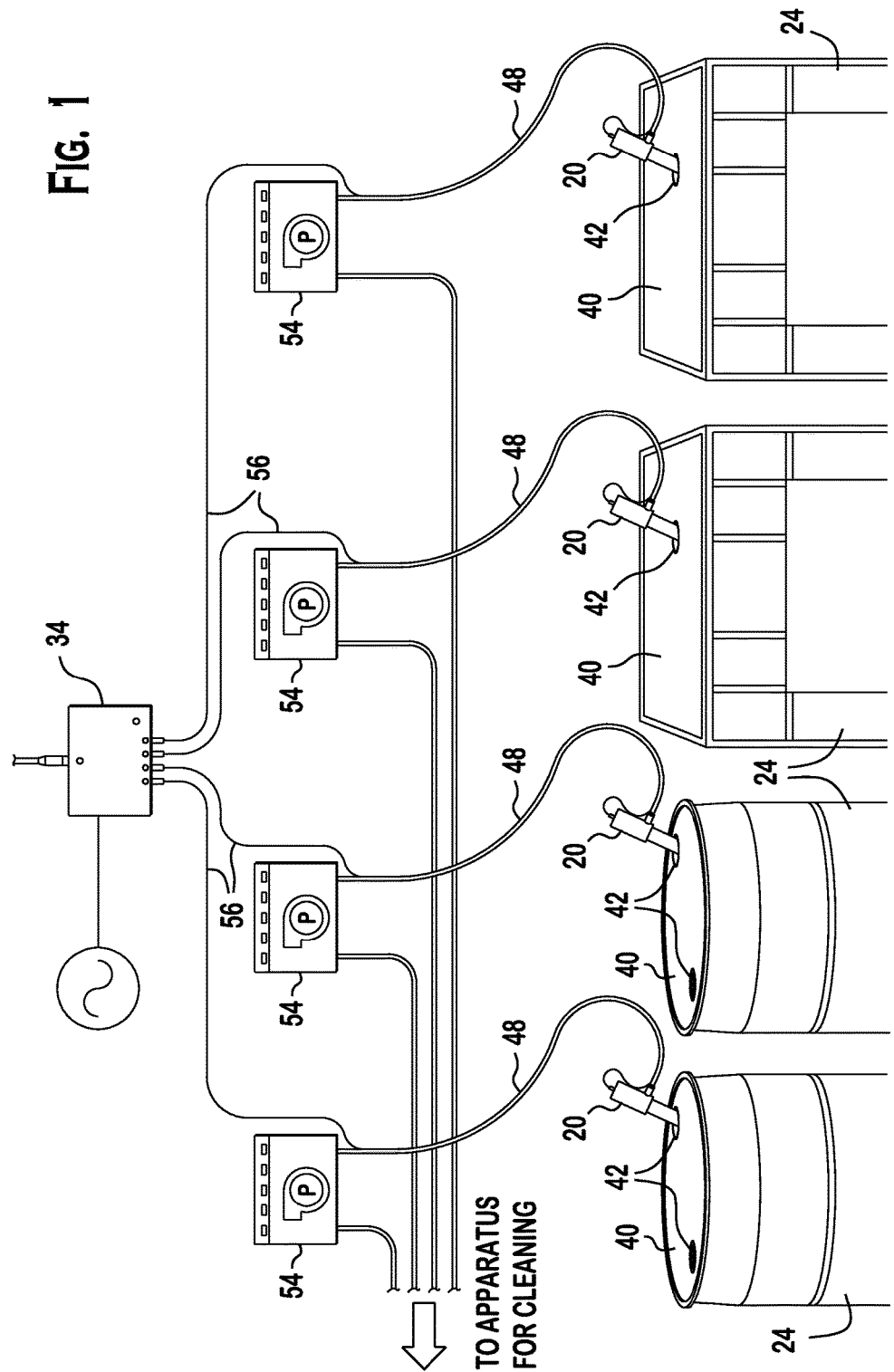
FIG. 1 is a front view of a sensor apparatus in combination with a system for use with agriculture, cleaning, and/or animal husbandry according to a first preferred embodiment of the present invention; the sensor apparatus includes a tube having first and second ends; the second end of the tube is configured for placement within the liquid of the drum such that the second end rests against the bottom of the drum; although a preferred configuration of the seal is shown, those of ordinary skill in the art will appreciate from this disclosure that the seal may be at any location in the tube spaced from the second end without departing from the scope of the present invention.
Figure 2:
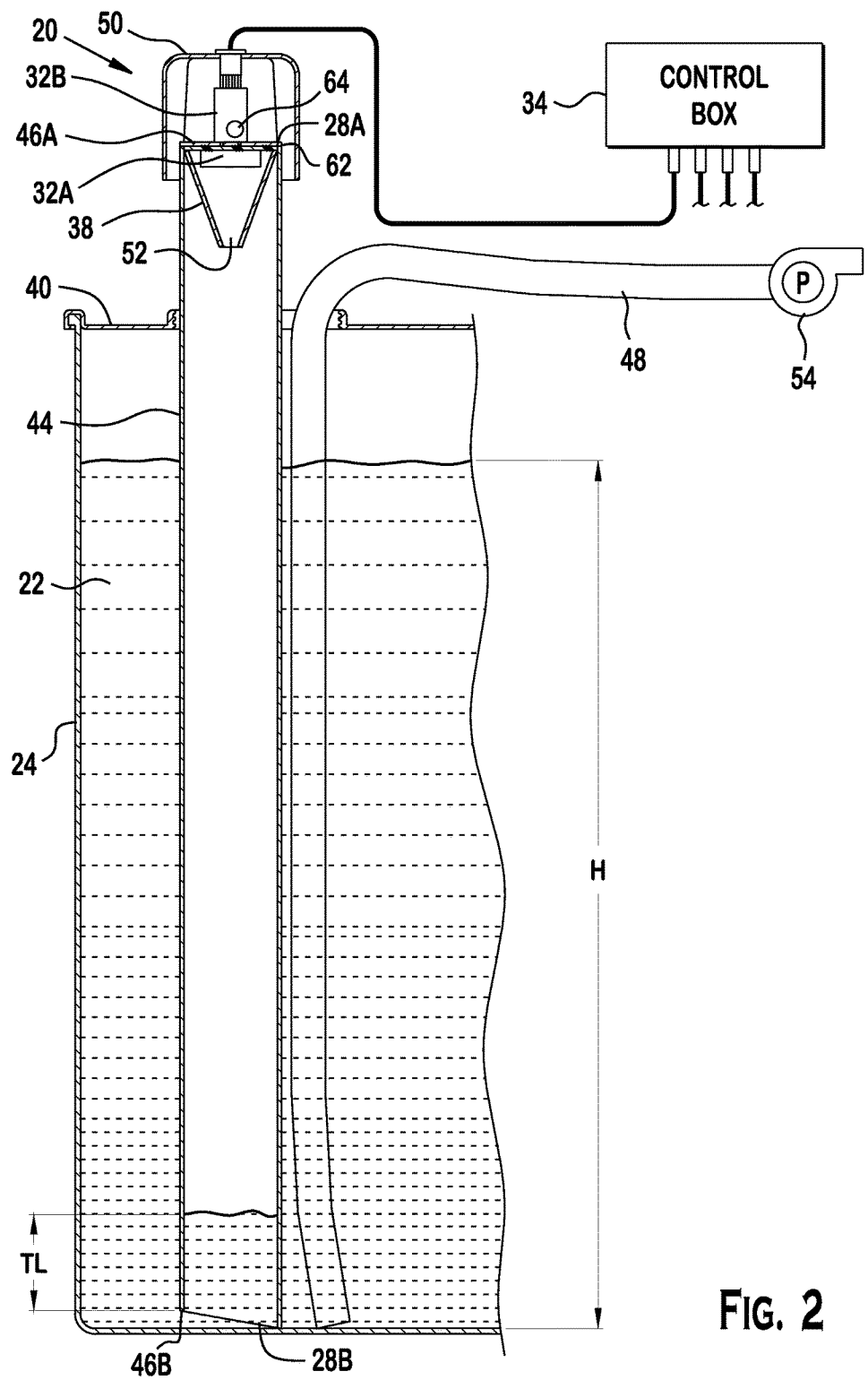
FIG. 2 is a front view of a sensor apparatus according to a first preferred embodiment of the present invention; the sensor apparatus may include a tube having first and second ends; the second end of the tube may be configured for placement within the liquid of the drum via a hole in the top of the drum such that the second end rests against the bottom of the drum; the tube may have a seal positioned at the first end, the seal being a printed circuit board; although a preferred configuration of the seal is shown, those of ordinary skill in the art will appreciate from this disclosure that the seal may be at any location in the tube spaced from the second end without departing from the scope of the present invention; a first sensor may be located on the printed circuit board such that the first sensor is between the printed circuit board and the second end, and, configured to measure air pressure in the tube; the tube may have an opening located in the second end; the opening allows the liquid in the drum partially fill the tube between the second end and the seal when the sensor apparatus is placed in the liquid; the area of the opening may be relatively small compared to the area of the second end, the area of the opening may be similar to the area of the second end, or, the area of the opening may be any size in between relatively small and similar to the area of the second end; the second end may be irregular in shape such that positioning of the second end on a flat bottom of the drum will not prevent flow of liquid into the tube; as shown, the second end of the tube has an angled second end with respect to the flat, horizontal bottom of the drum; although a preferred configuration of the second end is shown, those of ordinary skill in the art will appreciate from this disclosure that the second end may be rounded, have dimples or protrusions, or be any other suitable shape without departing from the scope of the present invention; the tube may contain a shield located between the second end and the seal; the shield may be configured to form a barrier between the first sensor and an inner surface of the tube such that a drop of the liquid is less likely to flow down the inner surface of the tube and contact the first sensor; the shield may be further configured to leave at least one air passageway between the first sensor and the second end so that the air pressure measurements of the first sensor are not impeded by the shield; the sensor apparatus may include a container positioned on the first end of the tube; the container may have an opening on at least one side such that the air pressure in the container is similar to the ambient air pressure around the drum; the container may also have a second sensor therein that is configure to measure the ambient air pressure outside the drum; however, the location of the second sensor may be any one of on the first end, between the seal and the first end, in a compartment attached to the tube, and spaced from the sensor apparatus without departing from the scope of the invention; preferably, the second sensor is located on a micro board, a printed circuit board, or the like; the first and second sensors may be connected by a wire to a processor, that is shown labeled in the Figures as a control box; the processor preferably includes a mini SD disk or the like, a battery backup or the like, and a cellular board; the processor may be configured to compute a volume of the liquid in the drum based on the measurements of the first sensor and the second sensor, and, also using a plurality of inputs representing at least one of a dimension of the drum, a dimension of the sensor apparatus, and a specific gravity of the liquid; the processor may be configured for entry of the plurality of inputs via a remote electronic device; the processor may be configured to automatically determine the depth of the liquid in the drum, according to: $H=(P_b-P_a)/(PPIC*SG_{liquid})$, where $P_b$ is the pressure in the drum at the opening of the tube as measured by the first sensor, $P_a$ is the atmospheric pressure outside the drum as measured by the second sensor, $SG_{liquid}$ is the specific gravity of the liquid inside the drum, H is the depth, or height, of the liquid inside the drum generally above the opening in the tube, PPIC is determined by $((H-TUBE_{liquidinches})*249.17)/H)$, where $TUBE_{liquidinches}$ is the height of liquid in the tube above the opening, and 249.17 is the standard pressure exerted by a one inch column of water; the processor may be further configured to automatically determine the volume of the liquid in the drum and take into account any adjustment needed due to the presence of the sensor apparatus therein by using the depth of the liquid in the drum and dimensions of the drum to determine an initial volume of liquid in the drum, then the processor automatically adjusts the initial volume of liquid in the drum to get a final volume of liquid in the drum that takes into account the sensor apparatus, according to: Vdrum-final=Vdrum-initial−((H-Dliqid-in-sensor)*A), wherein H is the depth of liquid in the drum generally above the opening in the tube, Vdrum-final is the final volume of liquid in the drum, Vdrum-initial is the initial volume of liquid in the drum, A is a cross sectional area of the tube, Dliqid-in-sensor is the depth of the liquid in the tube determined as follows: Dliqid-in-sensor=(L−(((Pi*Vi/Ti)*(Tf/Pf))/A)), wherein L is a length of the tube, Pi is the initial pressure in the tube prior to insertion of the tube in the liquid, Vi is the initial volume of the tube that is calculated by the dimensions of the tube, Ti is the initial temperature of air in the tube, Pf is a pressure in the tube when the tube is submerged in the liquid as calculated by the first sensor, and Tf is the final temperature of the air inside the tube when the tube is submerged; the processor may be configured to collect a plurality of usage data comprising at least one of a time and a temperature of liquid withdrawn from the drum; the processor may be configured to compare the plurality of usage data against a plurality of predetermined data and issue an alert when a discrepancy occurs; a hose that is connected to a pump may also be placed within the drum to withdrawal liquid from the drum; the processor may be configured to determine whether a pressure drop as measured by one of the first sensor and the first and second sensors is a withdrawal of liquid or a non withdrawal event; the processor may further be configured to send an alert by text message if the volume of liquid withdrawn is less than a predetermined amount, thereby warning the owner or a third party that there is a problem with the liquid withdrawal setup.

Referring to FIGS. 2-4, wherein like numerals indicate like elements throughout, there is shown a preferred embodiment of a sensor apparatus 20 for measuring a depth of a liquid 22 in a drum 24. The sensor apparatus 20 preferably includes a tube 26 that has first and second ends 28A, 28B wherein the second end 28B may be configured for placement within the liquid 22. While the tube 26 preferably has a circular cross-section when taken generally perpendicular to a longitudinal axis thereof, Those of ordinary skill in the art will appreciate from this disclosure that the tube cross section can be triangular, square, polygonal, irregular, or the like without departing from the scope of the present invention. Additionally, the first end 28A may have a larger diameter than the second end 28B.

The sensor apparatus 20 may be configured for insertion into the liquid 22 via a hole 42 in a top 40 of the drum 24. It is preferable, although not required, that the second end 28B be configured to rest against the bottom of the drum 24. The second end 28B may have an opening 36 therein to let liquid 22 in the drum 24 partially fill the tube 26 when the second end 28B is placed within the liquid 22 in the drum 24. To assure flow of liquid 22 into the tube 26 through the opening 36 in the second end 28B, the second end 28B may be irregular in shape such that positioning of the second end 28B on a flat bottom of the drum 24 will not prevent flow of liquid 22 into the tube 26. Said another way, the surface of the second end 28B of the tube 26 may have a different contour than the bottom of the bottom of the drum 24 such that when the second end 28B is resting on the bottom of the drum 24, at least a portion of the second end 28B is not in contact with the bottom of the drum 24. While the opening 36 in the preferred embodiment has an area similar to the area of the second end 28B, those of ordinary skill in the art will appreciate from this disclosure that the area of the opening 36 may be any value smaller than the area of the second end 28B without departing from the scope of the present invention. Those of ordinary skill in the art will also appreciate from this disclosure that the second end 28B may have multiple openings therein without departing from the scope of the present invention. Those of ordinary skill in the art will also appreciate from this disclosure that the opening 36 may not be in the second end 28B, but may be located on a portion of the tube 26 spaced from the second end 28B without departing from the scope of the present invention.

Figure 5:
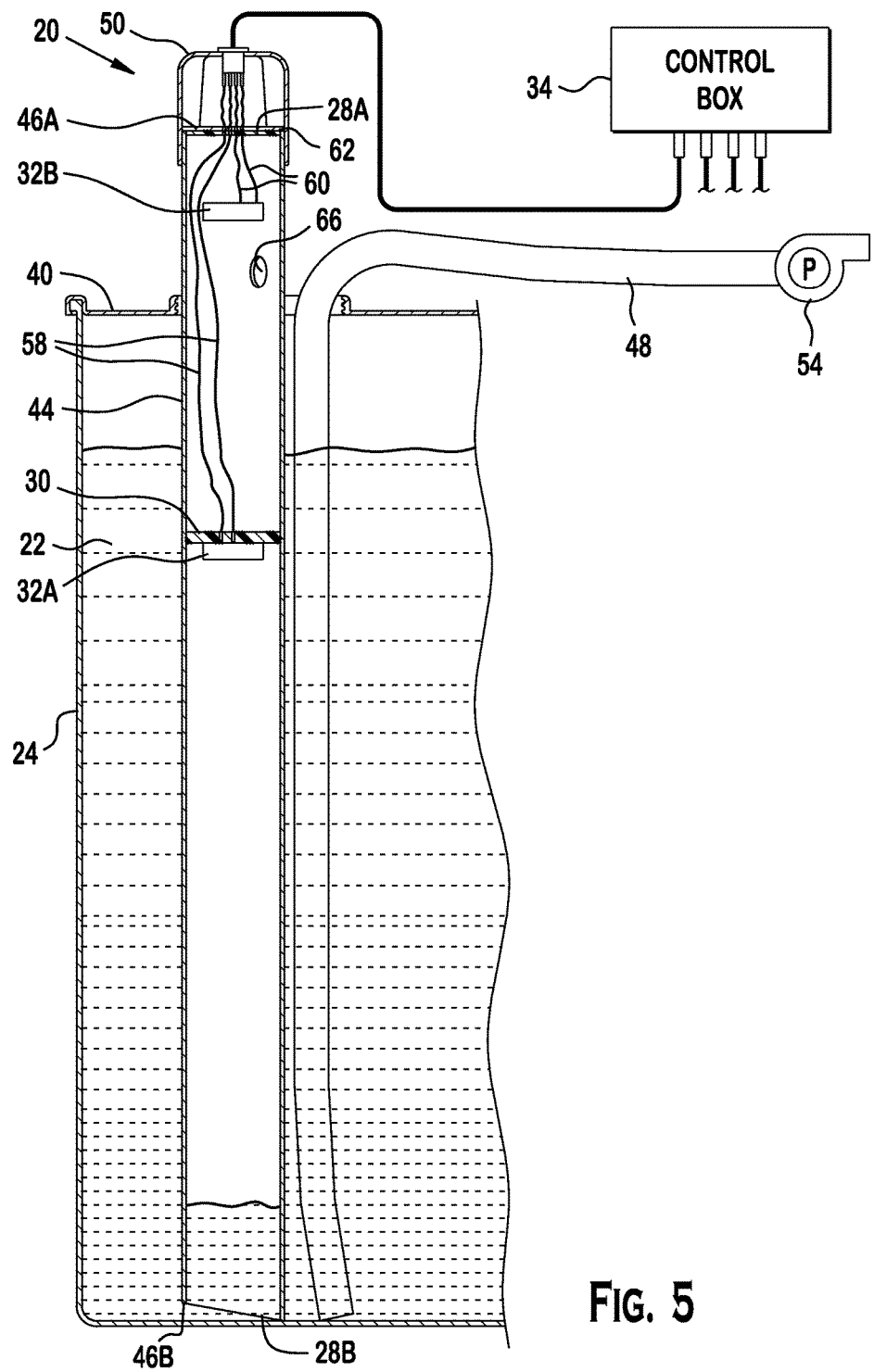
FIG. 5 is a second preferred embodiment of the sensor apparatus; in this embodiment, the seal may be located in the tube between the first and second ends; the seal may be a printed circuit board and the first sensor may be located on the seal between the seal and the second end; however, the first sensor may be located anywhere that is in fluid communication with the inside of the drum without departing from the scope of the invention; the second sensor may be located between the seal and the first end of the tube; a portion of the tube between the seal and the first end may have an opening therein such that the sensor is in fluid communication with ambient pressure outside the drum; however, those of ordinary skill in the art will recognize that the second sensor may be located anywhere that allows the second sensor to be in fluid communication with ambient pressure outside the drum, or, fluid communication with air inside the drum without departing from the scope of the present invention; the first and second sensors may generate first and second signals that correspond to the pressure of the liquid at the bottom of the drum and the ambient pressure outside the drum, respectively; the first sensor may have wires that extend therefrom that extend through the seal, the second seal, and run to the top of the container; the second sensor may wire that extend therefrom and extend through the second seal and run to the top of the container; the top of the container may have a main wire that transfers the first and second signals from the first and second sensors to the processor; however, the first and second signals may be transferred in any suitable way without departing from the scope of the invention.

Referring to FIGS. 2 and 3, a seal 30 may be positioned in the tube 26 and spaced from the second end 28B. The seal 30 preferably is an air-tight seal. Preferably, the seal 30 is located on the first end 28A of the tube 26. However, as seen in FIG. 5, the seal 30 may be positioned between the first and second ends 28A, 28B of the tube 26. In the preferred embodiment, the seal 30 is a printed circuit board that forms an air-tight seal, however, the seal 30 may be any suitable material without departing from the scope of the invention.

Figure 20:
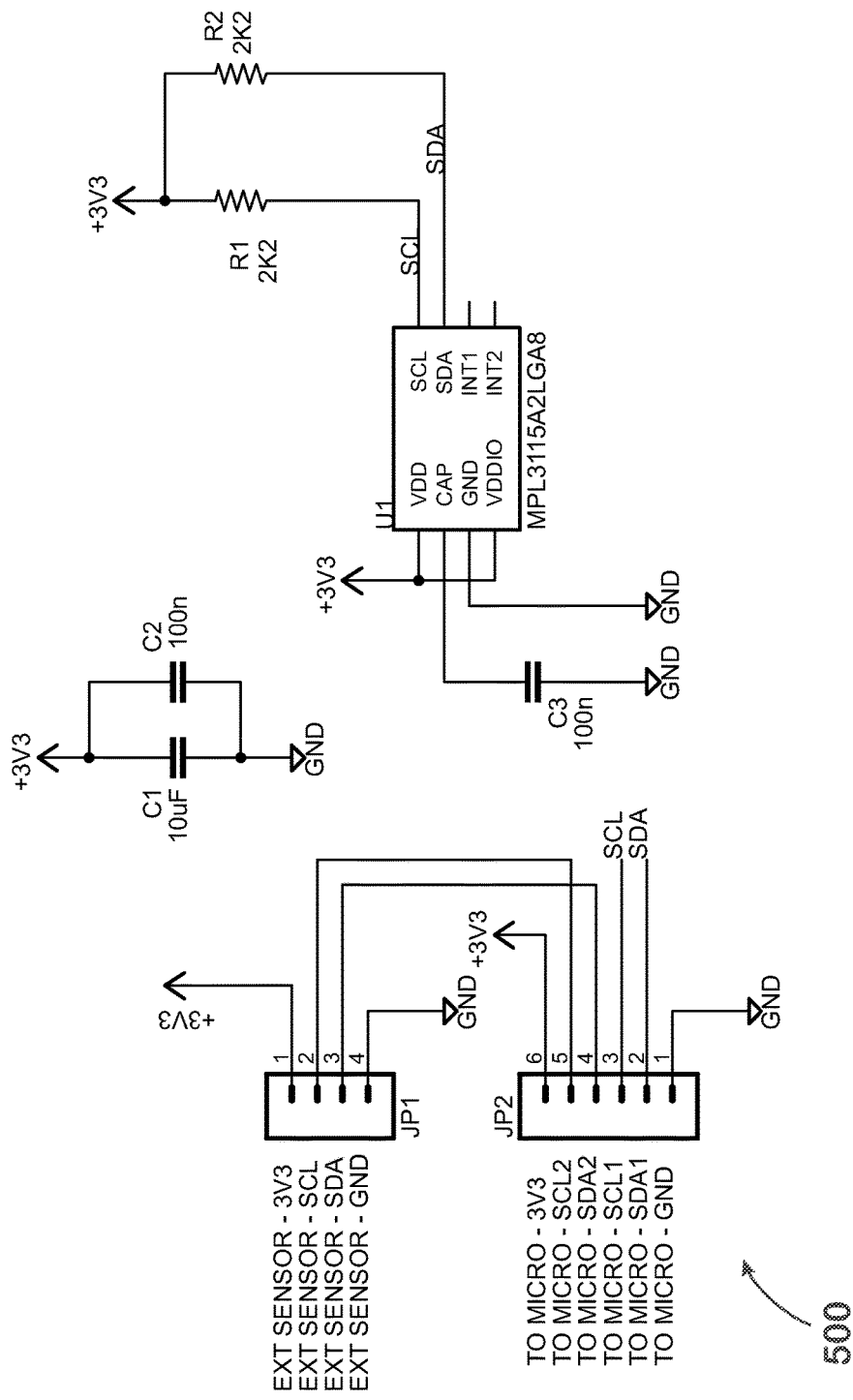
FIG. 20 is a preferred schematic for the first sensor.

The sensor apparatus 20 preferably includes a first sensor 32A located between the second end 28B and the seal 30 to measure the air pressure of the tube 26 between the seal 30 and the second end 28B. While the preferred embodiment has the first sensor 32A connected to the seal 30, the first sensor 32A may be located at any location such that the first sensor 32A is in fluid communication with the air in the tube 26 between the seal 30 and the second end 28B. Referring to FIG. 20, a preferred schematic of the first sensor 500 is shown. The illustrated schematic for the first sensor 500 is exemplary only. Those of ordinary skill in the art will appreciate from this disclosure that any suitable circuit(s) can be used without departing from the scope of the present invention.

Still referring to FIGS. 2 and 3, the sensor apparatus 20 may include a shield 38 located between the second end 28B and the seal 30. The shield 38 is preferably configured to form a barrier between the first sensor 32A and an inner surface of the tube 26 such that, when the sensor apparatus 20 is laid on its side or transported to another location, a drop of liquid 22 is less likely to flow along the inner surface of the tube 26 and contact the first sensor 32A. While the preferred embodiment of the sensor apparatus 20 has a conically shaped shield 38 extending from the first end 28A of the tube 26, those of ordinary skill in the art will recognize that the shield 38 can have any suitable shape that impedes the flow of liquid 22 down the inner surface of the tube 26 without departing from the scope of the invention. Preferably, but not necessarily, the shield 38 is configured to leave at least one air passageway 52 between the first sensor 32A and the second end 28B so that the air pressure measurements of the first sensor 32A are not altered by the shield 38.

Figure 21G:
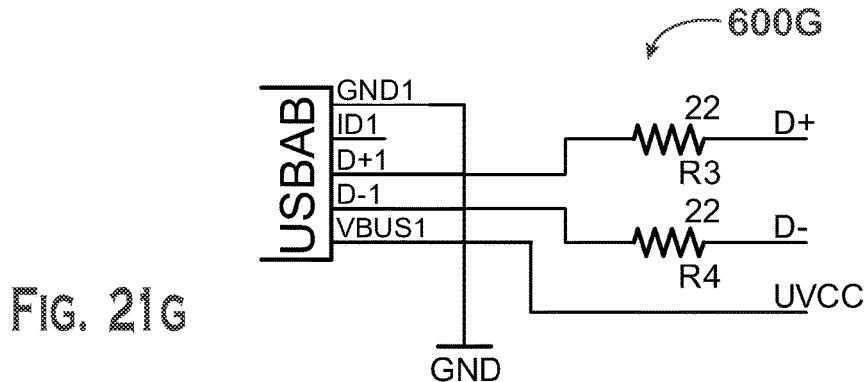
Figure 21H:
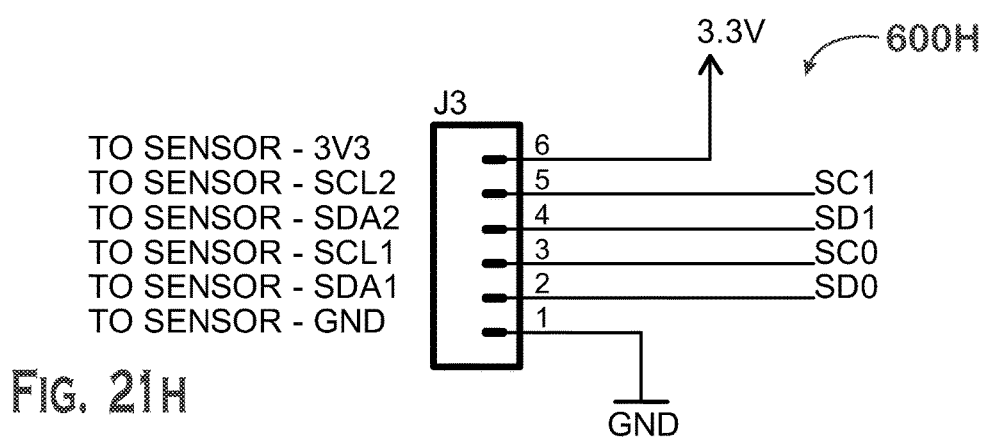
Figure 21I:
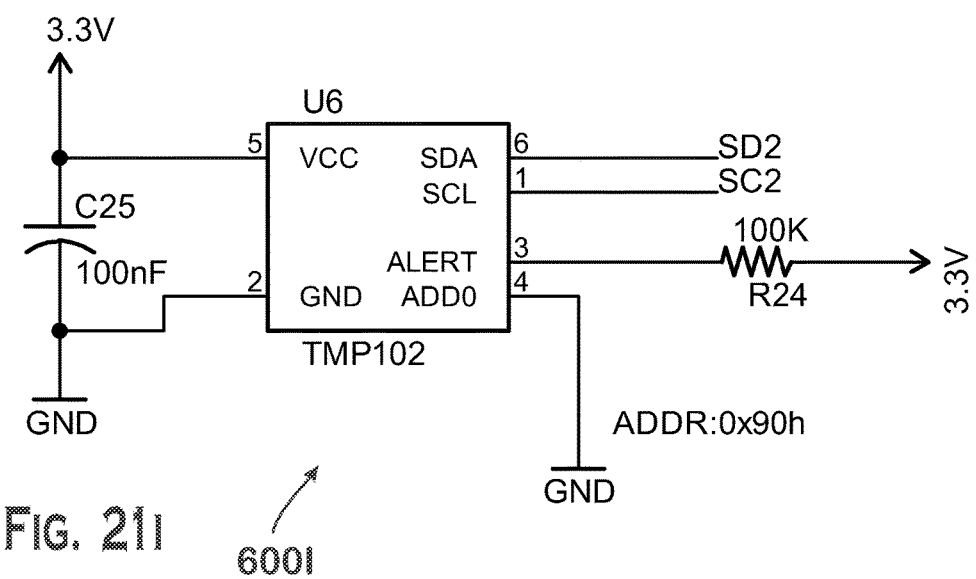
Figure 21J:
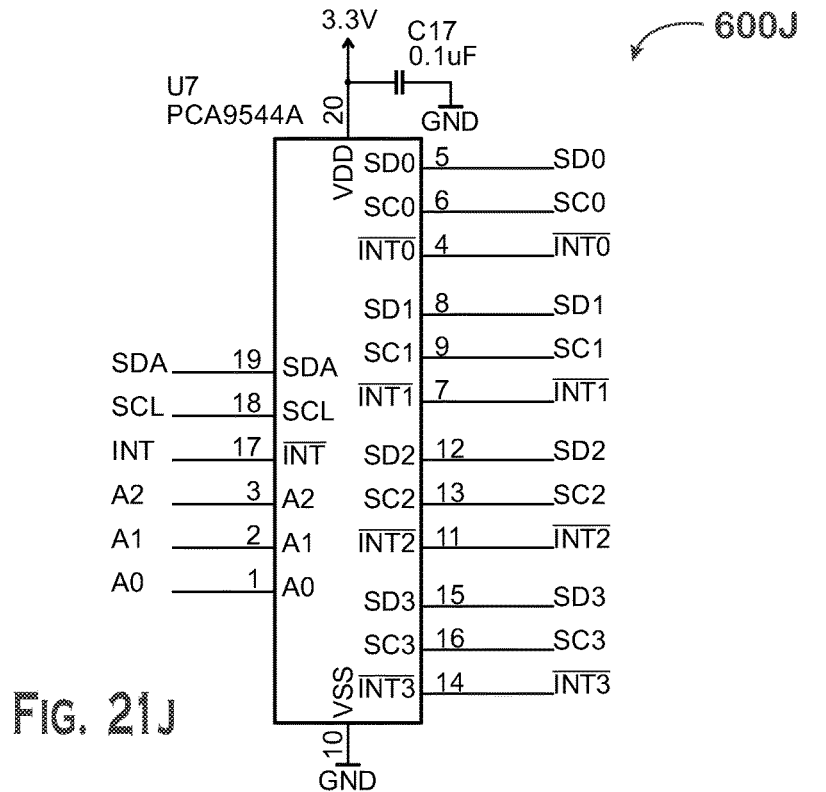
Figure 21K:
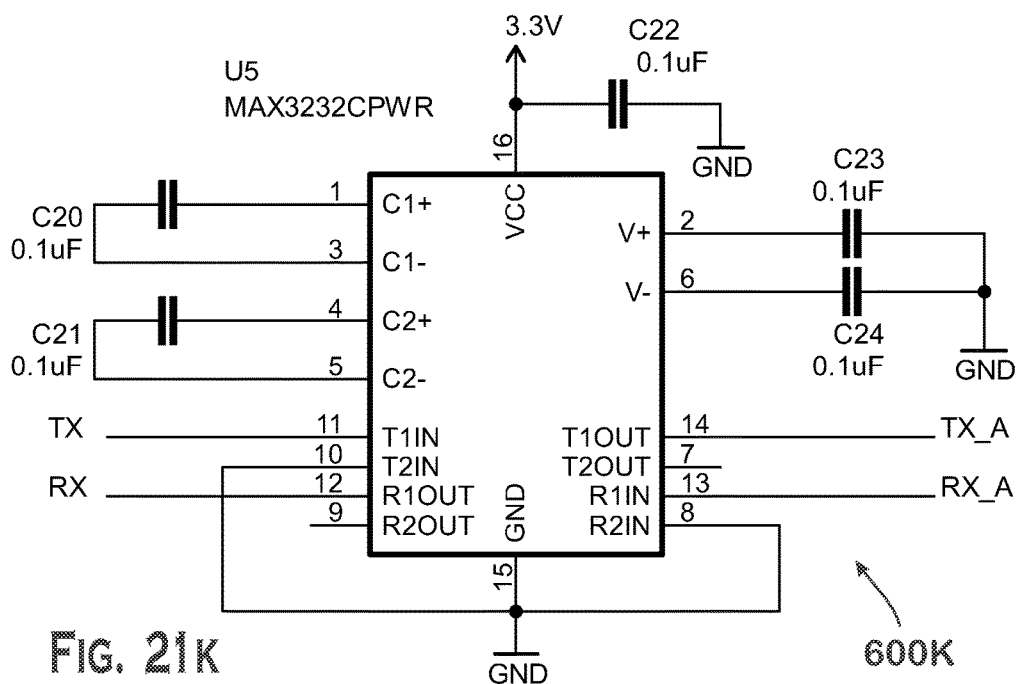
Figure 21L:
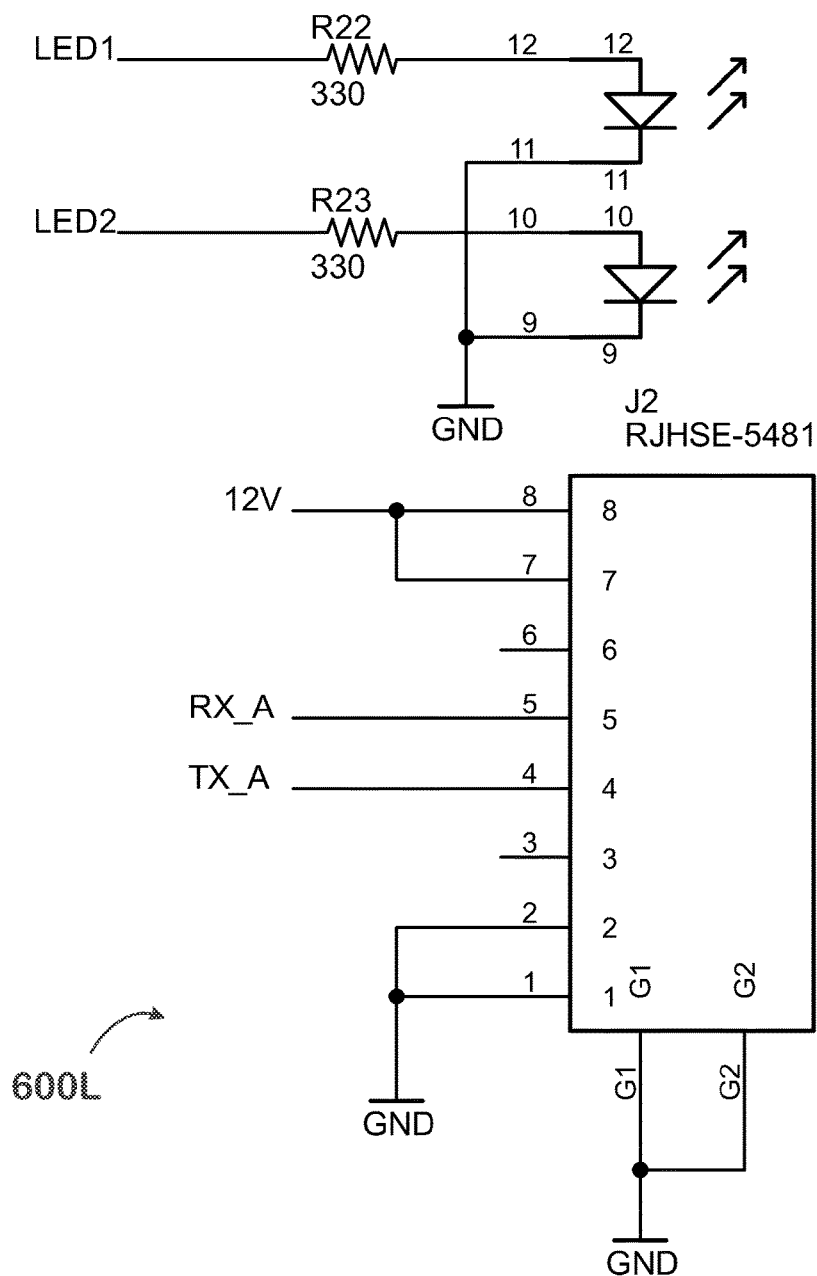
Figure 21M:
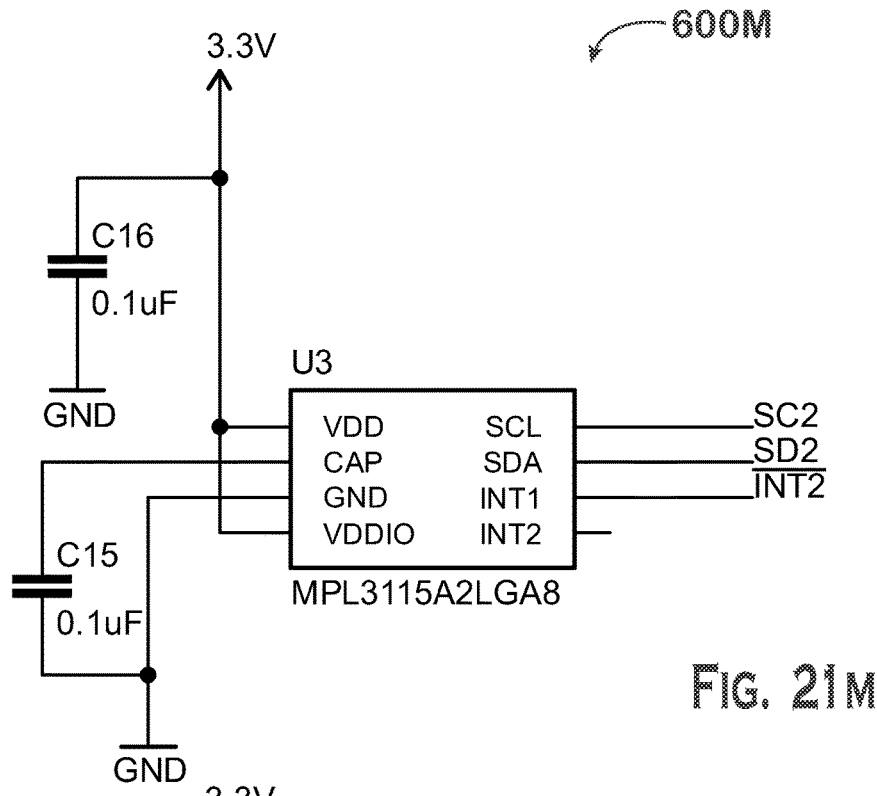
Figure 21N:
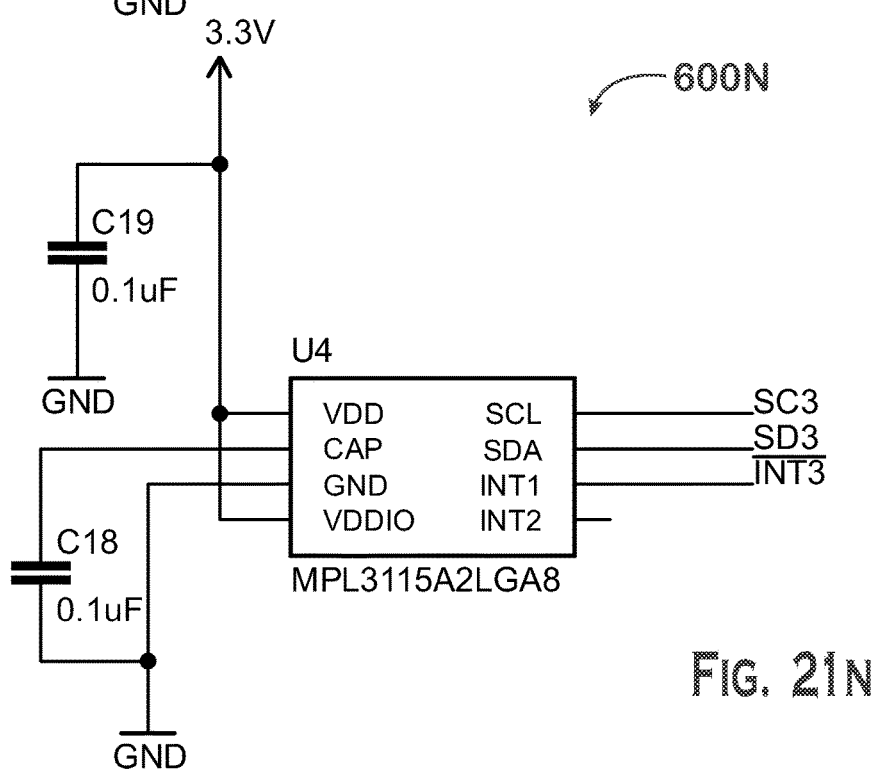

The sensor apparatus 20 may also include, but is not required to include, a second sensor 32B that is configured to measure atmospheric pressure outside the drum 24 or the pressure of the air inside the drum 24 and above the liquid 22. While the preferred embodiment shows the second sensor 32B located in container 50 attached to the first end 28A of the tube 26, the second sensor 32B may be located at any one of on the first end 28A, between the seal 30 and the first end 28A, in a compartment attached to the tube 26, and spaced from the sensor apparatus 20 without departing from the scope of the invention. The second sensor is preferably located on a microprocessor that is in electronic communication with the second sensor and the first sensor. Those of ordinary skill in the art will appreciate from this disclosure that instead of the second sensor, an assumed atmospheric pressure value can be used, a general pressure reading provided by an online, cellular, televised, or physical paper news source can be used without departing from the scope of the present invention. Referring to FIGS. 21A-21N, a preferred schematic of the second sensor or the microprocessor that the second sensor is located on 600A, 600B, and 600C is shown. The illustrated schematic for the second circuit 600A, 600B, 600C is exemplary only. Those of ordinary skill in the art will appreciate from this disclosure that any suitable circuit(s) can be used without departing from the scope of the present invention.

As best seen in FIG. 3, the sensor apparatus 20 may include an outer tube 44 disposed over the tube 26 wherein the outer tube 44 has third and fourth ends 46A, 46B and may be configured to withdraw liquid 22 from the drum 24 when the sensor apparatus 20 is inserted into the hole 42 in the top 40 of the drum 24. The outer tube 44 may be, but need not be, sealed to the tube 26 at a location on the tube 26 spaced from the second end 28B. At least a portion of the tube 26 may protrude from the fourth end 46B of the outer tube 44 so that withdrawal of the liquid 22 from the drum 24 via the outer tube 44 does not create suction that seals the outer tube 44 to a bottom of the drum 24. A hose 48 may be located on, or connected to, the outer tube 44 and in fluid communication therewith such that liquid 22 withdrawn from the drum 24 via the outer tube 44 then traverses the hose 48. The hose 48 may be connected to a pump 54 in order to create the pressure differential needed for the outer tube 44 to withdrawal liquid 22 from the drum 24. The outer tube 44 may have a protrusion extending therefrom that the outer tube 44 may be located on, or connected to. However, those of ordinary skill in the art will recognize from this disclosure that the hose 48 may be connected to the outer tube 44 in any suitable way, or at any location on the outer tube 44, location without departing from the scope of the invention. A first area defined by an axial cross section of the fourth end 46B of the outer tube 44 may be greater than a second area defined by an axial cross section of the third end 46A of the outer tube 44. At least one device 68 may be located within the fourth end 46B and configured to prevent the liquid 22 in the outer tube 44 from exiting the sensor apparatus 20 between the tube 26 and the outer tube 44 via the fourth end 46B when the sensor apparatus 20 is withdrawn from the liquid 22 in the drum 24. The at least one device 68 allows the sensor apparatus 20 to be withdrawn from the drum 24 and placed back in the liquid 22 in the drum 24, or another drum, without having to re-prime the outer tube 44 in order for the pump 54 to function properly. The at least one device 68 preferably allows the liquid 22 to entering the outer tube 44 through the fourth end 46B. The at least one device 68 may be a duck bill valve. However, those of ordinary skill in the art will recognize that the one device 68 may be any suitable device without departing from the scope of the invention. As best shown in FIGS. 3 and 4, the second end 28B of the tube 26 may located off-center in the fourth end 46B of the outer tube 44 in order to provide additional room for the operation of the at least one device 68. Duck bill valves, and other similar devices, may not work properly if they contact other instruments or parts. Therefore, the additional room created by locating the second end 28B off-center in the fourth end 46B of the outer tube 44 may allow the at least one device 68 to function unimpeded. The use of the at least one device 68 provides the advantage of preventing liquid from draining out of the sensor apparatus and connected hose when the sensor apparatus is removed from the drum. This facilitates use of the sensor apparatus with pumps that are not self priming.

Figure 6:
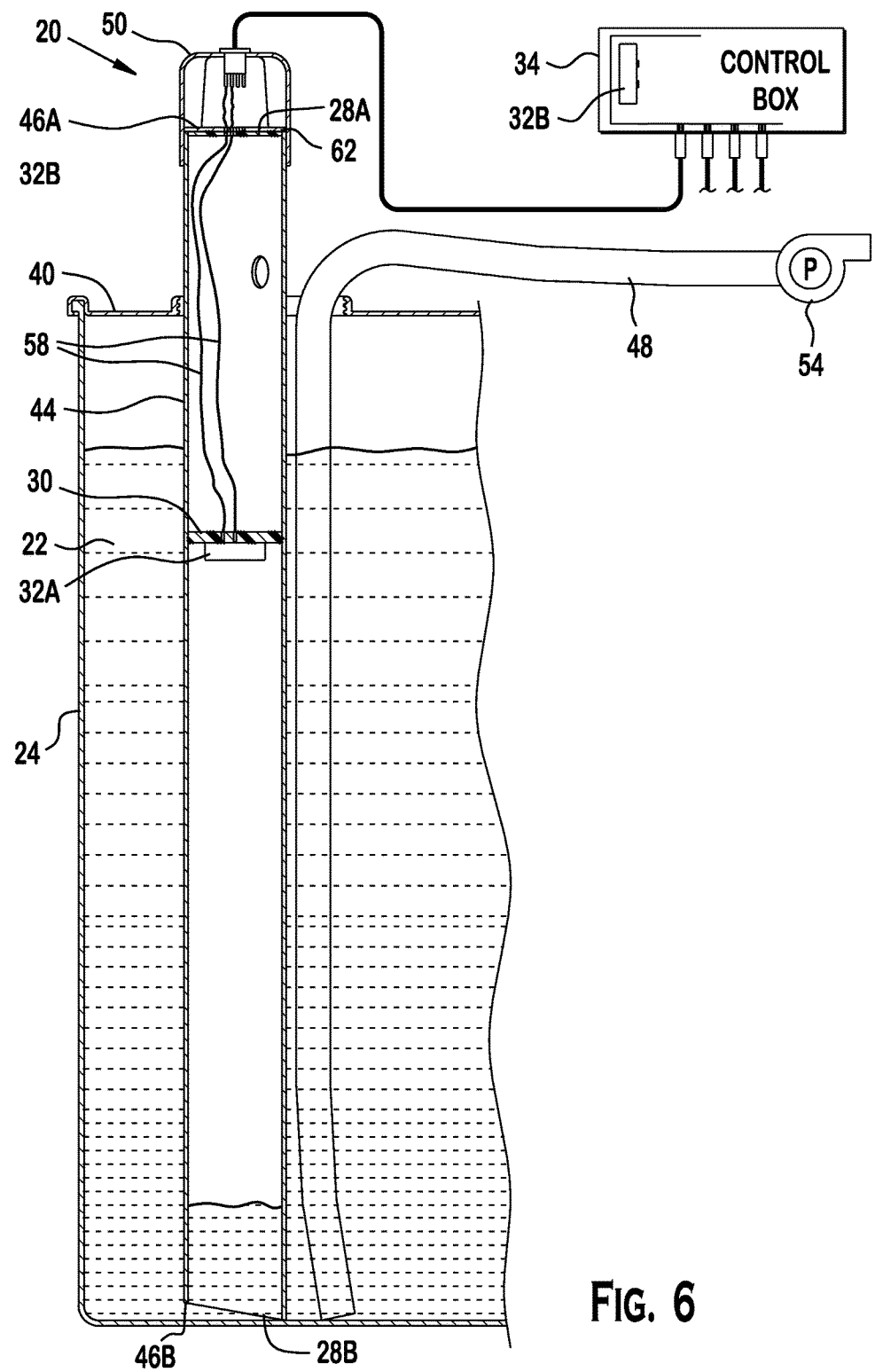
FIG. 6 is a third preferred embodiment of the sensor apparatus; in this embodiment, the second sensor may be located spaced from the sensor apparatus and may be located on the processor.

A container 50 is preferably, but not necessarily, positioned on the first end 28A of the tube 26. As described above, the container 50 preferably, but not necessarily, contains the second sensor 32B. The container 50 may have a second opening 64 therein in to allow the second sensor 32B to be in fluid communication with the ambient air outside the drum 24. The second opening 64 may be relatively small compared to a side of the container 50, however, those of ordinary skill in the art will recognize that there may be one or more openings that may be any size in relation to the container 50 without departing from the scope of the invention. As seen in FIGS. 5 and 6, if the second sensor 32B is in a location other than the container 50, or there is no second sensor in the sensor apparatus 20, the container 50 need not have an opening thereon. As best seen in FIG. 5, if the second sensor 32B is located in the tube 26 between the first end 28A and the seal 30, the tube 26 may have a third opening 66 therein such that the second sensor 32B is in fluid communication with the ambient air outside the drum 24, or, the air inside the drum 24. The container 50 on the first end 28A of the tube 26 may form a second seal 62 between the outer tube 44 and the tube 26, and, the third end 46A of the outer tube 44 and the atmosphere. It is preferable that that the third end 46A of the outer tube 44 be sealed off from the atmosphere so that the pump 54 may function properly.

Figure 19E:
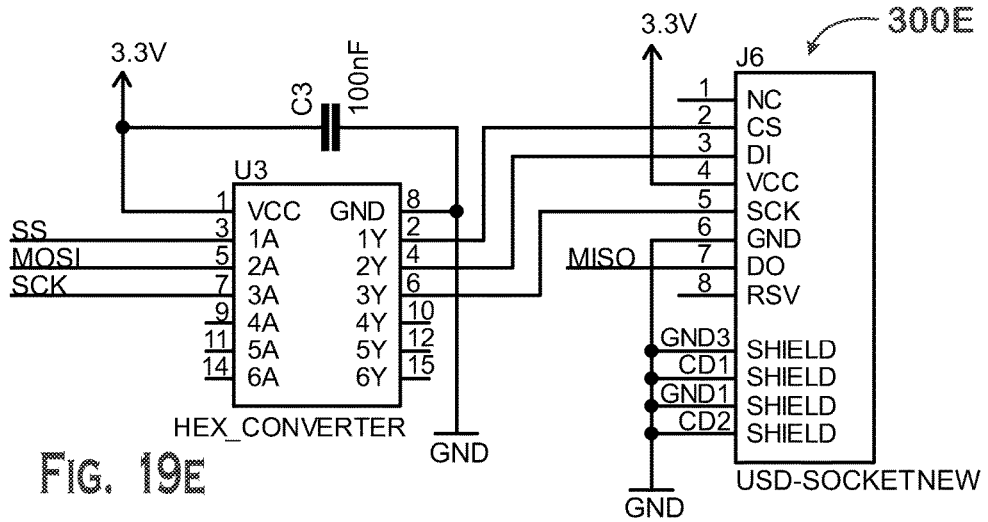
Figure 19F:
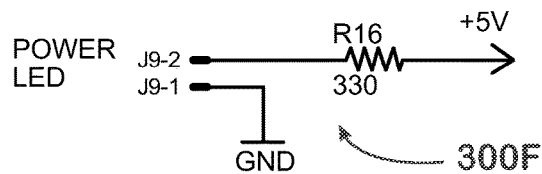
Figure 19G:
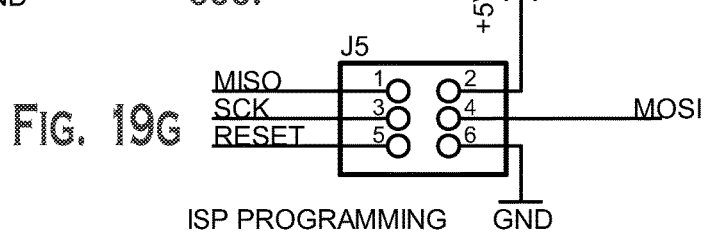
Figure 19H:
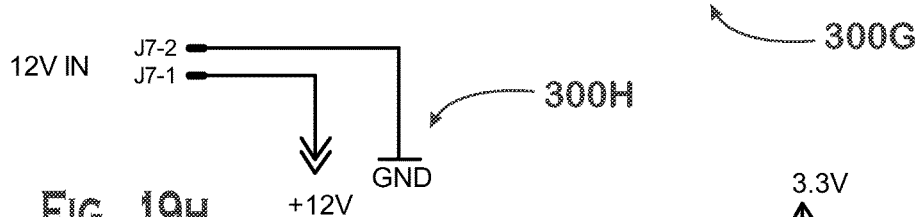
Figure 19I:
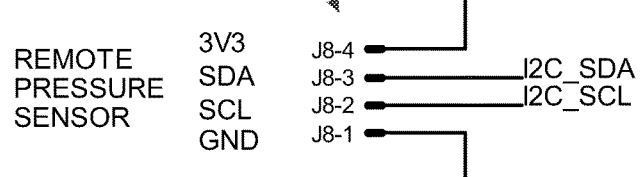
Figure 19J:
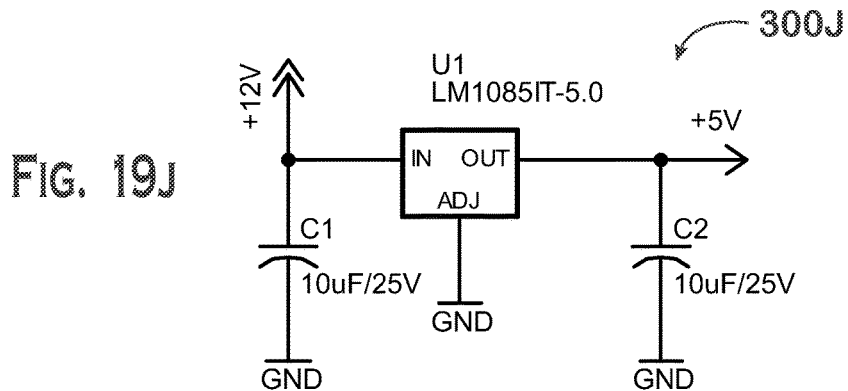
Figure 19K:
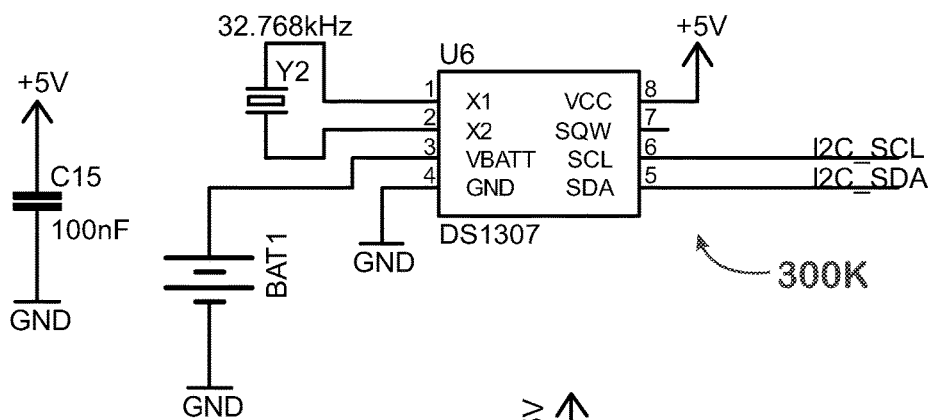
Figure 19L:
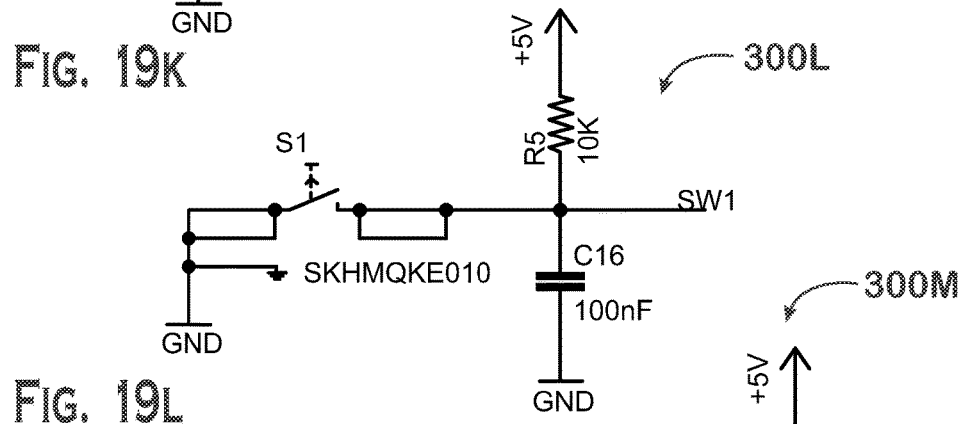
Figure 19M:
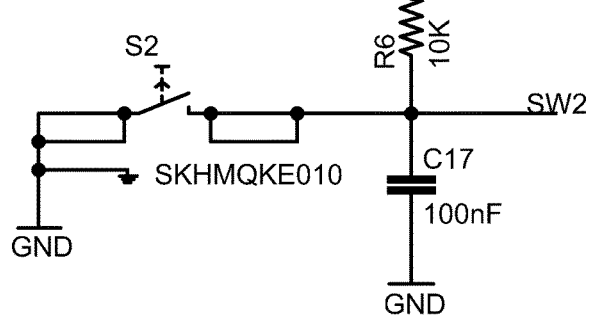
Figure 19N:
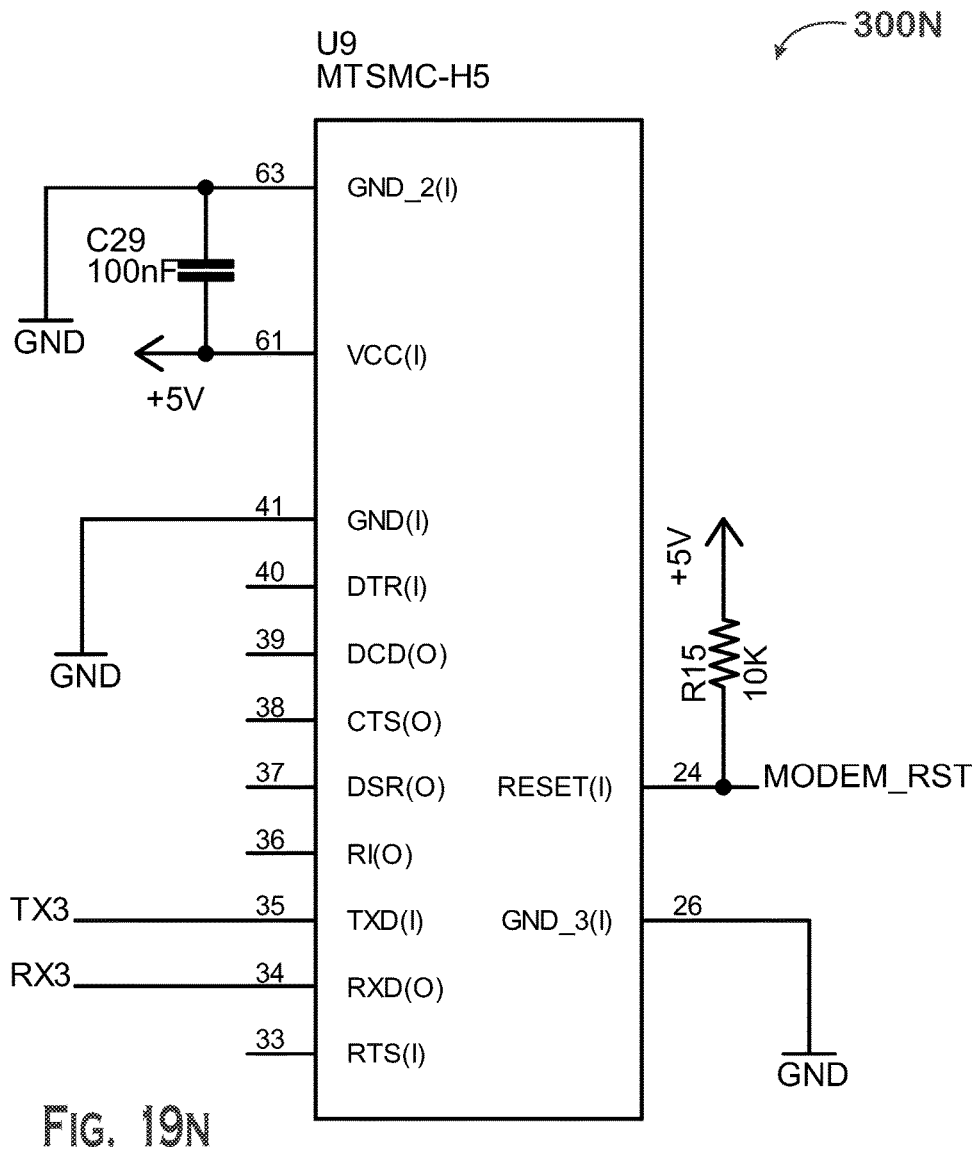
Figure 19O:
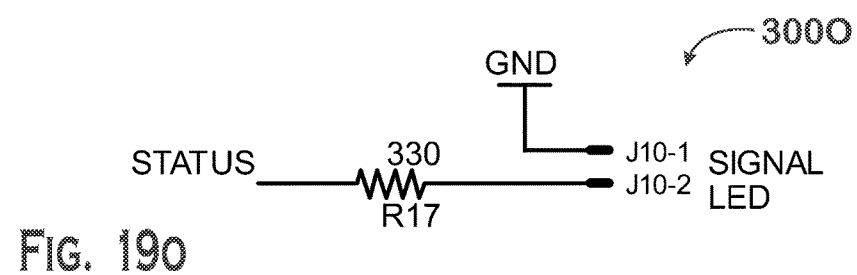
Figure 19Q:
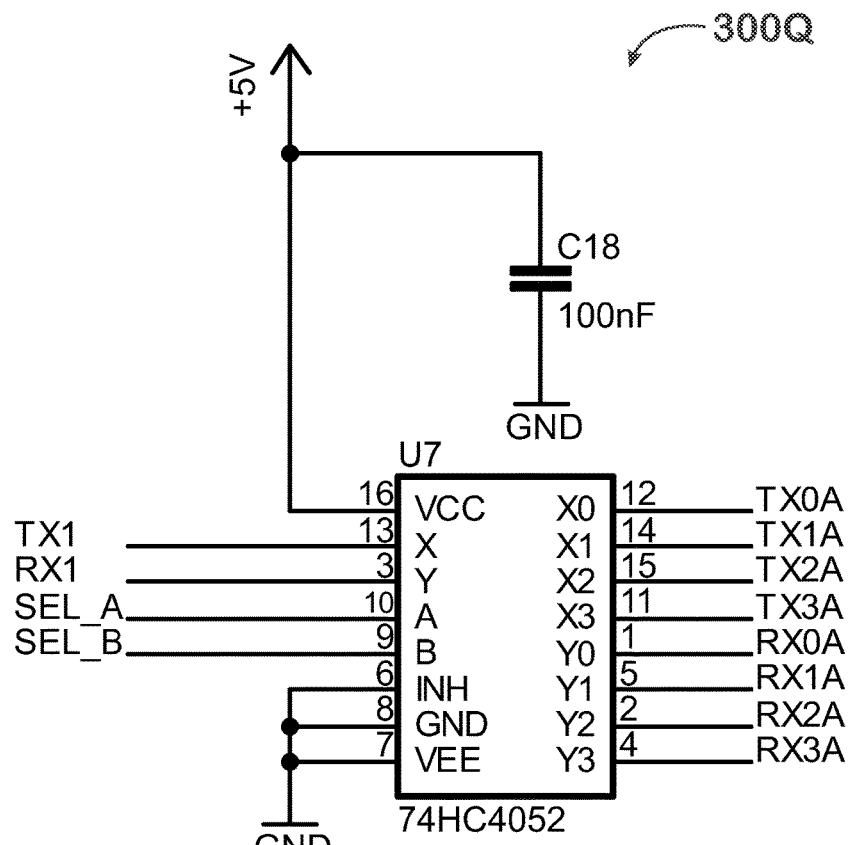
Figure 19E:
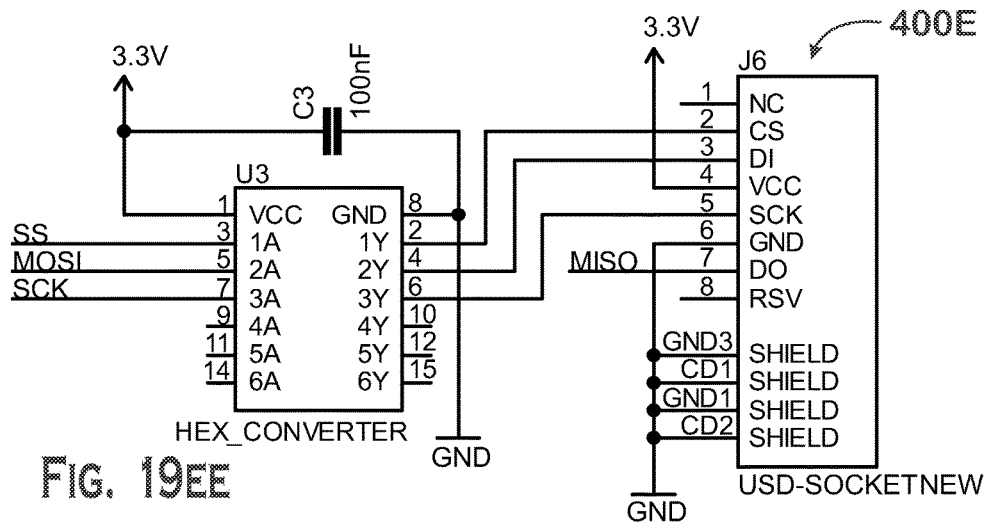
Figure 19F:
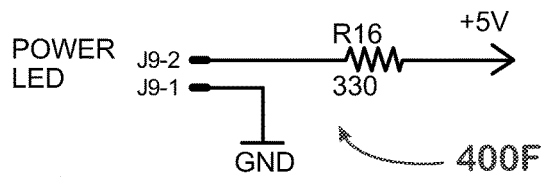
Figure 19G:
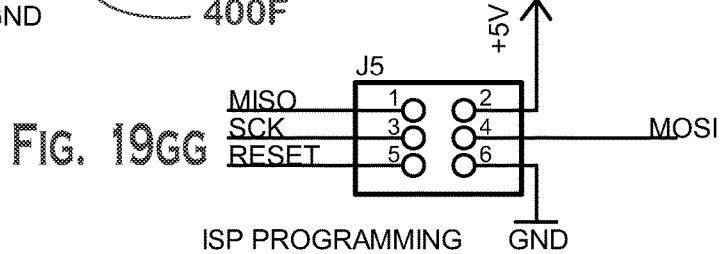
Figure 19H:
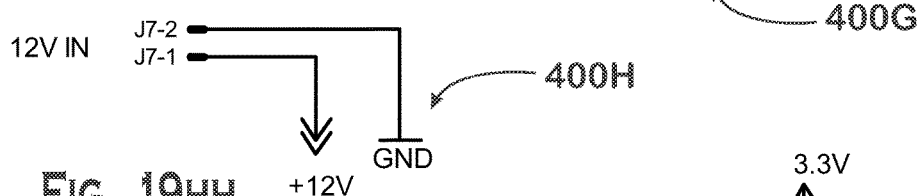
Figure 19I:
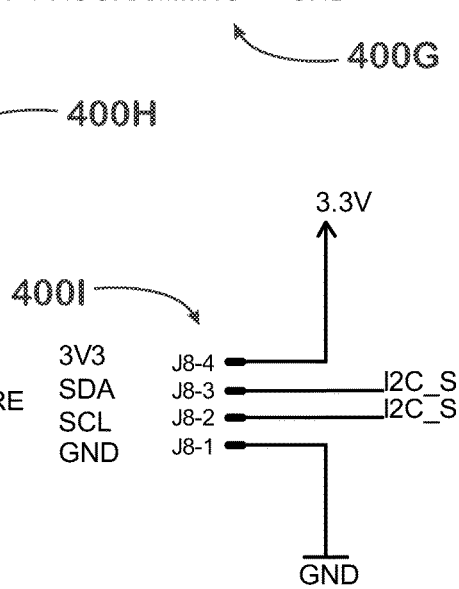
Figure 19J:
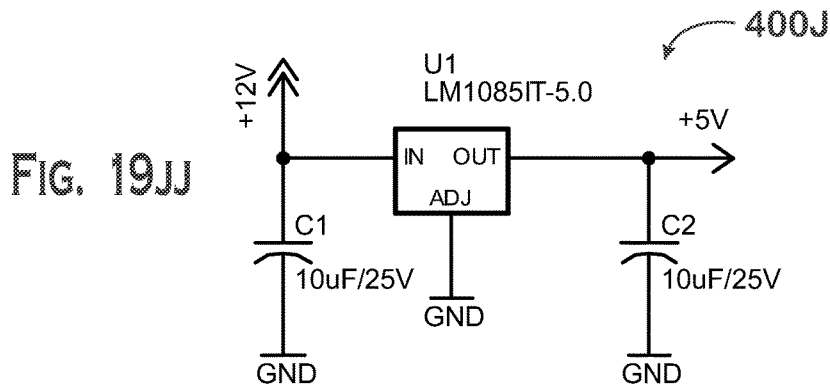
Figure 19K:
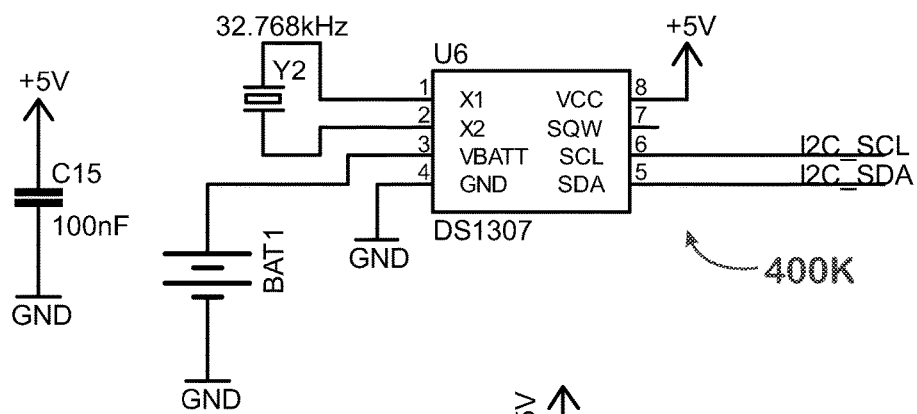
Figure 19L:
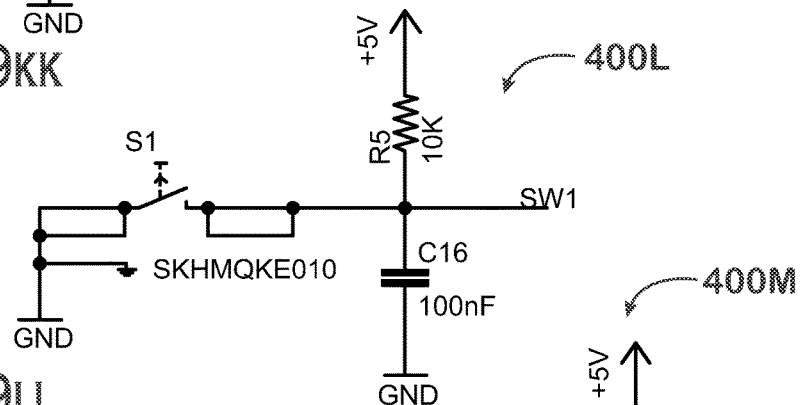
Figure 19M:
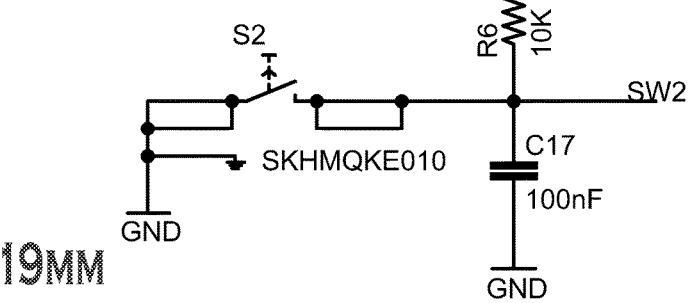
Figure 19N:
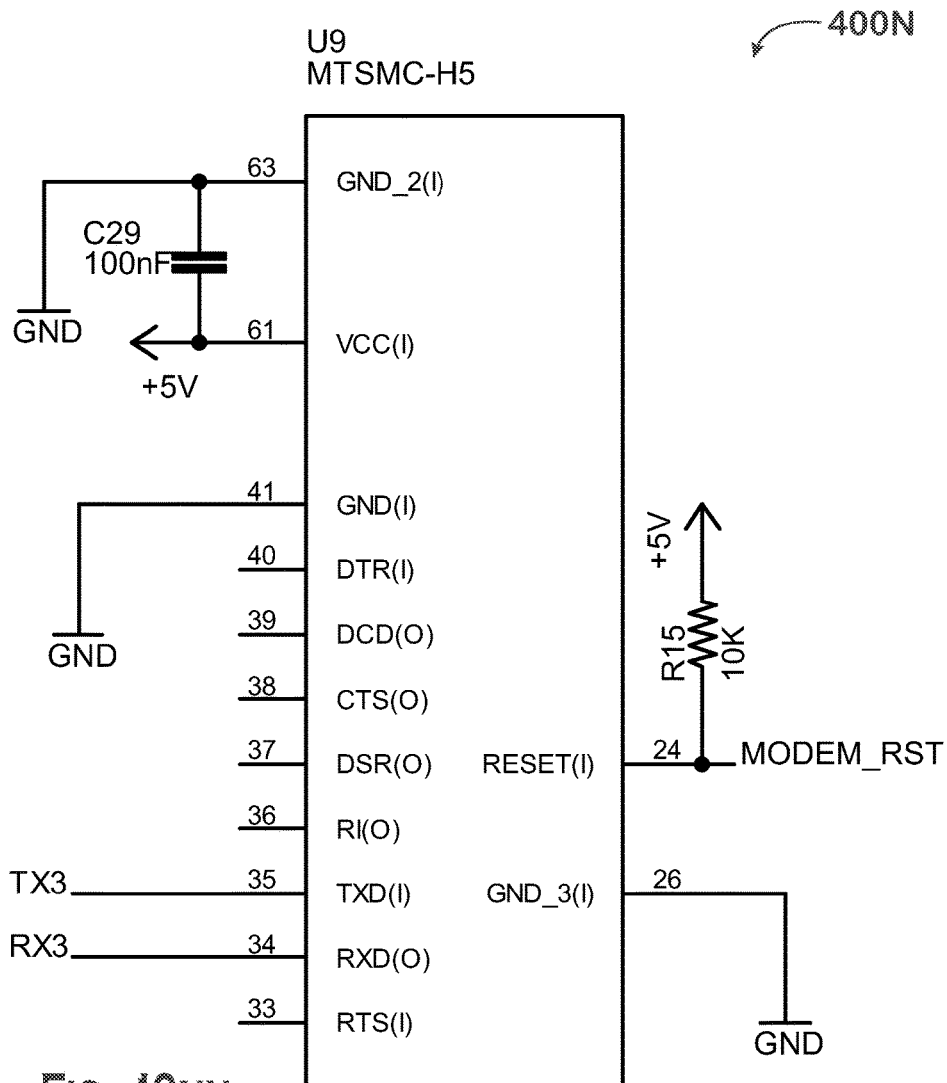
Figure 19O:
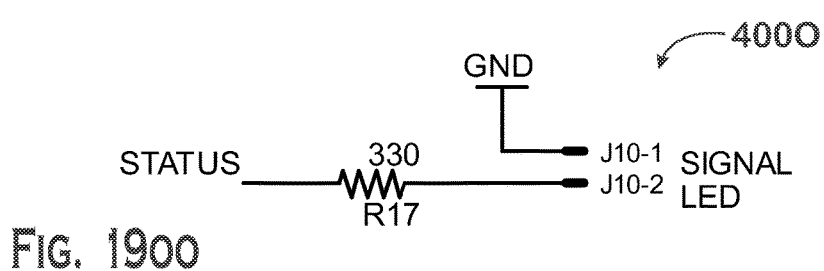

Referring to FIGS. 2 and 3, the first and second sensors 32A, 32B may be in electronic communication with a processor 34. The first and second sensors 32A, 32B may be electrically connected to a cable 56 located on top of the container 50. As seen in FIG. 5, the first sensor 32A may have at least one wire 58 extending therefrom that extends through the seal 30, through the first end 28A, and connected to the second sensor 32B, or alternatively, the microprocessor. The second sensor 32B may have at least one wire 60 that extends to the top of the container 50. Referring to FIGS. 2, 3, and 5, the top of the container 50 may be configured for the installation of an Ethernet jack, or the like, therein that may be configured for insertion of an Ethernet cable 56, or the like. The cable 56 may extend from the top of the container 50 may electrically connect the first and second sensors 32A, 32B to the processor 34. Alternatively, communications via the first or second sensor and a processor can be accomplished wirelessly or by any other suitable method. In some instances the processor referred to in the drawings may actually be a user's cell phone or computer that is connected via the Internet, wirelessly, or via a wifi network to the sensors. Alternatively, data can be stored on the sensor apparatus and manually withdrawn for analysis. At least one of the cable 56 and the container 50 may have a predetermined color such that if multiple sensor apparatus's are being used and connected to the same processor 34, it would be easy for a user to determine the cable 56 connected to a specific sensor apparatus 20. Although, those of ordinary skill in the art will recognize from this disclosure that the first and second sensors 32A, 32B may be electrically connected to the processor 34 in any suitable way without departing from the scope of the invention. Referring to FIGS. 19A1-19A3, 19B-19O, 19P1-19P4, and 19Q, a preferred schematic of the processor 300A, 300B is shown. The preferred schematic of the processor 300A, 300B discloses a four channel controller. Referring to FIGS. 19AA1-19AA3, 19BB-19OO, 19PP1-19PP4, and 19QQ, a second preferred schematic of the processor 400A, 400B is shown. The second preferred schematic of the processor 400A, 400B discloses a six channel controller. The illustrated schematics for the processor 300A, 300B, 300C, 300D are exemplary only. Those of ordinary skill in the art will appreciate from this disclosure that any suitable circuit(s) can be used without departing from the scope of the present invention.

The processor 34 may be configured to compute a volume of the liquid 22 in the drum 24 based on the measurements of the first sensor 32A and the second sensor 32B, and, also using a plurality of inputs representing at least one of a dimension of the drum 24, a dimension of the sensor apparatus 20, and a specific gravity of the liquid 22. The processor 34 may be configured for entry of the plurality of inputs via a remote electronic device. The remote electronic device may be a cell phone, a computer, a tablet, a website, or any other suitable way. The processor 34 may be configured to automatically determine the depth of the liquid 22 in the drum 24, according to: $H=(P_b-P_a)/(PPIC*SG_{liquid})$, wherein $P_b$ is the pressure in the drum 24 at the opening 36 of the tube 26 as measured by the first sensor 32A, $P_a$ is the atmospheric pressure outside the drum 24 as measured by the second sensor 32B, $SG_{liquid}$ is the specific gravity of the liquid inside the drum 24, H is the depth, or height, of the liquid inside the drum 24 above the opening 36, PPIC is determined by $((H-TUBE_{liquidinches})*249.17)/H)$, $TUBE_{liquidinches}$, or TL in the Figures, is the height of liquid 22 in the tube above the opening 36, and 249.17 Pascals is the standard pressure exerted by a one inch column of water. however Those of ordinary skill in the art will appreciate from this disclosure that the precise pressure of one inch of water may vary due to circumstance without departing from the scope of the present invention. The processor 34 may be further configured to automatically determine the volume of the liquid 22 in the drum 24 and take into account any adjustment needed due to the presence of the sensor apparatus 20 therein. By using the depth of the liquid 22 in the drum 24 and the dimensions of the drum 24 to determine an initial volume of liquid 22 in the drum 24, the processor 34 may automatically adjust the initial volume of liquid 22 in the drum 24 to get a final volume of liquid 22 in the drum 24 that takes into account the sensor apparatus 20, according to: Vdrum-final=Vdrum-initial−((H-Dliquid-in-sensor)*A), wherein H is the depth of liquid in the drum 24; Vdrum-final is the final volume of liquid in the drum; Vdrum-initial is the initial volume of liquid in the drum 24; A is a cross sectional area of the tube 26; Dliquid-in-sensor is the depth of the liquid in the tube 26 generally above the opening in the tube determined as follows: Dliquid-in-sensor=(L−(((Pi*Vi/Ti)*(Tf/Pf))/A)), wherein L is a length of the tube 26; Pi is the initial pressure in the tube 26 prior to insertion of the tube 26 in the liquid; Vi is the initial volume of the tube 26 that is calculated by the dimensions of the tube 26; Ti is the initial temperature of air in the tube 26; Pf is a pressure in the tube 26 when the tube 26 is submerged in the liquid as calculated by the first sensor 32A; and Tf is the final temperature of the air inside the tube 26 when the tube 26 is submerged.

While a preferred method of calculating liquid volumes and heights is disclosed above, those of ordinary skill in the art will appreciate from this disclosure that any other suitable calculation method or system can be used without departing from the scope of the present invention.

The processor 34 may be configured to collect a plurality of usage data comprising at least one of a time and a temperature of liquid 22 withdrawn from the drum 24. However other usage data may be collected such as duration of the withdrawal of liquid 22 from the drum 24, and, total volume of liquid 22 withdrawn from the drum 24 without departing from the scope of the invention. The processor 34 may further be configured to compare the plurality of usage data against a plurality of predetermined data and issue an alert when a discrepancy occurs. The alert may be issued by any electronic means, such as a text, a phone call, an email, an alarm or any audible sound, a flashing light or any visual alert, or any other suitable way.

Figure 17:
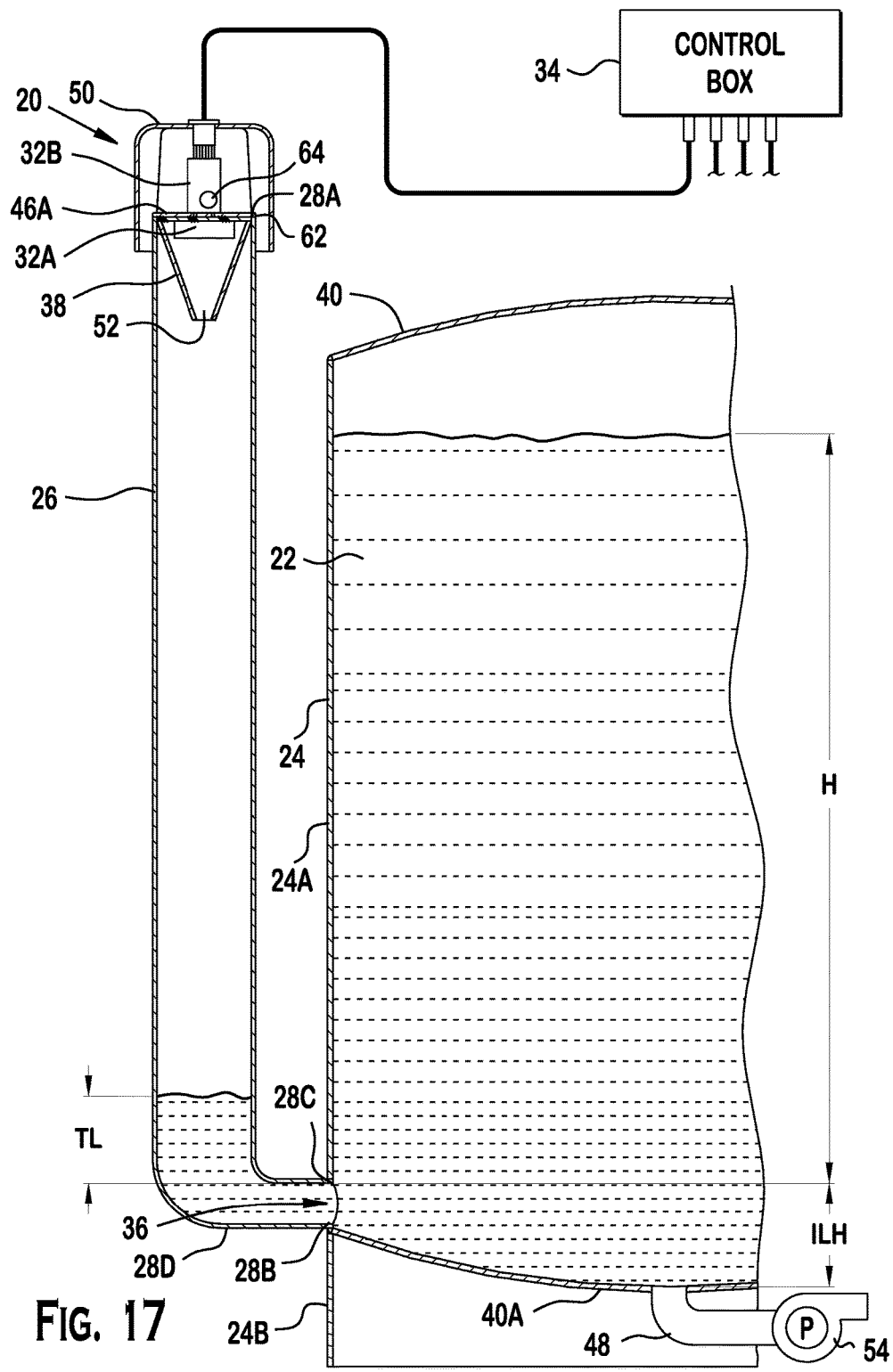
FIG. 17 is a fourth preferred embodiment of the sensor apparatus; the sensor apparatus, similar to that shown in FIG. 5, may be spaced from the drum with a portion of the tube fixed to the drum; the second end of the tube may be disposed on the sidewall of the drum such that the tube and an inside of the drum are in fluid communication; preferably, the second end of the tube is on a portion of the tube that is perpendicular to a vertical sidewall; those of ordinary skill in the art will appreciate that the portion of the tube may be at any angle with respect to the vertical sidewall without departing from the scope of the present invention; the processor may be able to calculate the height of the liquid in the drum above the opening; preferably, the height of the liquid in the drum is from an effective location to the surface of the liquid in the drum; while the effective location of the embodiment disclosed in FIG. 17 is located at a maximum height of the opening with respect to the bottom of the drum, those of ordinary skill in the art will appreciate that the effective location may be at a different location and may be changed due to a change of the angle of the portion of the tube with respect to a vertical sidewall and/or the shape of the opening without departing from the scope of the present invention; the processor may use the height of liquid in the drum along with the dimensions of the drum to determine an initial volume of liquid in the drum above effective location; preferably, the processor takes into account the vertical distance between the effective location and the bottom of the drum in order to calculate a finial height of the liquid in the drum that can be used to calculate the total volume of liquid in the drum, or, the processor may determine the volume of liquid below the effective location of the drum based on the drums dimensions and add this volume to the initial volume in the drum to calculate the total volume of liquid in the drum; preferably, the processor is configured to determine the volume of liquid in the tube so that the processor may determine a final volume of liquid by adding the volume of liquid in the tube to the total volume of liquid in the drum; the drum may have a hose connected to the bottom of the drum; however, those of ordinary skill in the art will appreciate that the hose may be located at any point on the drum without departing from the scope of the present invention; the hose may be connected to a pump and configured to withdrawal liquid from the drum; however, more sophisticated systems, such as some advanced hoofbath systems, may operate without any pump or electronics and instead operate based on fluid pressures and vacuums in a generally closed circuit type of arrangement; the drum may be located on a stand to give the drum more stability, especially if the drum 24 does not have a flat bottom.

FIG. 17 shows an alternative embodiment of the sensor apparatus 20. The sensor apparatus 20, similar to that shown in FIG. 5, may be spaced from the drum 24 with the second end 28B of the tube 26 preferably disposed on the sidewall 24A of the drum 24 such that the tube 26 and an inside of the drum are in fluid communication. Said another way, the tube 26 is not located in, or configured for placement in, the drum 24. Instead, the tube 26 may be attached, or detachably connected, to a sidewall 24A of the drum 24. Preferably, the second end of the tube is on a portion 28D of the tube 26 that is perpendicular to a vertical sidewall 24A. Those of ordinary skill in the art will appreciate that the portion 28D of the tube 26 may be at any angle with respect to the vertical sidewall 24A without departing from the scope of the present invention.

The processor 34 may be able to calculate the height H of the liquid 22 in the drum above the opening 36. Preferably, the height H of the liquid 22 in the drum 24 is from an effective location 28C to the surface of the liquid 22 in the drum 24. While the effective location 28C of the embodiment disclosed in FIG. 17 is located at a maximum height of the opening 36 with respect to the bottom of the drum 40A, those of ordinary skill in the art will appreciate that the effective location 28C may be at a different location and may be changed due to a change of the angle of the portion 28D of the tube 26 with respect to a vertical sidewall 24A and/or the shape of the opening 36 without departing from the scope of the present invention. The processor 34 may use the height H of liquid 22 in the drum 24 along with the dimensions of the drum 24 to determine an initial volume of liquid in the drum above the opening 36. Preferably, the processor 34 takes into account the initial liquid height ILH, which is the vertical distance between the effective height 28C and the bottom of the drum 40A in order to calculate a finial height of the liquid 22 in the drum 24 that can be used to calculate the total volume of liquid 22 in the drum 24. Alternatively, the processor 34 may determine, or the information be inputted, the volume of liquid 22 below the effective height 28C, and, add this volume to the initial volume in the drum 24 to calculate the total volume of liquid 22 in the drum 24. Preferably, the processor 34 is configured to determine the volume of liquid in the tube to further determine a final volume of liquid by adding the volume of liquid in the tube to the total volume of liquid in the drum.

The drum 24 may be located on a stand 24B to give the drum more stability, especially if the drum 24 does not have a flat bottom 40A. The drum 24 may have a hose 48 connected to the bottom of the drum 24 that may pass through the stand 24B. However, those of ordinary skill in the art will appreciate that the hose 48 may be located at any point on the drum 24 without departing from the scope of the present invention. The hose 48 may be connected to a pump 54 and configured to withdrawal liquid 22 from the drum 24. However, more sophisticated systems, such as some advanced hoofbath systems, may operate without any pump 54 or electronics and instead operate based on fluid pressures and vacuums in a generally closed circuit type of arrangement. This type of advanced hoofbath system is detailed in U.S. Pat. No. 8,347,821 which is hereby incorporated by reference in its entirety as if fully set forth herein.

Preferred implementations of preferred methods of the present invention will be described below (alone or in combination with various embodiments of the sensor apparatus 20). The steps of the method of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below method preferably, but not necessarily, operate in a generally similar manner to that described elsewhere in this application.

Referring to FIGS. 8-10, one method according to the present invention is directed to a method of providing a system for measuring a depth of a liquid 22 in a drum 24. The method preferably includes providing a first sensor 32A configured to be located in fluid communication with an inside of the drum 24. The first sensor 32A preferably is an air pressure sensor that generates a first signal corresponding to the pressure of the liquid 22 at a bottom of the drum 24. The method preferably includes the step of providing a second sensor 32B that is configured to be in fluid communication with ambient atmosphere outside of the drum 24. Wherein the second sensor 32B may be an air pressure sensor that generates a second signal corresponding to ambient pressure outside the drum 24. The method may include the step of providing a tube 26 having a first end and a second end 28A, 28B, wherein the second end 28B is configured for placement within the liquid 22. The tube 26 may include a seal 30 positioned in the tube 26 and spaced from the second end 28B, wherein the first sensor 32A is configured to be located between the seal 30 and the second end 28B. The method may include the step of configuring the second sensor 32B to be located at any one of on the first end 28A of the tube 26, between the seal 30 and the first end, in a compartment attached to the tube 26, and spaced from the system. The method may include the step of providing an opening 36 located in the second end 28B of the tube 26 and configured to let the liquid 22 in the drum 24 partially fill the tube 26 between the second end 28B and the seal 30. The method may include the step of providing a shield 38 configured to be located between the second end 28B and the seal 30, wherein the is preferably configured to form a barrier between the first sensor 32A and an inner surface of the tube 26 such that a drop of the liquid 22 is less likely to flow down the inner surface of the tube 26 and contact the first sensor 32A. The method may further comprise an outer tube 44 having third and fourth ends 46A, 46B disposed over the tube 26 and configured to withdraw the liquid 22 from the drum 24 when the system is inserted into a hole 42 in a top 40 of the drum 24. The third end 46A of the outer tube 44 may be sealed to the tube 26 at a location on the tube 26 spaced from the second end 28B. The method may include a container 50 positioned on the first end 28A of the tube 26, wherein, the container 50 houses the second sensor 32B therein and forms a second seal 62 between the outer tube 44 and the tube 26, and, the third end 46A of the outer tube 44 and the atmosphere. The method may comprise placing at least one device 68 within the fourth end 46B such that the at least one device 68 preferably is designed to prevent the liquid 22 in the outer tube 44 from exiting the system between the tube 26 and the outer tube 44 via the fourth end 46B when the sensor apparatus 20 is withdrawn from the liquid 22 in the drum 24. Preferably, the at least one device 68 is configured to allow the liquid 22 to enter the outer tube 44 through the fourth end 46B. The method may comprise of configuring at least a portion of the tube 26 to protrude from the fourth end 46B of the outer tube 44 so that withdrawal of the liquid 22 from the drum 24 via the outer tube 44 does not create suction that seals the outer tube 44 to a bottom of the drum 24. The method preferably includes the step of providing a at least one software module stored on a non-transitory computer readable storage medium, the software module being configured such that when operating on a processor 34, the processor 34 is configured to automatically determine the depth of the liquid 22 in the drum 24 based on at least one of the first signal and the second signal.

The module may be provided via dvd, on a processor, or via electronic download or the like. The method may provide the step of providing a processor 34 including the at least one software module thereon, wherein the processor 34 is configured to automatically determine at least the depth of the liquid 22 in the drum 24 based on at least one of the first signal and the second signal. The provided processor may be that already owned by a user of the invention. This would enable a first sensor to be properly positioned in the drum and have electronic signals transferred to a computer on which the requisite software module is downloaded without departing from the scope of the present invention.

Figure 18:
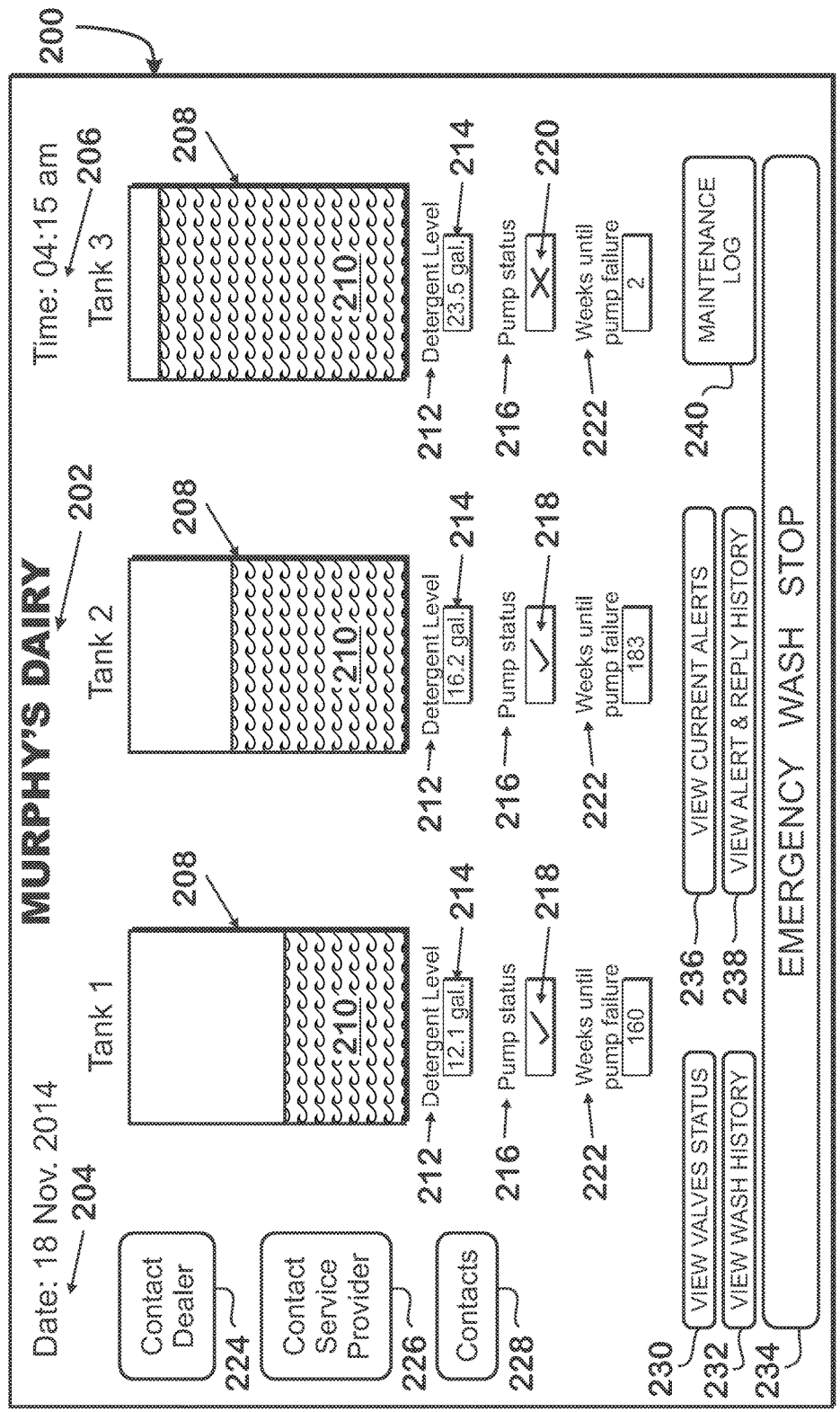
FIG. 18 is view of the graphic user interface (GUI) of the processor; the GUI may be located on the processor or may be accessible online or by the use of an electronic device; the GUI preferably has the name of the dairy farm, or other business, at the top; under the name, the GUI may have the current date and time; below the date and time, the GUI may have pictures of drums showing the depth of the liquid in the drum; underneath the pictures of the drums, the GUI preferably lists the liquid in each drum along with the volume of the liquid in the drum, the pump status, and the weeks until pump failure; the GUI may indicate that the pump has not reached its minimum volume threshold level for a wash by showing an "X" next to pump status; if the pump has met the minimum volume threshold, the GUI may indicate the pump is okay by showing a checkmark next to pump status; to the left of the pictures of the drums, the GUI may have a contact dealer button and a contact service provider button that, when pressed, automatically contact the dealer and service provider, respectively, either by a call, text, email, or the like; the GUI may also have a contacts button that allows a user to view and contact all stored contacts; at the bottom of the GUI may be a bunch of buttons such as buttons that may allow a user to view valve status, view current alerts, view wash history, view alert and reply history, maintenance log, and a button to stop wash immediately; however those of ordinary skill in the art will recognize that the GUI may include any suitable data, information, artwork, phrases, numbers, words, letters, or the like, in any arrangement without departing from the scope of the invention.

Referring to FIG. 18, a view of the graphic user interface (GUI) 200 of the processor 34 is shown. The GUI 200 may be located on the processor 34 or may be accessible online or by the use of an electronic device. The GUI 200 preferably has the name of the dairy farm 202, or other business, at the top. Under the name 202, the GUI 200 may have the current date 204 and the current time 206. Below the date and time 204, 206, the GUI 200 may have pictures of drums 208 showing the depth of the liquid 210 in the drum 208. Underneath the pictures of the drums 208, the GUI 200 preferably lists the type of liquid 212 in each drum, the volume of the liquid 214 in the drum, the pump status 216, and the weeks until pump failure 222. The GUI 200 may indicate that the pump has not reached its minimum volume threshold level for a wash by showing an "X" 220 next to pump status 216. If the pump has met the minimum volume threshold, the GUI 200 may indicate the pump is okay by showing a checkmark 218 next to pump status 216. To the left of the pictures of the drums 208, the GUI 200 may have a contact dealer 224 button and a contact service provider button 226 that, when pressed, automatically contact the dealer and service provider, respectively, either by a call, text, email, or the like. The GUI 200 may also have a contacts button 228 that allows a user to view and contact all stored contacts. At the bottom of the GUI 200 may be a bunch of buttons such as buttons that may allow a user to view valve status 230, view current alerts 236, view wash history 230, view alert and reply history 238, maintenance log 240, and a button to stop wash immediately 234. However those of ordinary skill in the art will recognize that the GUI 200 may include any suitable data, information, artwork, phrases, numbers, words, letters, or the like, in any arrangement without departing from the scope of the invention.

The method may include the step of configuring the processor 34 to receive a plurality of inputs representing at least one of a dimension of the drum 24, a dimension of the sensor apparatus 20, and a specific gravity of the liquid 22 for use in computing a volume of the liquid 22 in the drum 24. The method may include the step of configuring the processor 34 to subtract the ambient pressure outside the drum 24 from the pressure of the liquid 22 at a bottom of the drum 24. The method may include the step of configuring the processor 34 such that the plurality of inputs may be entered via a remote electronic device. The method may include the step of configuring the processor 34 to automatically determine the depth of the liquid 22 in the drum 24 according to: $H=(P_b-P_a)/(PPIC*SG_{liquid})$, wherein $P_b$ is the pressure in the drum 24 at the opening 36 of the tube 26 as measured by the first sensor 32A, $P_a$ is the atmospheric pressure outside the drum 24 as measured by the second sensor 32B, $SG_{liquid}$ is the specific gravity of the liquid inside the drum 24, H is the depth, or height, of the liquid inside the drum 24 and above the opening 36, PPIC is determined by $((H-TUBE_{liquidinches})*249.17)/H)$, where $TUBE_{liquidinches}$ is the height of liquid in the tube above the opening 36, and 249.17 is the standard pressure exerted by a one inch column of water. The method may include the step of configuring the processor 34 to automatically determining the volume of the liquid in the drum 24 and taking into account any adjustment needed due to the presence of the tube 26 therein by using the depth of the liquid in the drum 24 and dimensions of the drum 24 to determine an initial volume of liquid 22 in the drum 24, then the processor 34 automatically adjusts the initial volume of liquid 22 in the drum 24 to get a final volume of liquid 22 in the drum 24 that takes into account the tube 26, according to: Vdrum-final=Vdrum-initial−((H−Dliquid-in-sensor)*A), wherein H is the depth of liquid in the drum 24; Vdrum-final is the final volume of liquid in the drum 24; Vdrum-initial is the initial volume of liquid in the drum 24; A is a cross sectional area of the tube 26; Dliquid-in-sensor is the depth of the liquid in the tube 26 determined as follows: Dliquid-in-sensor=(L−(((Pi*Vi/Ti)*(Tf/Pf))/A)), wherein L is a length of the tube 26; Pi is the initial pressure in the tube 26 prior to insertion of the tube 26 in the liquid; Vi is the initial volume of the tube 26 that is calculated by the dimensions of the tube 26; Ti is the initial temperature of air in the tube 26; Pf is a pressure in the tube 26 when the tube 26 is submerged in the liquid as calculated by the first sensor 32A; and Tf is the final temperature of the air inside the tube 26 when the tube 26 is submerged. Those of ordinary skill in the art will recognize that the above formulas may be modified, or other formulas used in replace, without departing from the scope of the invention. The method may include the step of configuring the processor 34 to collect a plurality of usage data comprising at least one of a time, a temperature of liquid, and a volume of liquid withdrawn from the drum 24. The method may include the step of configuring the processor 34 to compare the plurality of usage data against a plurality of predetermined data and issue an alert when a discrepancy occurs. Although the first and second sensors are preferably air pressure sensors, one ordinary skill in the art will appreciate from this disclosure that any other suitable sensor may be used without departing from the scope of the present invention.

Figure 13B:
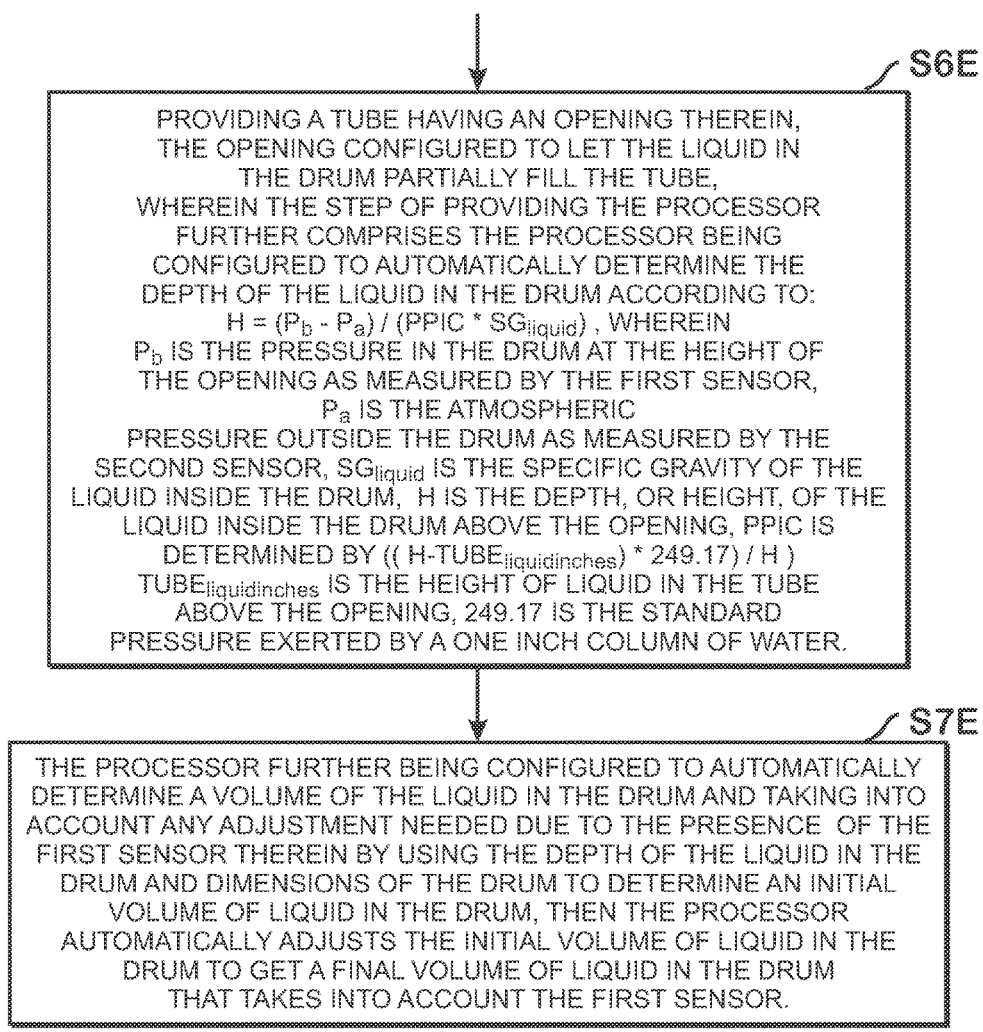

Referring to FIGS. 11-13, one method according to the present invention is directed to a method for measuring a depth of a liquid 22 in a drum 24 used as part of a system for use in at least one of agricultural, equipment cleaning, and animal husbandry. The method preferably includes providing the drum 24 configured to contain the liquid 22 used in the system. Preferably, the drum 24 is cylindrically shaped, however, the drum 24 may be of any shape or dimensions without departing from the scope of the invention. The method preferably includes providing a first sensor 32A located in fluid communication with an inside of the drum 24, the first sensor 32A being an air pressure sensor generating a first signal corresponding to the pressure of the liquid 22 at a bottom of the drum 24. Those of ordinary skill in the art will recognize that the first sensor 32A may generate a first signal corresponding to the pressure of the liquid 22 at any predetermined or known distance from the bottom of the drum 24 without departing from the scope of the invention. The method preferable includes providing a second sensor 32B in fluid communication with ambient atmosphere outside of the drum 24, the second sensor 32B being an air pressure sensor generating a second signal corresponding to ambient pressure outside the drum 24. Those of ordinary skill in the art will appreciate from this disclosure that any type of sensor can or other suitable device can be used as the first or second sensor without departing from the scope of the present invention. Similarly, the second sensor can be omitted entirely without departing from the scope of the present invention. Alternatively, the second sensor 32B may be in fluid communication with air inside the drum 24. As previously discussed, the second sensor 32B may be provided in order to obtain more accurate calculations of the depth of the liquid 22 in the drum 24 by accounting for changes in pressure due to changes the atmospheric pressure or by wind gusts, etc. As such, those of ordinary skill in the art will recognize that the method does not need to provide a second sensor or second signal. The method may include the step of providing a tube 26 having a first end and a second end 28A, 28B, wherein the second end 28B may be configured for placement within the liquid 22. The method may include an outer tube 44 having third and fourth ends 46A, 46B disposed over the tube 26, wherein the outer tube 44 is configured to withdraw the liquid 22 from the drum 24 when the tube 26 is inserted into a hole 42 in a top 40 of the drum 24. The method preferably includes the step of determining the depth of the liquid 22 in the drum 24 based on at least one of the first signal and the second signal. This step may further comprise of providing at least one software module stored on a non-transitory computer readable storage medium, the software module being configured such that when operating on a processor 34, the processor 34 is configured to automatically determine the depth of the liquid 22 in the drum 24 based on at least one of the first signal and the second signal. The method may include the step of providing a processor 34 including the at least one software module thereon, wherein the processor 34 automatically determines the depth of the liquid 22 in the drum 24 based on at least one of the first signal and the second signal. This step may further include the processor 34 being configured to receive a plurality of inputs representing at least one of a dimension of the drum 24, a dimension of the sensor apparatus 20, and a specific gravity of the liquid 22 for use in computing a volume of the liquid 22 in the drum 24. This step may further include the processor 34 being configured to subtract the ambient pressure outside the drum 24 from the pressure of the liquid 22 at a bottom of the drum 24. This step may further include the processor 34 being configured for entry of the plurality of inputs via a remote electronic device. This step may further include the processor 34 being configured to automatically determine the depth of the liquid 22 in the drum 24 according to: $H=(P_b-P_a)/(PPIC*SG_{liquid})$, wherein $P_b$ is the pressure in the drum 24 at the opening 36 of the tube 26 as measured by the first sensor 32A, $P_a$ is the atmospheric pressure outside the drum 24 as measured by the second sensor 32B, $SG_{liquid}$ is the specific gravity of the liquid inside the drum 24, H is the depth, or height, of the liquid inside the drum 24 and above the opening 36, PPIC is determined by $((H-TUBE_{liquidinches})*249.17)/H)$, where $TUBE_{liquidinches}$ is the height of liquid in the tube above the opening 36, and 249.17 is the standard pressure exerted by a one inch column of water. This step may further include the processor 34 automatically determining a volume of the liquid in the drum 24 and taking into account any adjustment needed due to the presence of the tube 26 therein by using the depth of the liquid in the drum 24 and dimensions of the drum 24 to determine an initial volume of liquid in the drum 24, then the processor 34 automatically adjusts the initial volume of liquid in the drum 24 to get a final volume of liquid in the drum 24 that takes into account the tube 26, according to: Vdrum-final=Vdrum-initial-((H-Dliquid-in-sensor)*A), wherein H is the depth of liquid in the drum; Vdrum-final is the final volume of liquid in the drum; Vdrum-initial is the initial volume of liquid in the drum 24; A is a cross sectional area of the tube 26; Dliquid-in-sensor is the depth of the liquid in the tube 26 determined as follows: Dliquid-in-sensor=(L−(((Pi*Vi/Ti)*(Tf/Pf))/A)), wherein L is a length of the tube 26; Pi is the initial pressure in the tube 26 prior to insertion of the tube 26 in the liquid; Vi is the initial volume of the tube 26 that is calculated by the dimensions of the tube 26; Ti is the initial temperature of air in the tube 26; Pf is a pressure in the tube 26 when the tube 26 is submerged in the liquid as calculated by the first sensor 32A; and Tf is the final temperature of the air inside the tube 26 when the tube 26 is submerged. This step may further include the processor 34 being configured to collect a plurality of usage data comprising at least one of a time, a temperature, and the volume of liquid 22 withdrawn from the drum 24. This step may further include the processor 34 being configured to compare the plurality of usage data against a plurality of predetermined data and issue an alert when a discrepancy occurs. The step of providing the drum 24 may include the system being a dairy wash system that is configured to use the liquid 22 in the drum 24. The dairy wash system may perform a predetermined number of washes, wherein the dairy wash system only withdraws liquid 22 from the drum 24 during a wash. The step of providing the processor 34 may also include the processor 34 being configured to determine when the wash is taking place and when the wash is completed by analyzing the first and second signals. The step of providing the processor 34 may further include the processor 34 being configured to determine a volume of liquid 22 used during the wash. The step of providing the processor 34 may further include the processor 34 being configured to send an alert if the volume of liquid 22 used during the wash is lower than a predetermined volume, or, if the volume of liquid 22 in the drum 24 is below a predetermined minimum volume. A person of ordinary skill in the art will recognize that a wash may use multiple liquids that are in multiple drums. As such, each liquid, or drum, may include the aforementioned method. A person of ordinary skill in the art will recognize that at least one processor 34 may be used to measure the depth of liquid and/or a volume of liquid 22 in each drum simultaneously. A person of ordinary skill in the art will further recognize that a wash may use multiple liquids at the same time, or at different times, and the processor 34 may be configured to determine whether a wash has occurred by analyzing at least one of: a change in depth of at least one liquid, a change in volume of at least one liquid, an order for which each of the liquids was withdrawn, a time of withdrawal of at least one liquid, a duration of withdrawal of at least one liquid, a temperature of at least one liquid, etc.

Figure 16B:
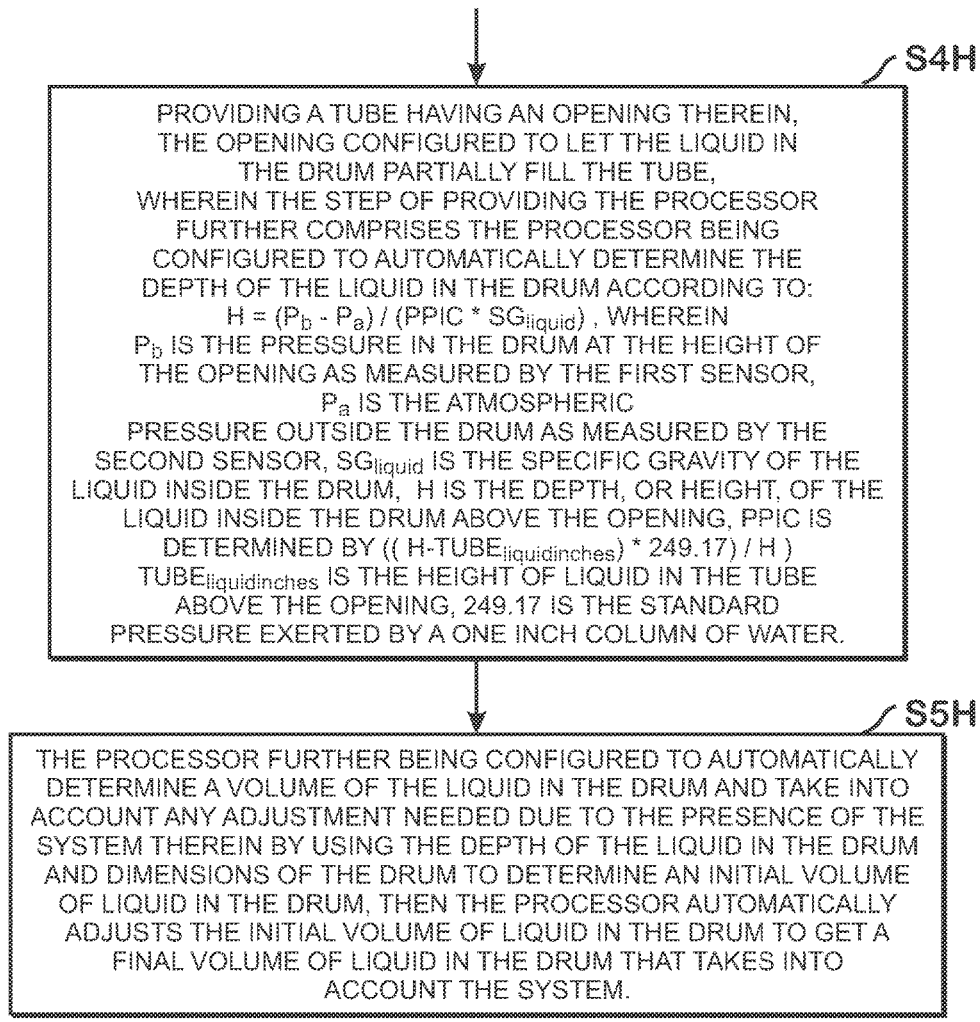

Referring to FIGS. 14-16, one method according to the present invention is directed to a method for providing a system for measuring a depth of a liquid 22 in a drum 24. The method preferably includes the step of providing a first sensor 32A configured to be located in fluid communication with an inside of the drum 24, wherein the first sensor 32A may be an air pressure sensor that generates a first signal corresponding to the pressure of the liquid 22 at a bottom of the drum 24. The method preferable includes the step of providing a second sensor 32B configured to be in fluid communication with ambient atmosphere outside of the drum 24, wherein the second sensor 32B may be an air pressure sensor that generates a second signal corresponding to ambient pressure outside the drum 24. The method may include the step of providing a tube 26 having a first end and a second end 28A, 28B, wherein the second end 28B may be configured for placement within the liquid 22. The step of providing the tube 26 may further include an outer tube 44 having third and fourth ends 46A, 46B and configured to be disposed over the tube 26, wherein the outer tube 44 may be configured to withdraw the liquid 22 from the drum 24 when the system is inserted into a hole 42 in a top 40 of the drum 24. The method preferably includes the step of providing at least one software module stored on a non-transitory computer readable storage medium. The software module may be configured such that when operating on a processor 34, the processor 34 is configured to automatically determine the depth of the liquid 22 in the drum 24 based on at least one of the first signal and the second signal and to automatically determine whether a liquid 22 withdrawal has occurred or whether changes in the first signal represent a non-withdrawal event. A withdrawal event is when liquid from the drum is purposefully being withdrawn. A non withdrawal event can be any event that changes pressure in the drum, but is not actually a purposeful liquid withdrawal, such as a jostling of the drum, knocking of the sensor apparatus, a strong wind, sudden change in temperature from hail or other weather, or the like.

The method may comprise the step of providing a processor 34 that includes the at least one software module thereon, wherein the processor 34 receives the first and second signals and automatically determines the depth of the liquid 22 in the drum 24 and automatically determines whether a liquid 22 withdrawal has occurred or whether changes in the first signal represent a non-withdrawal event. This step may further include the processor 34 being configured to receive a plurality of inputs representing at least one of a dimension of the drum 24, a dimension of the sensor apparatus 20, and a specific gravity of the liquid 22 for use in computing a volume of the liquid 22 in the drum 24. This step may further include the processor 34 being configured to subtract the ambient pressure outside the drum 24 from the pressure of the liquid 22 at a bottom of the drum 24. This step may further include the processor 34 being configured for entry of the plurality of inputs via a remote electronic device. This step may further include the processor 34 being configured to automatically determine the depth of the liquid 22 in the drum 24 according to: $H=(P_b-P_a)/(PPIC*SG_{liquid})$, wherein $P_b$ is the pressure in the drum 24 at the opening 36 of the tube 26 as measured by the first sensor 32A, $P_a$ is the atmospheric pressure outside the drum 24 as measured by the second sensor 32B, $SG_{liquid}$ is the specific gravity of the liquid inside the drum 24, H is the depth, or height, of the liquid inside the drum 24 and above the opening 36, PPIC is determined by $((H-TUBE_{liquidinches})*249.17)/H)$, where $TUBE_{liquidinches}$ is the height of liquid in the tube above the opening 36, and 249.17 is the standard pressure exerted by a one inch column of water. This step may further include the processor 34 automatically determining a volume of the liquid 22 in the drum 24 and taking into account any adjustment needed due to the presence of the tube 26 therein by using the depth of the liquid 22 in the drum 24 and dimensions of the drum 24 to determine an initial volume of liquid 22 in the drum 24, then the processor 34 automatically adjusts the initial volume of liquid 22 in the drum 24 to get a final volume of liquid 22 in the drum 24 that takes into account the tube 26, according to: Vdrum-final=Vdrum-initial−((H-Dliquid-in-sensor)*A), wherein H is the depth of liquid 22 in the drum 24; Vdrum-final is the final volume of liquid 22 in the drum; Vdrum-initial is the initial volume of liquid 22 in the drum; A is a cross sectional area of the tube 26; Dliquid-in-sensor is the depth of the liquid in the tube 26 determined as follows: Dliquid-in-sensor=(L−(((Pi*Vi/Ti)*(Tf/Pf))/A)), wherein L is a length of the tube 26; Pi is the initial pressure in the tube 26 prior to insertion of the tube 26 in the liquid; Vi is the initial volume of the tube 26 that is calculated by the dimensions of the tube 26; Ti is the initial temperature of air in the tube 26; Pf is a pressure in the tube 26 when the tube 26 is submerged in the liquid 22 as calculated by the first sensor 32A; and Tf is the final temperature of the air inside the tube 26 when the tube 26 is submerged. This step may further include the processor 34 being configured to collect a plurality of usage data comprising at least one of a time, a temperature, and the volume of liquid 22 withdrawn from the drum 24.

The step of determining whether the liquid 22 withdrawal has occurred may further include the first sensor 32A generating the first signal at a predetermined interval and the second sensor 32B generating the second signal at the predetermined interval. The step of providing the processor 34 may include the processor 34 being configured to store a plurality of readings, wherein the plurality of readings may be any one of the first signal and the first signal minus the second signal. Said another way, the plurality of readings may be any one of a pressure of the liquid 22 at a certain depth, or, a pressure of the liquid 22 at a certain depth minus the pressure of the air outside or inside the drum 24. The step of providing the processor 34 may include the processor 34 being configured to compile a report, wherein the report may be an average of the plurality of readings over a predetermined time. For example, if the first and second sensors 32A, 32B generate first and second signals every second, and, a report was compiled by the processor 34 every minute, then, the report would be the average of sixty readings. The step of providing the processor 34 may further include the processor 34 being configured to store at least two of the reports. Preferably, the processor 34 stores the newest at least two reports compiled. More preferably, the processor 34 stores the newest at least three reports compiled. More preferably still, the processor 34 stores the newest at least five reports compiled. The step of providing the processor 34 may further include the processor 34 being configured to determine a pressure difference between at least two of the reports. The step of providing the processor 34 may further include the processor 34 being configured to recognize the liquid withdrawal when the pressure difference between at least two of the reports is greater than a predetermined pressure. The step of providing the processor 34 may further include the processor 34 being configured to determine a total pressure difference when the liquid withdrawal has ended between the pressure of the liquid 22 at the bottom of the drum 24 before the liquid withdrawal started and the pressure of the liquid 22 at the bottom of the drum 24 after the liquid withdrawal ended. The step of providing the processor 34 may further include the processor 34 being configured to determine a volume of the liquid withdrawn in the liquid withdrawal by analyzing the total pressure difference.

A preferred method of determining whether a liquid withdrawal has occurred or whether changes in the first signal represent a non-withdrawal event operates as follows. The preferred method is not limiting, but is solely meant to provide an example. The liquid 22 in a drum 24 may be used for the purpose of washing dairy equipment. Preferably, the washing cycle for the dairy equipment withdrawals liquid 22 from the drum 24 for a predetermined amount of time. The first and second sensors 32A, 32B may generate first and second signals, respectively, every 512 milliseconds. Preferably, but not necessarily, the processor 34 stores a plurality of readings wherein each reading is the pressure at the bottom of the drum 24 as measured by the first sensor 32A and carried in the first signal minus the pressure of ambient air outside the drum 24 as measured by the second sensor 32B and carried in the second signal. Preferably, but not necessarily, the processor 34 compiles a report that averages a plurality of readings over a time period that is equal to or greater than the predetermined amount of time the washing cycle withdrawals liquid 22 from the drum 24. More preferably, the processor 34 compiles a report that averages a plurality of readings over a time period that is equal to the predetermined amount of time the washing cycle withdrawals liquid 22 from the drum 24. Preferably, but not required, the processor 34 stores the five newest reports compiled. For simplicity, assume that the reports are numbered 1-5 where 1 is the newest report compiled and 5 is the $5^{th}$ newest report compiled such that as soon as a report is compiled it becomes number one and the other reports move down a number as follows: 1 becomes 2, 2 becomes 3, 3 becomes 4, 4 becomes 5, and 5 gets deleted. Since the length of time the washing cycle withdrawals liquid 22 is preferably equal to the length of time to generate a new report, a withdrawal by the washing cycle may only occur during a single report or two consecutive reports. Said another way, if a liquid withdrawal started at some point within the readings averaged by the third report, the liquid withdrawal would have ended at some point within the readings averaged by the second report. Preferably, the processor 34 compares the average pressures taken in the fifth report and the third report. Preferably, if the average pressure taken in the fifth report minus the average pressure taken in the third report is greater than twenty Pascal's, the processor 34 determines a withdrawal has taken place. Preferably, the processor 34 uses the average pressure taken in the first report as the post-withdrawal pressure at the bottom of the drum 24 after determining a liquid withdrawal has taken place. Preferably, the processor 34 determines the pressure drop caused by a liquid withdrawal by taking the fifth report minus the first report instantaneously after the processor 34 determines a withdrawal has occurred. The processor 34 may use the pressure drop to determine the depth of liquid 22 used in the liquid withdrawal and/or to determine the volume of liquid 22 used in the washing cycle. Preferably, if the volume of liquid 22 used in the washing cycle is lower than a predetermined volume, the processor 34 is configured to send an alert. Preferably, the alert re-sends after a pre-determined amount of time in perpetuity until an acknowledgement, such as a text reply, is received by the processor. However, the acknowledgment may be any other suitable acknowledgment of the alert without departing from the scope of the invention.

Referring to FIGS. 1, 3, 4, 7A, and 7B, one embodiment of at least one sensor apparatus 20 for use in a dairy wash system operates as follows. Preferably, but not necessarily, the dairy wash system includes a washing cycle for dairy equipment. Preferably, the washing cycle commences after milking of cows. Preferably, the washing cycle withdrawals three different kinds of liquids that are located in separate drums. The liquids are preferably withdrawn by hoses 48 attached to pumps 54. The hoses 48 may have a temperature sensor thereon to measure the temperature of liquid 22 flowing through the hose 48. However, the washing cycle may withdrawal any number of liquids from any number of drums without departing from the scope of the invention. Preferably, the three liquids used are a detergent, an acid, and a sanitizer. Preferably, each of the liquids are in their own drum, wherein each drum 24 includes a sensor apparatus 20 therein. Preferably, the first and second sensors 32A, 32B in each sensor apparatus 20 are electronically connected to a single processor 34. However, any number of processors may be used without departing from the scope of the invention. Preferably, the processor 34 is configured for entry of a plurality of inputs via a text from a cell phone. However, those of ordinary skill in the art will appreciate that the plurality of inputs may be entered via any electronic device. Preferably, the plurality of inputs the processor 34 is configured to receive is at least one of: number of liquids used in washing cycle, order in which the liquids are to be withdrawn from their respective drums during the washing cycle wherein at least two liquids may be programmed to be withdrawn at the same time, the specific gravities of the liquids used, the number of washing cycles expected per day, the number of seconds each pump 54 is configured to withdrawal each liquid 22 out of their respective drums, phone numbers to send a text message alert to, and the dairy name.

Figure 7B:
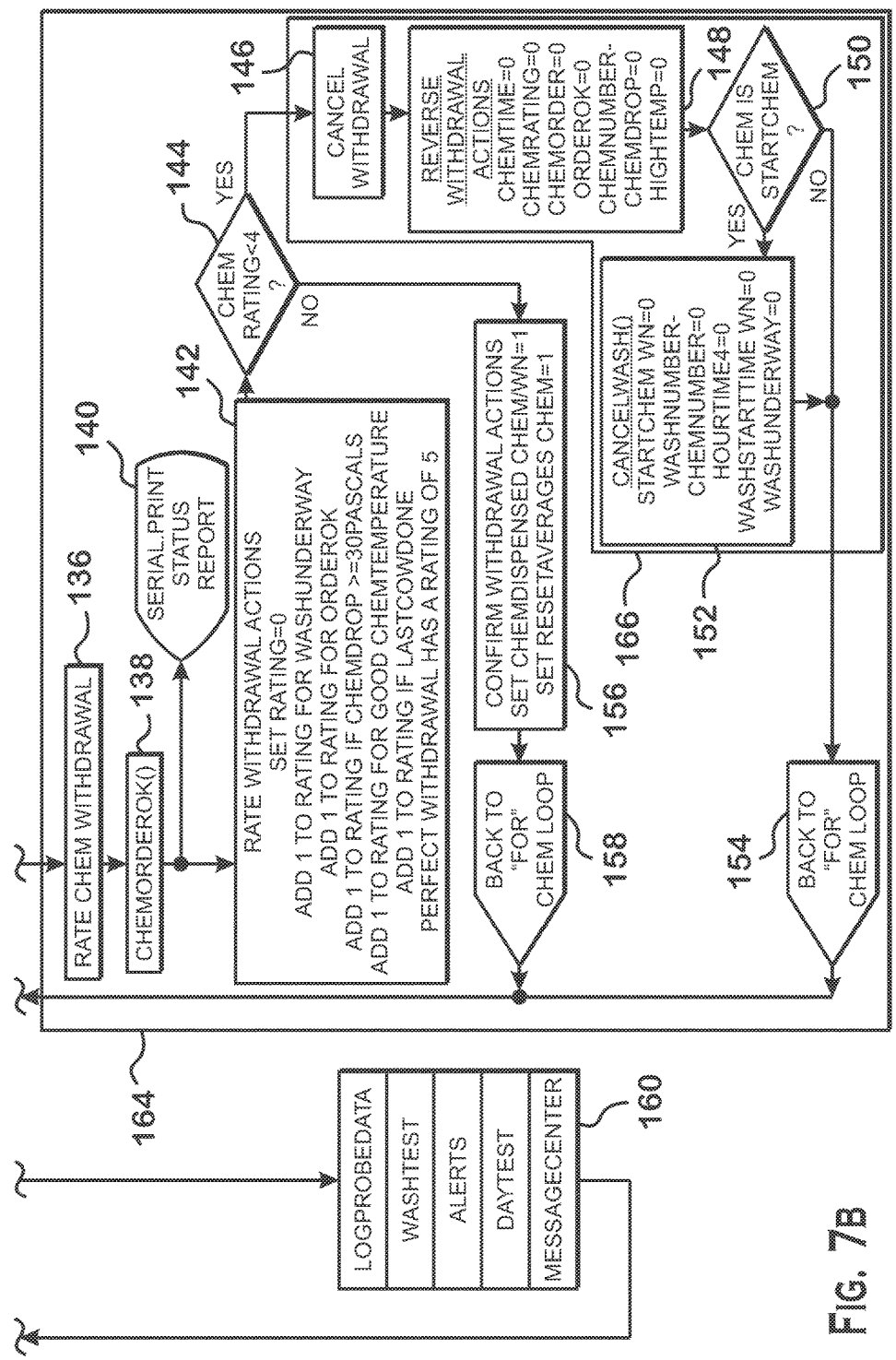

Preferably, as seen in FIGS. 7A and 7B, the processor 34 is further configured to determine when a washing cycle has begun and ended. Referring to FIG. 7A, the processor 34 is preferably configured to determine when a washing cycle has started and ended by first determining if the temperature recorded by a temperature sensor on a milk line has risen a predetermined number of degrees in a predetermined time period 104, therefore, meaning that the milking of cows is over. If the processor 34 has determined that the temperature of the milk line has risen a predetermined number of degrees within a predetermined time period 104, the processor 34 is preferably configured to start storing readings 108 of the pressure measured by the first sensor 32A minus the pressure measured by the second sensor 32B for each of the sensor apparatus's. Preferably, the processor 34 is further configured to start compiling reports 118 for each sensor apparatus 20, wherein, preferably, the length of time the processor 34 takes to compile a new report for any given sensor apparatus 20 is the same amount of time the liquid 22 the sensor apparatus 20 is placed in is programmed to be withdrawn from the drum 24 during a wash cycle. Preferably, the processor 34 is configured to store the newest of at least two reports for every liquid 22 used in the washing cycle. More preferably, the processor 34 is configured to store the newest of at least three reports for every liquid 22 used in the washing cycle. More preferably still, the processor 34 is configured to store the newest five reports for every liquid 22 used in the washing cycle.

Still referring to FIG. 7A, preferably, the processor 34 is further configured to analyze 120 the stored reports for each liquid 22. Preferably, the processor 34 determines whether a liquid withdrawal has started 122 in any of the liquids used in the washing cycle. Specifically, the processor 34 preferably determines whether there is greater than a twenty Pascal pressure difference in the fifth newest report and first newest report and, whether there is less than a twenty Pascal pressure difference between the fifth newest report and the third newest report for all liquids used. If so, the processor 34 is preferably configured to determine that a withdrawal of the respective liquid has just started 124. If not, the processor 34 preferably starts the determination again when a new report is compiled. Preferably, the processor 34 is configured to determine a wash cycle has begun 128 when the processor 34 determines that a withdrawal has started on any of the liquids. Preferably, the processor 34 records the time the processor 34 determines a washing cycle has started, and, the number of washing cycles performed each day 128.

After a liquid withdrawal has occurred for any of the liquids, the processor 34 preferably is configured to determine when the liquid withdrawal has ended 132 by determining whether the pressure difference between the fifth newest report and the third newest report is greater than twenty Pascal's. If so the processor 34 is configured to determine that the liquid withdrawal for that particular liquid has ended. After determining a liquid withdrawal for a particular liquid 22 has ended, the processor 34 is preferably configured to immediately determine the pressure drop 134 of the liquid 22 at the bottom of the drum 24 by subtracting the first newest report from the fifth newest report. Subsequently, the processor 34 is preferably configured to determine the order 138 that each liquid's withdrawal ended. After the processor 34 determines that a withdrawal has started on at least one liquid, the processor 34 may be configured to start a timer 130 such that if the processor 34 fails to determine that the liquid withdrawal has ended within a predetermined length of time, the processor 34 may reverse its determination that a withdrawal has taken place.

After a liquid withdrawal for each liquid has ended, and, the order in which the liquids were withdrawn has been determined, the processor 34 is preferably configured to perform another check 142 to ensure a washing cycle, and liquid withdrawals, have indeed taken place. The check 142 preferably includes the processor 34 configured to determine if at least four of following have occurred: the processor 34 has determined a wash cycle has started; the order in which the processor 34 determined the liquid withdrawals occurred matches the order in which the liquids are to be withdrawn that was entered into the processor 34; if the pressure at the bottom of each drum 24 has dropped by thirty or more Pascal's; if the temperature recorded by a temperature sensor on the milk line has risen a predetermined number of degrees in a predetermined time period; and if the temperature sensors on each hose 48 are consistent with predetermined temperatures. If at least four have occurred 144, the processor 34 is preferably configured to confirm the washing cycle 156. Subsequently, the processor 34 is preferably configured to send an alert 160 if any data collected by the processor 34, such as temperature of the liquids flowing through the hose 48, the time of a washing cycle, or a pressure differential at the bottom of the drums after a liquid withdrawal has occurred, is inconsistent with a plurality of predetermined data. If less than four have occurred, the processor 34 preferably reverses its determination that the washing cycle has started 148. Subsequently, the processor 34 preferably begins analyzing 120 the stored reports again. FIGS. 8, 9, 10A-10B, 11, 12, 13A-13B, 14, 15, and 16A-16B illustrate alternative preferred methods for providing a system for measuring a depth of a liquid in a drum.

Figure 22:
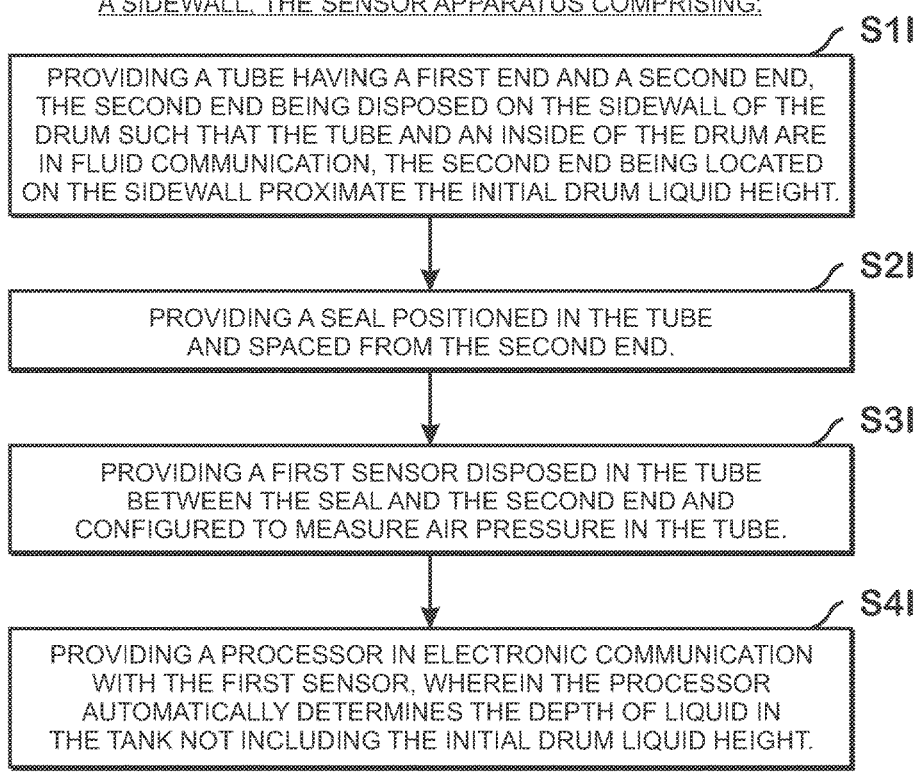
FIG. 22 is a flowchart illustrating one preferred method for providing a sensor apparatus for measuring a depth of a liquid in a drum above an initial drum liquid height.

Referring to FIG. 22, another preferred method of providing a sensor apparatus for measuring a depth of a liquid in a drum above an initial drum liquid height is provided. It is preferred that the drum include a sidewall. The method preferably includes the step of providing a tube having a first end and a second end. The second end may be disposed on the sidewall of the drum such that the tube and an inside of the drum are in fluid communication. The second end is preferably located on the sidewall proximate the initial drum liquid height.

The method may include the step of providing a seal positioned in the tube and spaced from the second end. The method may also include the step of providing a first sensor disposed in the tube between the seal and the second end and configured to measure air pressure in the tube. The method may further include the step of providing a processor in electronic communication with the first sensor, wherein the processor automatically determines the depth of liquid in the tank not including the initial drum liquid height.

Figure 23:
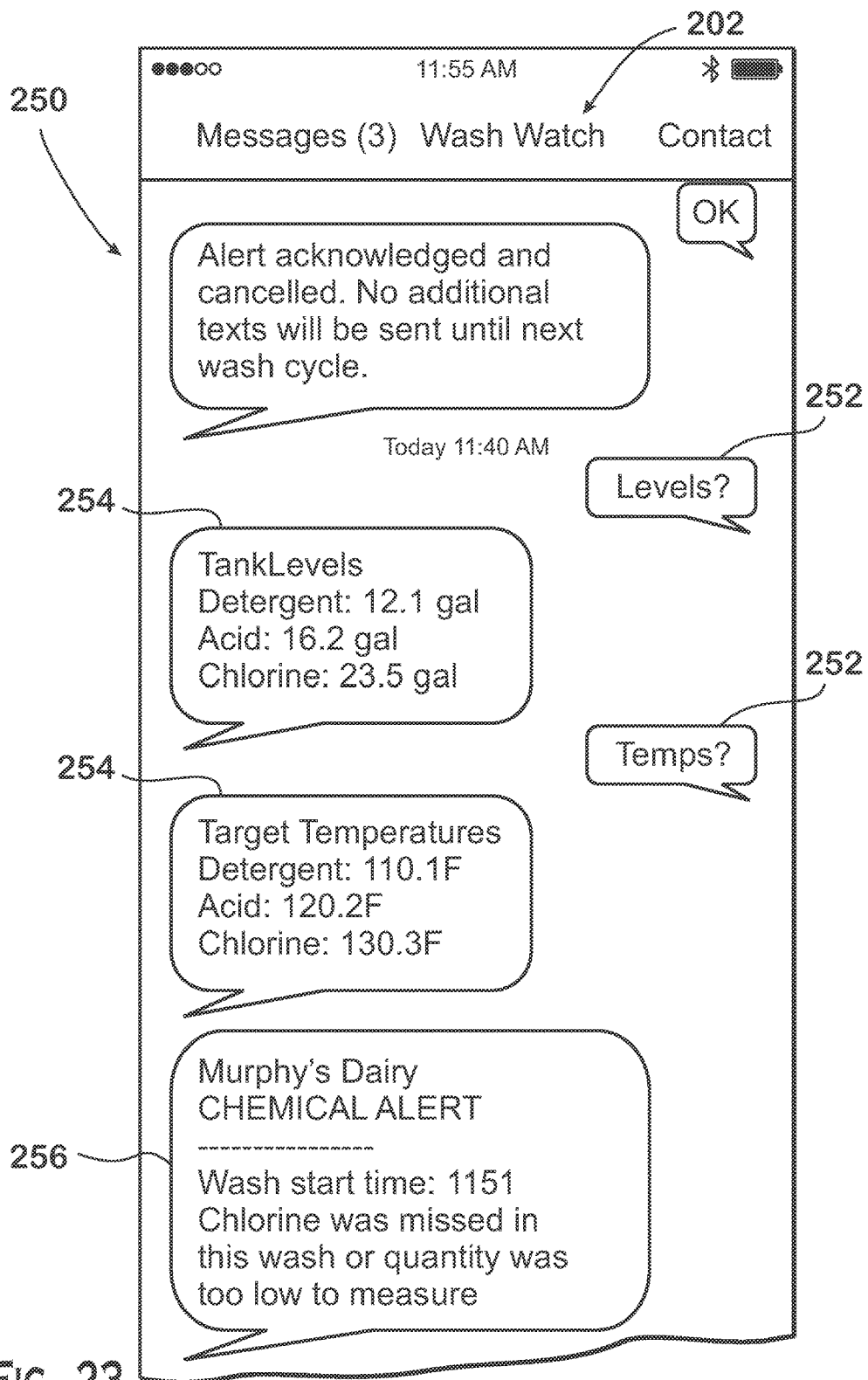
FIG. 23 is a screenshot of a sample GUI showing text messages between the processor and a person; a person may ask the processor a text inquiry and the processor may send a text inquiry reply answering the text inquiry; a person may ask the processor to send a text inquiry reply related to certain information pertaining to the liquid in the drum, such as, the volume of liquid in each drum, the temperature of the liquids in each drum, etc.; also shown is a text alert from the processor; shown is a text alert informing at least one predetermined person that a liquid did not dispense during a wash. Those of ordinary skill in the art will appreciate from this disclosure that similar error, inquiry, reply, and reminder messages or the like can be communicated via voice simulation and voice recognition or any other suitable communications means without departing from the scope of the present invention.

Referring to FIG. 23, a sample GUI for a smart phone is shown. However, those of ordinary skill in the art will recognize that the smart phone can be a tablet, an internet website, or any other electronic device without departing from the scope of the invention. The name of the dairy farm 202 may be the contact name in the smart phone. In addition to the processor 34 being configured to send a text alert 256 if any data is inconsistent with a plurality of predetermined data, the processor 34, as best seen in FIG. 23, is further preferably configured to send a text inquiry reply 254, such as the volume of liquid remaining in a drum, when a text inquiry 252 is asked. However, those of ordinary skill in the art will recognize that the inquiries may be made by any other suitable way, such as voice communication or email, without departing from the scope of the invention. Similarly, inquiry replies by the processor need not be by text, but may be made in any other suitable way without departing from the scope of the invention. Supply companies that supply certain chemicals, detergent, or other liquids to dairy farms, or other industries, often find it hard to expand their business past a certain point due the hassle of having to stop at each dairy farm when on a run to fill up drums 24 of liquid 22. Allowing the suppliers to ask the processor 34 the volume of liquids in drums on the dairy farms they supply may allow the suppliers to skip dairy farms when on a supply run if the dairy farm does not need their drums re-filled that day, thereby, allowing the suppliers to expand the number of customers they may have.

It is common for pumps 54 to die or stop functioning after a certain amount of time or use. Usually before a pump 54 stops functioning, the pump gradually pumps lower and lower volumes of liquid during a specific time interval. Therefore, it may be advantageous to configure a processor 34 to determine and store the volume of liquid each pump pumps during a specific time interval and compare the results in order to predict when a pump 54 might fail, or, when the pump 54 may not withdrawal the predetermined minimum volume of liquid during a wash cycle. The processor 34 preferably is configured to store data comprising at least a volume of liquid pumped during each wash cycle. This data, and other data, may be stored on an SD slot card, or the like, and have a backup system such as a battery backup. The processor 34 is preferably further configured to compare the stored data of at least a volume of liquid pumped during each wash cycle in order to create a pump trend for each pump 54. The processor 34 may be configured to send a text alert 256 if the volume of liquid pumped during a wash cycle is lower than a predetermined volume. Further, the processor is preferably configured to analyze the pump trend in order to determine how long it will take before the pump 54 fails or cannot meet the minimum volume threshold for a wash.

While various shapes, configurations, and features have been described above and shown in the drawings for the various embodiments of the present invention, those of ordinary skill in the art will appreciate from this disclosure that any combination of the above features can be used without departing from the scope of the present invention. It is understood, therefore, that this invention is not limited to the particular embodiments disclosed, but is intended to cover all modifications which are within the spirit and scope of the invention as defined by the appended claims and/or shown in the attached drawings.

I claim:

1. A sensor apparatus for measuring a depth of a liquid in a drum, the sensor apparatus comprising:
   a tube having a first end and a second end, the second end being configured for placement within the liquid, the tube having a first internal diameter proximate the first end and a second internal diameter proximate the second end, wherein the first internal diameter is less than the second internal diameter;
   a seal positioned in the tube;
   a first sensor disposed in the tube proximate the seal and configured to measure air pressure in the tube;
   a processor in electronic communication with the first sensor, wherein the processor is configured to automatically determine a volume of the liquid in the drum.

2. The sensor apparatus of claim 1, further comprising a second sensor in electronic communication with the processor, the second sensor being configured to measure atmospheric pressure outside of the drum.

3. The sensor apparatus of claim 1, further comprising an opening located in the second end of the tube configured to let the liquid in the drum partially fill the tube between the second end and the seal, the second end being irregular in shape such that positioning of the second end on a flat bottom of the drum will not prevent flow of liquid into the tube via the drum.

4. The sensor apparatus of claim 1, wherein the location of the second sensor is any one of on the first end, between the seal and the first end, in a compartment attached to the tube, and spaced from the sensor apparatus.

5. The sensor apparatus of claim 1, wherein the sensor apparatus is configured for insertion via a hole in a top of the drum, and wherein the sensor apparatus comprises an outer tube disposed over the tube, the outer tube having a third end and a fourth end, the outer tube configured to withdraw the liquid from the drum when the sensor apparatus is inserted into the hole in the top of the drum.

6. The sensor apparatus of claim 5, wherein the third end of the outer tube is sealed to the tube at a location on the tube spaced from the second end.

7. The sensor apparatus of claim 5, wherein at least a portion of the tube protrudes from the fourth end of the outer tube so that withdrawal of the liquid from the drum via the outer tube does not create suction that seals the outer tube to a bottom of the drum.

8. The sensor apparatus of claim 5, wherein a hose is located on the outer tube and in fluid communication therewith such that liquid withdrawn from the drum via the outer tube then traverses the hose.

9. The sensor apparatus of claim 5, wherein a first area defined by an axial cross section of the fourth end of the outer tube is greater than a second area defined by an axial cross section of the third end of the outer tube.

10. The sensor apparatus of claim 5, wherein the second sensor is located in a container positioned on the first end of the tube, the container forming a second seal between the outer tube and the tube, and, the third end of the outer tube and the atmosphere.

11. The sensor apparatus of claim 9, further comprising at least one device located within the fourth end and configured to prevent the liquid in the outer tube from exiting the sensor apparatus between the tube and the outer tube via the fourth end when the sensor apparatus is withdrawn from the liquid in the drum, the at least one device not preventing the liquid from entering the outer tube through the fourth end.

12. The sensor apparatus of claim 1, wherein the processor is configured to compute a volume of the liquid in the drum based on the measurements of the first sensor, the second sensor, using a plurality of inputs representing at least one of a dimension of the drum, a dimension of the sensor apparatus, and a specific gravity of the liquid.

13. The sensor apparatus of claim 12, wherein the processor is configured for entry of the plurality of inputs via a remote electronic device.

14. The sensor apparatus of claim 13, further comprising an opening located in one of between the seal and the second end of the tube and in the second end of the tube, the opening configured to let the liquid in the drum partially fill the tube, wherein the processor is configured to automatically determine the depth of the liquid in the drum, according to:

$$H=(P_b-P_a)/(\text{PPIC}*\text{SG}_{liquid}),$$

wherein
$P_b$ is the pressure in the drum at the opening of the tube as measured by the first sensor,
$P_a$ is the atmospheric pressure outside the drum as measured by the second sensor,
$SG_{liquid}$ is the specific gravity of the liquid inside the drum,
H is the depth, or height, of the liquid inside the drum above the opening,
PPIC is determined by $((H-\text{TUBE}_{liquidinches})*249.17)/H$
$\text{TUBE}_{liquidinches}$ is the height of liquid in the tube above the opening,
249.17 is the standard pressure exerted by a one inch column of water.

15. The sensor apparatus of claim 14, wherein the processor is further configured to automatically determine the volume of the liquid in the drum and take into account any adjustment needed due to the presence of the sensor apparatus therein by using the depth of the liquid in the drum and dimensions of the drum to determine an initial volume of liquid in the drum, then the processor automatically adjusts the initial volume of liquid in the drum to get a final volume of liquid in the drum that takes into account the sensor apparatus, according to:

$$V\text{drum-final}=V\text{drum-initial}-((H-D\text{liquid-in-sensor})*A),$$

wherein
H is the depth of liquid in the drum above the opening;
Vdrum-final is the final volume of liquid in the drum above the opening;
Vdrum-initial is the initial volume of liquid in the drum above the opening;
A is a cross sectional area of the tube;
Dliquid-in-sensor is the depth of the liquid in the tube determined as follows:

$$D\text{liquid-in-sensor}=(L-(((Pi*Vi/Ti)*(Tf/Pf))/A)),$$

wherein
L is a length of the tube;
Pi is the initial pressure in the tube prior to insertion of the tube in the liquid;
Vi is the initial volume of the tube that is calculated by the dimensions of the tube;
Ti is the initial temperature of air in the tube;
Pf is a pressure in the tube when the tube is submerged in the liquid as calculated by the first sensor; and
Tf is the final temperature of the air inside the tube when the tube is submerged.

16. The sensor apparatus of claim 15, wherein the processor is configured to collect a plurality of usage data comprising at least one of a time and a temperature of liquid withdrawn from the drum.

17. The sensor apparatus of claim 16, wherein the processor is configured to compare the plurality of usage data against a plurality of predetermined data and issue an alert when a discrepancy occurs.

18. The sensor apparatus of claim 11, wherein the second end of the tube is located off-center in the fourth end of the outer tube to provide additional room for the operation of the at least one device.

19. A sensor apparatus for measuring a depth of a liquid in a drum, the sensor apparatus comprising:
- a tube having a first end and a second end, the second end being configured for placement within the liquid, the tube having a first tube section proximate the first end and a second tube section proximate the second end, the first tube section having a first internal diameter and the second tube section having a second internal diameter, wherein the first internal diameter is less than the second internal diameter;
- a seal positioned in the tube and spaced from the second end; and
- a first sensor disposed in the tube between the seal and the second end and configured to measure air pressure in the tube.

20. The sensor apparatus of claim 19, further comprising a processor in electronic communication with the first sensor and a second sensor in electronic communication with the processor, the second sensor being configured to measure atmospheric pressure outside of the drum.

* * * * *